US008650477B2

(12) United States Patent
Sudoh et al.

(10) Patent No.: US 8,650,477 B2
(45) Date of Patent: *Feb. 11, 2014

(54) MULTIMEDIA DATA PROCESSING DEVICE WHICH CAN EASILY PREPARE MULTIMEDIA CONTENTS

(75) Inventors: Tatsuo Sudoh, Chiba (JP); Junsei Sato, Vancouver, WA (US); Ryota Yagi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 34 days.

This patent is subject to a terminal disclaimer.

(21) Appl. No.: 12/463,317

(22) Filed: May 8, 2009

(65) Prior Publication Data

US 2009/0222489 A1 Sep. 3, 2009

Related U.S. Application Data

(62) Division of application No. 10/532,936, filed as application No. PCT/JP03/15824 on Dec. 10, 2003.

(30) Foreign Application Priority Data

Dec. 12, 2002 (JP) ................................ 2002-360716
Apr. 25, 2003 (JP) ................................ 2003-122447
Dec. 2, 2003 (JP) ................................ 2003-403118

(51) Int. Cl.
*G06F 17/27* (2006.01)
(52) U.S. Cl.
USPC ......................................... 715/234; 715/202
(58) Field of Classification Search
USPC .............................................. 715/234, 202
See application file for complete search history.

(56) References Cited

U.S. PATENT DOCUMENTS

| 5,608,859 A | 3/1997 | Taguchi |
| 5,862,372 A * | 1/1999 | Morris et al. ................ 717/109 |
| 5,864,338 A | 1/1999 | Nestor et al. |
| 5,898,430 A | 4/1999 | Matsuzawa et al. |

(Continued)

FOREIGN PATENT DOCUMENTS

| EP | 0 944 254 A1 | 9/1999 |
| EP | 1 024 661 A2 | 8/2000 |

(Continued)

OTHER PUBLICATIONS

Takiuchi et al., The 63rd Annual Convention (the latter term of 2001) of Information Processing Society of Japan; pp. 3-351 and 3-352.

(Continued)

*Primary Examiner* — Laurie Ries
*Assistant Examiner* — Soumya Dasgupta
(74) *Attorney, Agent, or Firm* — Birch, Stewart, Kolasch & Birch, LLP

(57) ABSTRACT

A multimedia processing device implements a script having a data structure that is formed of a drawing information describing portion where media data is chronologically described, and a user navigation information describing portion where correspondence between events and actions and implementation conditions are chronologically described. The multimedia processing device implements this script, and thereby, media data is chronologically reproduced, and at the same time, a user interface showing operations that can be chronologically carried out is outputted. Then, a predetermined process, such as an insertion of media data, can be implemented by carrying out the operations following the user interface according to predetermined timing.

42 Claims, 68 Drawing Sheets

SCENE 1-1  (D)

SCENE 2-1  (E)

SCENE 3-1  (F)

(56) References Cited

U.S. PATENT DOCUMENTS

| | | | |
|---|---|---|---|
| 6,006,241 | A | 12/1999 | Purnaveja et al. |
| 6,075,527 | A | 6/2000 | Ichihashi et al. |
| 6,118,445 | A * | 9/2000 | Nonomura et al. ............ 715/723 |
| 6,137,483 | A | 10/2000 | Kiyono et al. |
| 6,397,387 | B1 | 5/2002 | Rosin et al. |
| 6,670,966 | B1 | 12/2003 | Kusanagi |
| 6,686,970 | B1 * | 2/2004 | Windle .......................... 348/584 |
| 6,850,252 | B1 * | 2/2005 | Hoffberg ........................ 715/716 |
| 6,954,894 | B1 * | 10/2005 | Balnaves et al. ............... 715/202 |
| 7,006,881 | B1 * | 2/2006 | Hoffberg et al. ................. 700/83 |
| 7,136,710 | B1 * | 11/2006 | Hoffberg et al. ................. 700/83 |
| 7,260,785 | B2 * | 8/2007 | Ching et al. ................... 715/769 |
| 8,433,575 | B2 * | 4/2013 | Eves et al. ..................... 704/270 |
| 2002/0049819 | A1 | 4/2002 | Matsuda et al. |
| 2002/0120701 | A1 * | 8/2002 | Ohba ............................. 709/206 |
| 2002/0151992 | A1 * | 10/2002 | Hoffberg et al. ................. 700/83 |
| 2003/0068161 | A1 * | 4/2003 | Lasorsa et al. ................. 386/111 |
| 2003/0090504 | A1 * | 5/2003 | Brook et al. ................... 345/716 |
| 2004/0066419 | A1 | 4/2004 | Pyhalammi |
| 2004/0158866 | A1 | 8/2004 | Saruhashi et al. |

FOREIGN PATENT DOCUMENTS

| | | |
|---|---|---|
| JP | 2001-346270 A | 12/2001 |
| JP | 2002-91881 A | 3/2002 |
| JP | 2002-140270 A | 5/2002 |
| JP | 2002-262223 A | 9/2002 |
| JP | 2002-324036 A | 11/2002 |
| WO | 01/35056 A1 | 5/2001 |
| WO | WO-03/001430 A1 | 1/2003 |

OTHER PUBLICATIONS

U.S. Office Action for related U.S. Appl. No. 12/909,644 mailed Apr. 25, 2013.

European Search Report mailed Jan. 17, 2012 for Application No. 11 15 9842.

European Search Report mailed Jan. 17, 2012 for Application No. 11 15 9851.

U.S. Notice of Allowance for related U.S. Appl. No. 12/909,644 issued Aug. 30, 2013.

* cited by examiner

FIG.6

```
1: <smil>
2:   <head>
3:     <meta name="title" content="navigation" />
4:     <meta name="author" content="Okure" />
5:     <meta name="role" content="template" />
6:     <layout>
7:       <root-layout width="352" height="144"/>
8:       <region id="Image" width="176" height="120" left="0" top="0" />
9:       <region id="Text" width="176" height="120" left="176" top ="0"/>
10:      <region id="foot" width="352" height="24" left="0" top="121" />
11:    </layout>
12:    <action id="act_movie" type="replace" dest="plugin://movie" region="Image" />
13:    <action id="act_image" type="insert" dest="plugin://camera" region="Image" />
14:    <action id="act_text" type="insert" dest="plugin://textedit" region="Text" />
15:    <action id="act_speech" type="insert" dest="plugin://speech_coding" />
16:  </head>
```

FIG.7

```
17: <body>
18:   <par>
19:     <seq>
20:       <par dur = "8s">
21:         <video src = "FirstImage.mpg" region="Image" />
22:         <text src = "FirstText.txt" region="Text" />
23:         <audio src = "FirstSound.smf" />
24:         <event ref="act_movie" src="UI" type="select" desc="MOVIE STARTUP"/>
25:       </par>
26:       <par dur = "7s">
27:         <text src = "SecondText.txt" region="foot" />
28:         <event ref="act_image" src="UI" type="select" desc="CAMERA STARTUP"/>
29:         <event ref="act_text" src="UI" type="select" desc="TEXT INPUT"/>
30:         <event ref="act_speech" src="timer" type="2s" desc="SOUND RECORDING"/>
31:       </par>
32:       <par dur = "4s">
33:         <img src = "ThirdImage.jpg" region="Image"/>
34:         <text src = "ThirdText.txt" region="Text"/>
35:         <audio src = "ThirdSound.smf"/>
36:       </par>
37:     </seq>
38:     <text src = "BottomText.txt" region="foot" begin="4s" end="15s" />
39:   </par>
40: </body>
41:</smil>
```

| plugin://movie | MOVIE STARTUP |
| plugin://camera | CAMERA STARTUP |
| plugin://textedit | TEXT INPUT |
| plugin://speech_coding | SOUND RECORDING |

| LOGIC SYMBOLS | HARDWARE KEY CODES |
|---|---|
| F1 | F |
| F2 | 1 |
| F3 | 2 |

FIG.29

```
1: <smil>
2:   <head>
3:     <meta name="title" content="navigation" />
4:     <meta name="role" content="contents" />
5:     <layout>
6:       <root-layout width="352" height="144"/>
7:       <region id="top width="352" height="72" left="0" top="0" />
8:       <region id="middle" width="352" height="48" left="0" top ="72"/>
10:    </layout>
11:    <action id="act_www" type="ext" dest="http://www.sharp.co.jp/sales" />
12:    <action id="act_mail" type="ext" dest="mailto://sales@sharp.co.jp"/>
13:    <action id="act_phone" type="ext" dest="phone://09003476786" />
15:  </head>
```

FIG.30

```
16:  <body>
17:    <seq>
18:      <par dur = "10s">
19:        <img src="ProductImage.jpg" region="top" />
20:        <text src = "ProductDesc.txt" region="middle" />
21:        <event begin="1s" dur="3s"ref="act_www" src="UI" type="select" />
22:        <event begin="4s" dur="3s" ref="act_phone" src="UI" type="select" />
23:        <event begin="7s" dur="3s" ref="act_mail" src="UI" type="select" />
24:      </par>
25:    </seq>
26:  </body>
27:</smil>
```

FIG.47

```
 1: <smil>
 2:   <head>
 3:     <meta name="title" content="navigation" />
 4:     <meta name="author" content="Okure" />
 5:     <meta name="role" content="template" />
 6:     <layout>
 7:       <root-layout width="352" height="144"/>
 8:       <region id="Image" width="176" height="120" left="0" top="0" />
 9:       <region id="Text" width="176" height="120" left="176" top ="0"/>
10:     </layout>
11:   </head>
12:   <body>
13:     <par>
14:       <seq>
15:         <par dur = "8s">
16:           <img src = "FirstImage.jpg" region="Image" />
17:         </par>
18:         <par dur = "7s">
19:           <img src = "SecondImage.jpg" region="Image" />
20:           <text src = "SecondText.txt" region="text" />
21:         </par>
22:         <par dur = "4s">
23:           <img src = "ThirdImage.jpg" region="Image"/>
24:           <text src = "ThirdText.txt" region="text" />
25:         </par>
26:       </seq>
27:     </par>
28:   </body>
29: </smil>
```

FIG.50

```
 1: <smil>
 2:   <head>
 3:     <meta name="title" content="navigation" />
 4:     <meta name="author" content="Okure" />
 5:     <meta name="role" content="template" />
 6:     <layout>
 7:       <root-layout width="352" height="144"/>
 8:       <region id="Image" width="176" height="120" left="0" top="0" />
 9:       <region id="Text" width="176" height="120" left="176" top ="0"/>
10:       <region id="foot" width="352" height="24" left="0" top="121" />
11:     </layout>
12:     <action id="act_movie" type="replace" dest="plugin://movie" region="Image" />
13:     <action id="act_image" type="insert" dest="plugin://camera" region="Image" />
14:     <action id="act_text" type="insert" dest="plugin://textedit" region="Text" />
15:     <action id="act_speech" type="insert" dest="plugin://speech_coding" />
16:   </head>
```

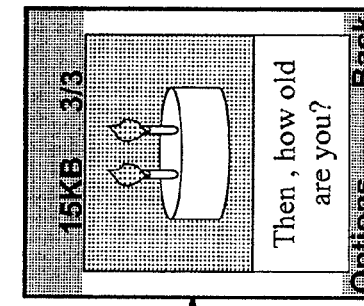
FIG.51C  SCENE 3
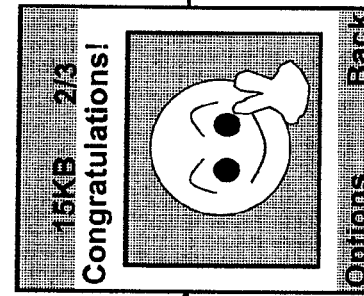
FIG.51B  SCENE 2
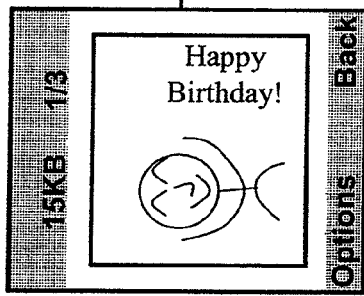
FIG.51A  SCENE 1
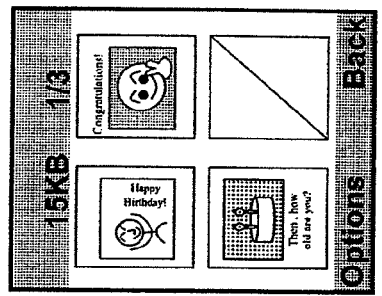
FIG.51D  SWITCHING OF PREVIEW MODE FIG.54A
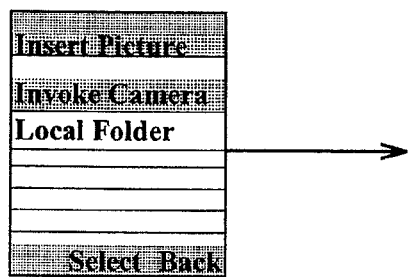
FIG.54B
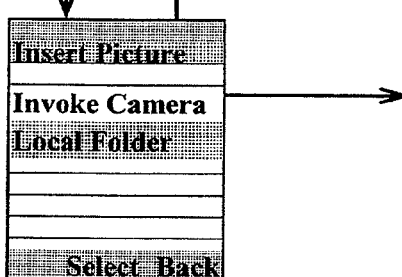
FIG.55
| TRANSMITTED MESSAGES | TEMPLATES |
|---|---|
| 1221 | CONSIDERABLE AMOUNT OF FREE TIME |
| 1222 | THIS TASTES GOOD! |
| 1223 | CONSIDERABLE AMOUNT OF FREE TIME |

```
<!-- (PIECES OF) ORIGINAL SCRIPT -->
<seq>
    <par = "5s">
    <video src="ORIGINAL MEDIA DATA" region ="Image">
    </par>
</seq>
```

```
<!--SCRIPT THAT SHOWS THE DESCRIPTIONS OF THE ABOVE-DESCRIBED PIECES AFTER REWRITING -->
<seq>
    <par = "3s">
    <video src="ORIGINAL MEDIA DATA" region ="Image">
    </par>
    </seq>
    <seq>
    <par = "5s">
    <video src="ACQUIRED DATA" region ="Image">
    </par>
</seq>
```

FIG.58
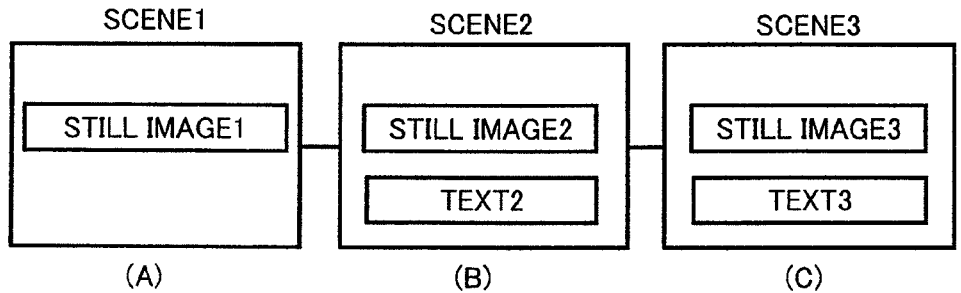
FIG.59
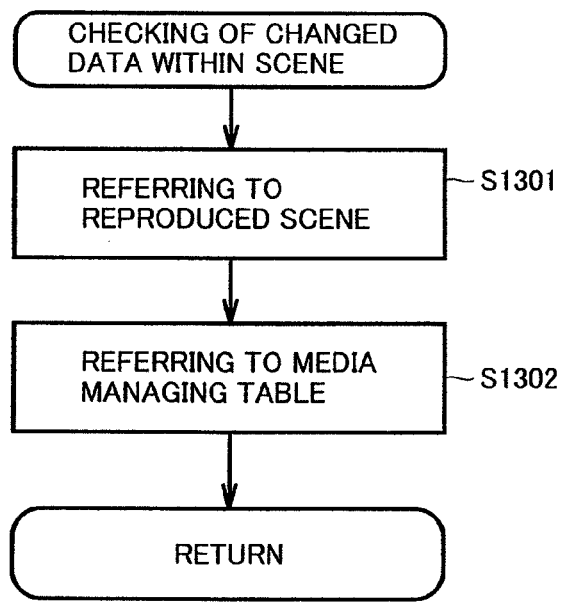
FIG.60
| APPLICATION | MEDIA TYPE |
|---|---|
| IMAGE TAKING | STILL IMAGE, ANIMATED IMAGE |
| SOUND DATA RECORDING | SOUND |
| FILE ACQUISITION | STILL IMAGE, ANIMATED IMAGE, TEXT |

FIG.61

```
17: <body>
18:     <seq>
19:         <par dur = "8s">
20:             <img src = "FirstImage.jpg" region="Image" />
21:         </par>
22:         <par dur = "7s">
23:             <img src = "SecondImage.jpg" region="Image" />
24:             <text src = "SecondText.txt" region="Text" />
25:             <event ref="act_image" src="UI" type="select" desc="CAMERA STARTUP"/>
26:         </par>
27:         <par dur = "4s">
28:             <img src = "ThirdImage.jpg" region="Image"/>
29:             <text src = "ThirdText.txt" region="Text"/>
30:             <event ref="act_text" src="UI" type="select" desc="TEXT INPUT"/>
31:         </par>
32:     </seq>
33: </body>
34:</smil>
```

FIG.62
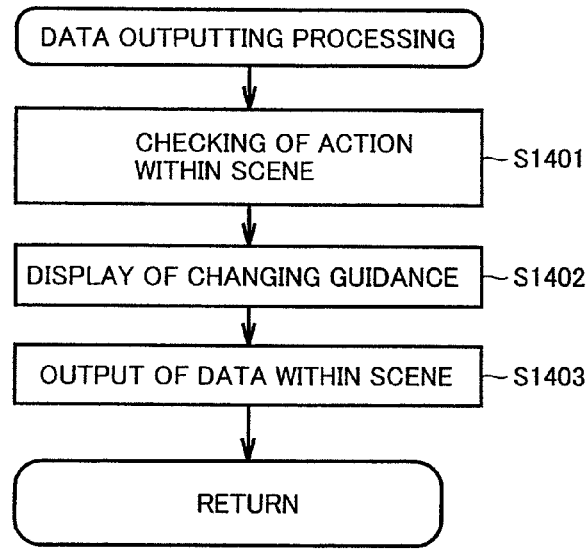
FIG.63
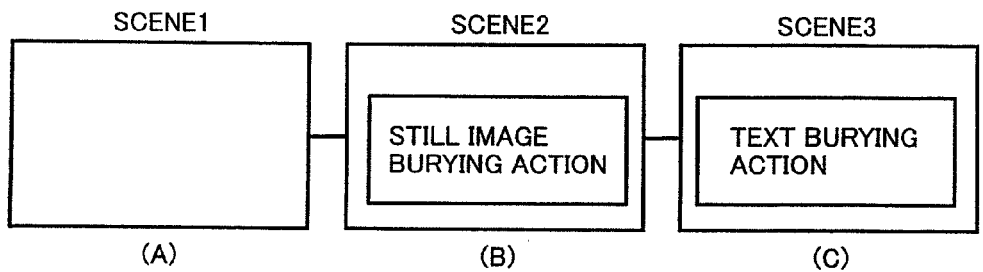
FIG.64
| USER CHANGED DATA | APPLICATION | INPUTTED EVENT |
|---|---|---|
| STILL IMAGE2 | IMAGE ACQUISITION | F1KEY |
| | FILE ACQUISITION | F2KEY |
| TEXT2 | FILE ACQUISITION | selectKEY |

FIG.68

```
1: <smil>
2:   <head>
3:     <meta name="title" content="navigation" />
4:     <meta name="readOnly" content="yes" />
5:     <meta name="role" content="template" />
6:     <layout>
7:       <root-layout width="352" height="144"/>
8:       <region id="Image" width="176" height="120" left="0" top="0" />
9:       <region id="Text" width="176" height="120" left="176" top ="0"/>
10:      <region id="foot" width="352" height="24" left="0" top="121" />
11:    </layout>
12:    <action id="act_movie" type="replace" dest="plugin://movie" region="Image" />
13:    <action id="act_image" type="insert" dest="plugin://camera" region="Image" />
14:    <action id="act_text"  type="insert" dest="plugin://textedit" region="Text" />
15:    <action id="act_speech" type="insert" dest="plugin://speech_coding" />
16:  </head>
```

FIG.70

```
1:<smil>
2:<head>
3:  <layout>
4:    <root-layout width="240" height="260"/>
5:    <region id="image" top="20" left="20" width="200" height="200" />
6:    <region id="text" top="220" left="10" width="240" height="20" />
7:  </layout>
8:</head>
9:<body>
10:  <par dur="2s">
11:    <img src="top.jpg" region="image" />
12:    <text src="top.txt" region="text" />
13:  </par>
14:  <par dur="6s">
15:    <img src="image.jpg" region="image" />
16:    <audio src="bgm.amr" />
17:    <text src="message.txt" region="text" />
18:  </par>
19:</body>
20:</smil>
```

FIG.71

```
1:<html>
2:  <body>
3:    <form action="http://localhost/mmproc" method="post">
4:      <label>SELECT PHOTO
5:        <input name="image.jpg" type="file" accept="image/*" />
6:      </label>
7:      <label>ENTER BIRTHDAY MESSAGE
8:        <input name="message.txt" type="text" />
9:      </label>
10:     <input type="submit" value="send"/>
11:    </form>
12:  </body>
13:</html>
```

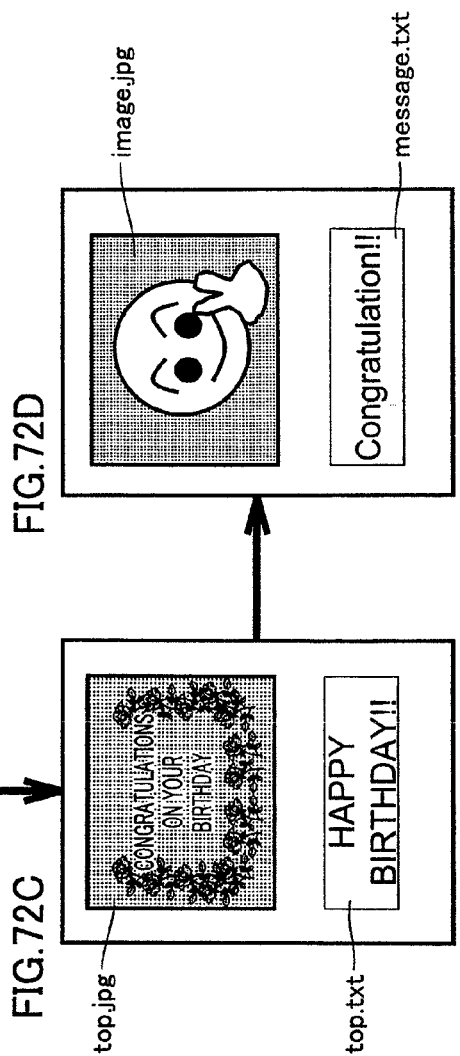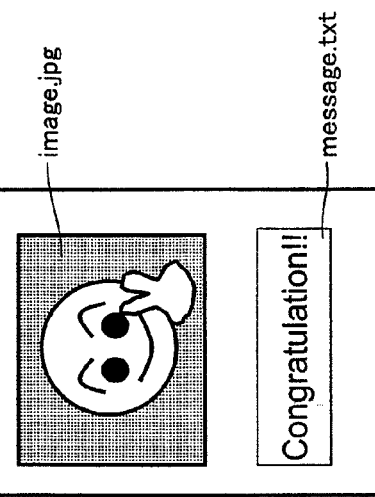

FIG.73

```
1:<?xml version="1.0" encoding="UTF-8"?>
2:<mmstemplate xmlns=http://www.foo.com/2003/MMSTemplate ...>
3:    <head>
4:        <title>Postcard Example</title>
5:    </head>
6:    <composition>
7:        <template src="http://www.example.com/postcard-comp.htm"/>
8:    </composition>
9:    <presentation>
10:       <template src="http://www.example.com/postcard-rend.smi"/>
12:   </presentation>
13:</mmstemplate>
```

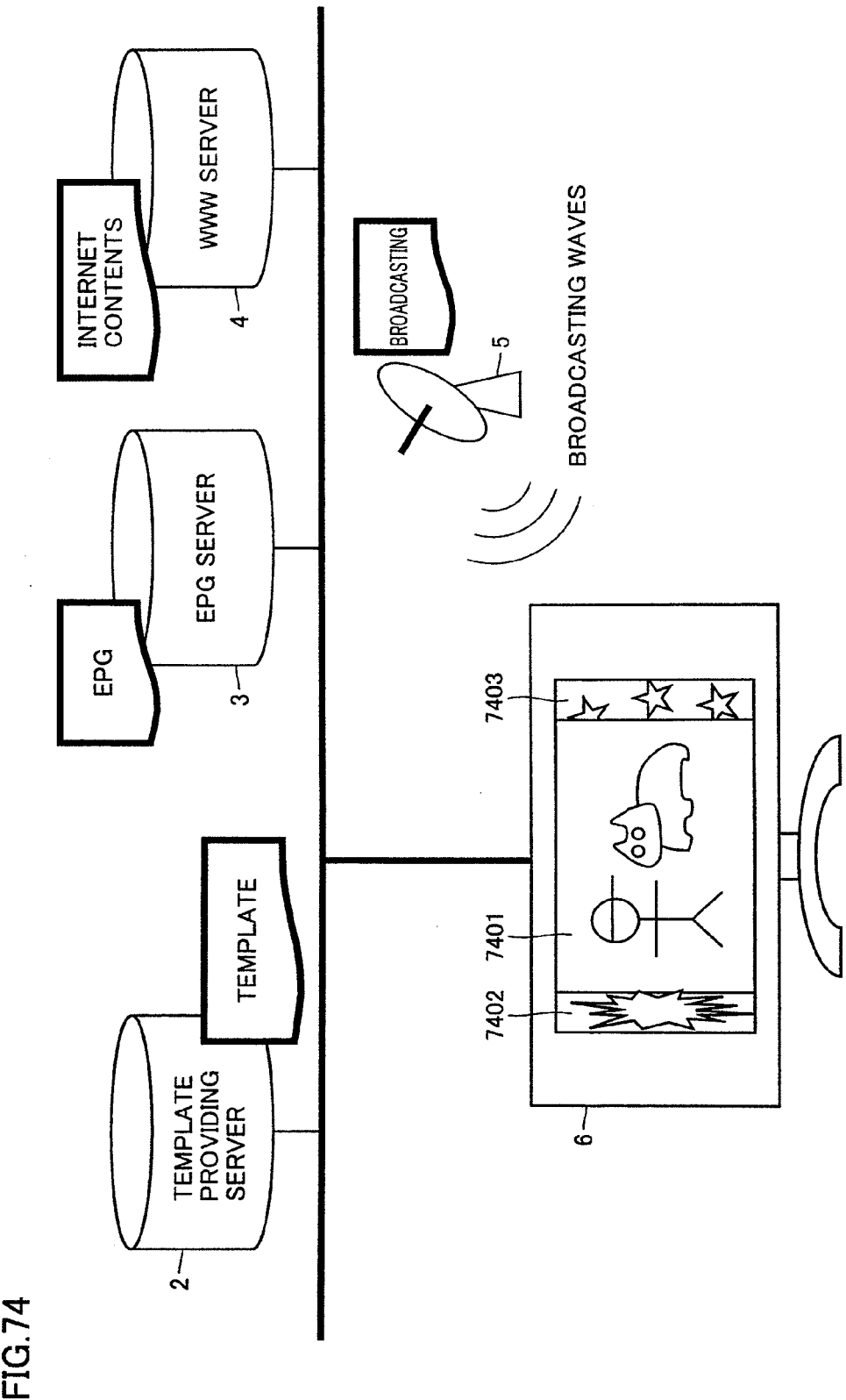

FIG.75

```
 1:<?xml version="1.0" encoding="Shift_JIS"?>
 2:<smil>

3:<head>
 4:  <layout>
 5:    <root-layout backgroundColor="black"/>
 6:    <region id="main" top="0%" left="10%" width="80%" height="100%" z-index="1"/>
 7:    <region id="right" right="0%" top="0%" width="10%" height="100%" z-index="0"/>
 8:    <region id="left" left="0%" top="0%" width="10%" height="100%" z-index="0"/>
 9:  </layout>
10:</head>

11:<body>
12:  <par repeatCount="indefinite">
13:    <video id="tvcontents" src="data:,dummy" region="main" />
14:    <img src="http://www.example.com/tvinfo/r-info.jpg" region="right" />
15:    <img src="http://www.example.com/tvinfo/l-info.jpg" region="left" />
16:  </par>
17:</body>

18:</smil>
```

FIG.76

```
1:<?xml version="1.0" encoding="Shift_JIS"?>
2:<psd version="1.0">
3:   <channel>SMIL CHANNEL</channel>
4:   <day value="2003-09-29">
5:   <embededid value= "tvcontents" />

6:   <program>
7:     <schedule>
8:       <starttime value="0:00"/>
9:       <endtime value="2:00"/>
10:    </schedule>
11:    <title>ANIMATION</title>
12:    <ref href="ch_4"/>
13:  </program>

14:  <program>
15:    <schedule>
16:      <starttime value="2:00"/>
17:      <endtime value="4:00"/>
18:    </schedule>
19:    <title>SHAARP PRODUCT INFORMATION</title>
20:    <ref ref="www.example.com/product.smil"/>
21:  </program>
          ...
          (OMITTED: DESCRIPTION AT AND AFTER 4:00 CONTINUES)
          ...
 :   </day>
 :   <day value="2003-09-30">
 :   ...
 :   </day>
 :   ...
 :</psd>
```

FIG.77

```
1:<?xml version="1.0" encoding="Shift_JIS"?>
2:<mmstemplate>
3:  <head>
4:    <title>SMIL CHANNEL</title>
5:  </head>
6:  <composition>
7:    <template src="smil.psd"/>
8:  </composition>
9:  <presentation>
10:    <template src="tvlayout.smil"/>
11:  </presentation>
12:</mmstemplate>
```

FIG.80A

| DisplayScheduler |
|---|
| java.util.LinkedList DisplayContentList<br>       //  HOLDING OF DisplayContent CLASS IN LIST<br>int CurrentTime    //  TIME OF REPRODUCTION AT THIS TIME |
| |

FIG.80B

| DisplayContent | |
|---|---|
| java.lang.String MediaType | // MEDIA TYPE |
| java.io.File MediaFile | // FILE NAME |
| java.awt.Rectangle Region | // DISPLAY REGION |
| int BeginTime | // TIME OF START OF REPRODUCTION(sec) |
| int EndTime | // TIME OF COMPLETION OF REPRODUCTION |
| java.lang.String EvtSrc | // event src |
| java.lang.String EvtType | // event type |
| java.lang.String EvtDesc | // event desc |
| java.lang.String ActId | // action id |
| java.lang.String ActType | // action type |
| java.net.URI ActDest | // action dest |
| | |

FIG.81

| ATTRIBUTES | 1 | 2 | 3 | 4 | 5 | 6 | 7 | 8 | 9 | 10 | 11 |
|---|---|---|---|---|---|---|---|---|---|---|---|
| Media Type | video | text | audio | text | img | text | audio | img | text | audio | text |
| Media File | FirstImage.mpg | FirstText.txt | FirstSound.smf | SecondText.txt | | | | ThirdImage.jpg | ThirdText.txt | ThirdSound.smf | BottomText.txt |
| Media Region (x,y,w,h) | 0, 0, 176, 120 | 176, 0, 176, 120 | 0, 0, 0, 0 | 0, 121, 352, 24 | 0, 0, 176, 120 | 176, 0, 176, 120 | 0, 0, 0, 0 | 0, 0, 176, 120 | 176, 0, 176, 120 | 0, 0, 0, 0 | 0, 121, 352, 24 |
| Begin Time | 0 | 0 | 0 | 8 | 8 | 8 | 8 | 15 | 15 | 15 | 4 |
| End Time | 8 | 8 | 8 | 15 | 15 | 15 | 15 | 19 | 19 | 19 | 15 |
| EvSrc | UI | – | – | – | UI | UI | timer | – | – | – | – |
| EvType | select | – | – | – | select | select | 2s | – | – | – | – |
| EvDesc | MOVIE STARTUP | – | – | – | CAMERA STARTUP | TEXT INPUT | SOUND RECORDING | – | – | – | – |
| ActId | act_movie | – | – | – | act_image | act_text | act_speech | – | – | – | – |
| ActType | replace | – | – | – | insert | insert | insert | – | – | – | – |
| ActDest | plugin://movie | – | – | – | plugin://camera | plugin://textedit | plugin://speech_config | – | – | – | – |

FIG.82

| ATTRIBUTES | 1 | 2 | 3 | 4 | 5 | 6 | 7 | 8 | 9 | 10 | 11 |
|---|---|---|---|---|---|---|---|---|---|---|---|
| Media Type | video | text | audio | text | img | text | audio | img | text | audio | text |
| Media File | FirstImage.mpg | FirstText.txt | FirstSound.smf | SecondText.txt | CameraPict01.jpg | EditText01.txt | Voice01.amr | ThirdImage.jpg | ThirdText.txt | ThirdSound.smf | BottomText.txt |
| Media Region (x,y,w,h) | 0, 0, 176, 120 | 176, 0, 176, 120 | 0, 0, 0, 0 | 0, 121, 352, 24 | 0, 0, 176, 120 | 176, 0, 176, 120 | 0, 0, 0, 0 | 0, 0, 176, 120 | 176, 0, 176, 120 | 0, 0, 0, 0 | 0, 121, 352, 24 |
| Begin Time | 0 | 0 | 0 | 8 | 8 | 8 | 8 | 15 | 15 | 15 | 4 |
| End Time | 8 | 8 | 8 | 15 | 15 | 15 | 15 | 19 | 19 | 19 | 15 |
| EvSrc | UI | – | – | – | UI | UI | timer | – | – | – | – |
| EvType | select | – | – | – | select | select | 2s | – | – | – | – |
| EvDesc | MOVIE STARTUP | – | – | – | CAMERA STARTUP | TEXT INPUT | SOUND RECORDING | – | – | – | – |
| ActId | act_movie | – | – | – | act_image | act_text | act_speech | – | – | – | – |
| ActType | replace | – | – | – | insert | insert | insert | – | – | – | – |
| ActDest | plugin://movie | – | – | – | plugin://camera | plugin://textedit | plugin://speech_config | – | – | – | – |

FIG.83

```
 1: <smil>
 2:   <head>
 3:     <meta name="title" content="navigation" />
 4:     <meta name="author" content="Okure" />
 5:     <meta name="role" content="template" />
 6:     <layout>
 7:       <root-layout width="352" height="144" />
 8:       <region id="Image" width="176" height="120" left="0" top="0" />
 9:       <region id="Text" width="176" height="120" left="176" top="0" />
10:       <region id="foot" width="352" height="24" left="0" top="121" />
11:     </layout>
12:     <action id="act_movie" type="replace" dest="plugin://movie" region="Image" />
13:     <action id="act_image" type="replace" dest="plugin://camera" region="Image" />
14:     <action id="act_text" type="replace" dest="plugin://textedit" region="Text" />
15:     <action id="act_speech" type="replace" dest="plugin://speech_config" />
16:   </head>
17:   <body>
18:     <par>
19:       <seq>
20:         <par dur = "8s">
21:           <video src = "FirstImage.mpg" region = "Image" />
22:           <text src = "FirstText.txt" region = "Text" />
23:           <audio src = "FirstSound.smf" />
24:           <event ref ="act_movie" src="UI" type="select" desc="MOVIE STARTUP" />
25:         </par>
26:         <par dur = "7s">
27:           <text src = "SecondText.txt" region = "foot" />
              <img src = "CameraPict01.jpg" region = "Image" />
              <text src = "EditText01.txt" region = "Text" />
              <audio src = "Voice01.amr" />
28:           <event ref="act_image" src="UI" type="select" desc="CAMERA STARTUP" />
29:           <event ref="act_text" src="UI" type="select" desc="TEXT INPUT" />
30:           <event ref="act_speech" src="timer" type="2s" desc="SOUND RECORDING" />
31:         </par>
32:         <par dur = "4s">
33:           <img src = "ThirdImage.jpg" region = "Image" />
34:           <text src = "ThirdText.txt" region = "Text" />
35:           <audio src = "ThirdSound.smf" />
36:         </par>
37:       </seq>
38:       <text src="BottomText.txt" region="foot" begin="4s" end="15s" />
39:     </par>
40:   </body>
41: </smil>
```

FIG.84

```
1:  <smil>
2:   <head>
3:    <meta name="title" content="navigation" />
4:    <meta name="author" content="Okure" />
5:    <meta name="role" content="template" />
6:    <layout>
7:     <root-layout width="352" height="144" />
8:     <region id="Image" width="176" height="120" left="0" top="0" />
9:     <region id="Text" width="176" height="120" left="176" top="0" />
10:    <region id="foot" width="352" height="24" left="0" top="121" />
11:   </layout>
12:
13:
14:
15:
16:  </head>
17:  <body>
18:   <par>
19:    <seq>
20:     <par dur = "8s">
21:      <video src = "FirstImage.mpg" region = "Image" />
22:      <text src = "FirstText.txt" region = "Text" />
23:      <audio src = "FirstSound.smf" />
24:
25:     </par>
26:     <par dur = "7s">
27:      <text src = "SecondText.txt" region = "foot" />
28:      <img src = "CameraPict01.jpg" region = "Image" />
29:      <text src = "EditText01.txt" region = "Text" />
30:      <audio src = "Voice01.amr" />
31:     </par>
32:     <par dur = "4s">
33:      <img src = "ThirdImage.jpg" region = "Image" />
34:      <text src = "ThirdText.txt" region = "Text" />
35:      <audio src = "ThirdSound.smf" />
36:     </par>
37:    </seq>
38:    <text src="BottomText.txt" region="foot" begin="4s" end="15s" />
39:   </par>
40:  </body>
41: </smil>
```

MULTIMEDIA DATA PROCESSING DEVICE WHICH CAN EASILY PREPARE MULTIMEDIA CONTENTS

This application is a Divisional of co-pending application Ser. No. 10/532,936, filed on Apr. 28, 2005, and for which priority is claimed under 35 U.S.C. §120. application Ser. No. 10/532,936 is the national phase of PCT International Application No. PCT/JP2003/015824 filed on Dec. 10, 2003 under 35 U.S.C. §371, which application claims priority under 35 U.S.C. §119 on Patent Application No. 2002-360716 filed in Japan on Dec. 12, 2002, Patent Application No. 2003-122447 filed in Japan on Apr. 25, 2003 and Patent Application No. 2003-403118 filed in Japan on Dec. 2, 2003. The entire contents of each of the above-identified applications are hereby incorporated by reference.

TECHNICAL FIELD

The present invention relates to a multimedia data processing device, a multimedia data processing program and a data structure for multimedia contents data, and in particular, to a multimedia data processing device which can easily prepare multimedia contents, a multimedia data processing program and a data structure for multimedia contents data.

BACKGROUND ART

Along with the spread of communication apparatuses such as cellular phones in recent years, communications where prepared multimedia contents are transmitted to other users or have multimedia contents prepared for other users are spreading.

When multimedia contents are prepared, however, in many cases, complex operation procedures are required, and in some cases, such preparation is difficult for users who are not accustomed to the operation.

Therefore, a technique aiming to simplify user operation has been considered.

As such a communication tool, Japanese Patent Laying-Open No. 2002-140270 discloses a receiving device which samples and carries out an attached script, interlocked with the opening of an e-mail, upon reception of an e-mail to which the script has been attached, and furthermore, a receiving device which prepares a script that reflects the action that has been carried out in the receiving device and which controls the output of the processing result in a manner where it is outputted through the transmitter of the e-mail. The action that is desired by the transmitting side can be carried out by the receiving side by using such a receiving device as that described in Japanese Patent Laying-Open No. 2002-140270.

Furthermore, Japanese Patent Laying-Open No. 2002-324036 describes a technique for preparing an e-mail template where the layout information of the contents is described in order to easily prepare an e-mail to which multimedia data is to be attached, and for preparing en e-mail that includes multimedia in accordance with the layout information of this template.

In the case where the above receiving device described in Japanese Patent Laying-Open No. 2002-140270 is made to carry out preparation of a script, and thereby, multimedia contents are prepared, a problem arises where it is necessary to describe a complex script and to transmit this to the receiving device. In addition, a problem arises where in some cases, the script that is carried out does not induce an operation on the receiving side, and therefore, the action desired by the transmitting side is not necessarily obtained.

Furthermore, there is a problem where it is not easy to prepare an e-mail on the message preparing side of an e-mail or the like. That is to say, it is difficult to prepare a message where a script and data that is prepared by a message preparer are simply combined.

The technology which is disclosed in Japanese Patent Laying-Open No. 2002-324036 as a technology for facilitating preparation of a message or an e-mail that includes multimedia data and which facilitates arrangement of letters, still pictures and the like by using a template on which layout information is described works effectively in the case where an e-mail where a number of images and texts are mixed on one large screen which is viewed on a PC (Personal Computer) is prepared. However, the Patent Document does not state a case where an e-mail where the e-mail screen changes chronographically and discontinuously, and thus, the contents are switched in such a manner as scene A, scene B and scene C is prepared, and a problem arises where it is difficult for the user to prepare multimedia data that transitions chronographically, even in the case where the technology disclosed in the Patent Document is used.

Furthermore, a problem arises where the contents of the message cannot be rewritten by utilizing a variety of functions, such as camera, microphone, and address list, which are held inherently by a terminal in a cellular phone or in a portable terminal that is a conventional data processing device.

Furthermore, a problem arises where, in a terminal on the preparing side that is a conventional data processing device, a portion of a script that is utilized for the preparation of multimedia contents cannot be rewritten, and preparation and reproduction cannot be carried out by rewriting a minimal portion of the script when such a script is utilized on the reproducing side.

Furthermore, a problem arises where, in a terminal on the preparing side that is a conventional data processing device, script commands or tags which are utilized for the preparation of multimedia contents, and which are not required by the receivers or do not follow the standard procedure cannot be eliminated.

The present invention is provided in order to solve such problems, and a first object of the invention is to provide a multimedia data processing device which can easily prepare multimedia contents, a multimedia data processing program and a data structure for multimedia contents data, and furthermore, a second object of the invention is to provide a multimedia data processing device that allows a receiver to carry out the operation of preparing and editing desired multimedia contents without fail, a multimedia processing program and a data structure for multimedia contents data.

DISCLOSURE OF THE INVENTION

The present invention provides a multimedia data processing device as shown in the following, in order to solve the above-described problems. That is to say, in order to achieve the above-described objects, a multimedia data processing device according to one aspect of the present invention is provided with a script implementing unit for reproducing data that is referred from a script that is included in a template in accordance with the script, a user changeable data determining unit for determining a portion of data that is referred from the script and that can be changed by the user, a data changing unit for changing the portion that can be changed, and a script and data outputting unit for outputting at least either the script or the changed data.

A multimedia data processing device according to another aspect of the present invention is provided with a script implementing unit for reproducing data that is referred from a script that is included in a template in accordance with the script, a function selecting unit for selecting a function of the multimedia data processing device in accordance with the script that is included in the template, an action determining unit for determining which process is to be carried out on the data that is referred from the script by using the selected function in accordance with the script that is included in the template, an action implementing unit for implementing the determined process, a data changing unit for changing the data that is referred from the script, and a script and data outputting unit for outputting at least either the script or the changed data.

A multimedia data processing device according to still another aspect of the present invention is provided with a template list acquiring unit for acquiring a list of templates that have been formed so as to include scripts, a template list displaying unit for displaying a list of templates, a template selecting unit for selecting one or more desired template from a list of displayed templates, and a message transmitting unit for transmitting the selected template to another device as a message.

A multimedia data processing device according to yet another aspect of the present invention is provided with a template acquiring unit for acquiring a template that has been formed so as to include a script, a program acquiring unit for acquiring a program from a broadcasting station, a contents acquiring unit for acquiring internet contents which are provided via the internet, and a script implementing unit for reproducing at least one of data that is referred from the script, a program that has been acquired by the program acquiring unit, and internet contents that have been acquired by the contents acquiring unit in accordance with the script that is included in the template.

A multimedia data processing program according to still yet another aspect of the present invention is a program for allowing a computer to carry out the process of a template that has been formed so as to include a script which allows the computer to carry out the script implementing step of reproducing data that is referred from a script that is included in the template in accordance with the script, the user changeable data determining step of determining a portion that can be changed by a user from among data that is referred from the script, the data changing step of changing the changeable portion by using a function of a multimedia data processing device, and the script and data outputting step of outputting at least one of the script and the changed data.

A multimedia data processing program according to another aspect of the present invention is a program for allowing a computer to carry out the process of a template that has been formed so as to include a script which allows the computer to carry out the script implementing step of reproducing data that is referred from a script that is included in the template in accordance with the script, the terminal function selecting step of selecting a function of a multimedia data processing device in accordance with the script that is included in the template, the action determining step of determining which process is to be carried out for the data that is referred from the script by using the selected function, the action implementing step of implementing the determined process, the data changing step of changing the data that is referred from the script, and the script and data outputting step of outputting at least one of the script and the changed data.

A data structure for multimedia contents data according to still another aspect of the present invention is a data structure for multimedia contents data which is processed in a data processing device that includes a reproducing means for reproducing media data and an inputting means for receiving an input operation from the user, and which includes a reproduction describing unit for showing media data that is reproduced in the reproducing means of the data processing device and an input operation describing unit for showing an input operation that is received by the inputting means of the data processing device and a process that corresponds to the input operation, wherein the multimedia contents data is processed so that predetermined media data is reproduced in the reproducing means of the data processing device, a predetermined input operation is received by the inputting means of the data processing device, and the data processing device carries out a process in accordance with the predetermined input operation on the basis of the input operation describing unit.

A data structure for multimedia contents data according to yet another aspect of the present invention is a data structure for multimedia contents data which is processed in a data processing device that includes a reproducing unit for reproducing media data and an inputting unit for receiving an input operation from the user, and which includes a reproduction describing unit for showing media data that is reproduced in the reproducing unit of the data processing device, an input operation describing unit for showing an input operation that is received by the inputting unit of the data processing device, and a process that corresponds to the input operation, and a schedule describing unit for managing time of effect of the media data that is reproduced in the reproducing unit of the data processing device and time of effect of the input operation that is received by the input unit, wherein the multimedia contents data is processed so that predetermined media data is reproduced in the reproducing unit of the data processing device at a predetermined time on the basis of the schedule describing unit, a predetermined input operation is received by the inputting unit of the data processing device at a predetermined time, and the data processing device carries out a process that corresponds to the predetermined input operation at the predetermined time on the basis of the input operation describing unit.

BRIEF DESCRIPTION OF THE DRAWINGS

FIGS. 6, 7 and 47 are diagrams showing concrete examples of scripts.

FIGS. 29 and 30 are diagrams showing concrete examples of scripts.

FIGS. 50 and 61 are diagrams showing concrete examples of scripts which are utilized in a terminal on the preparing side.

FIGS. 51A to 51D are diagrams showing concrete examples of thumbnail displays for each scene.

FIGS. 54A and 54B are diagrams showing concrete examples of screens for selection from among a number of processes which accept a selection of a process that is to be started from the present time.

FIG. 55 is a diagram showing a concrete example of a table that holds correspondence between transmitted messages and templates that have been utilized for preparing messages.

FIG. 58 is a diagram showing a concrete example of a switching table.

FIG. 59 is a flowchart showing determining process in step S1110.

FIG. 60 is a diagram showing a concrete example of a table which records correspondence between the data acquisition programs which are stored in cellular phone 1 and the media types supported by cellular phone 1.

FIG. 62 is a flowchart showing a data outputting process in step 1201.

FIG. 63 is a diagram showing a concrete example of an action managing table.

FIG. 64 is a diagram showing a concrete example of a scene event table.

FIG. 68 is a diagram showing a concrete example of a script where whether slide editing is permitted or prohibited is described.

FIG. 70 is a diagram showing a concrete example of a script that includes a drawing information describing portion in the case where the script is formed so as to be divided into the drawing information describing portion and a user navigation describing portion.

FIG. 71 is a diagram showing a concrete example of a script that includes a user navigation describing portion in the case where the script is formed so as to be divided into the drawing information describing portion and a user navigation describing portion.

FIGS. 72A to 72D are diagrams showing a concrete example of screen transition at the time when a script is implemented.

FIG. 73 is a diagram showing a concrete example of a script that includes description which relates two scripts to each other.

FIG. 74 is a diagram showing the configuration of a data communication system that is a formed so as to include a television set which is a multimedia data processing device according to the third embodiment.

FIG. 75 is a diagram showing a concrete example of a script that includes a drawing information describing portion that describes drawing information according to the third embodiment.

FIG. 76 is a diagram showing a concrete example of a script that includes a program table information describing portion that describes program information in accordance with time slots according to the third embodiment.

FIG. 77 is a diagram showing a concrete example of a script that includes a description which relates two scripts to each other.

FIGS. 80A and 80B are diagrams showing a concrete example of the data structure that stores the results of analysis of a script.

FIG. 81 is a diagram showing a concrete example of the results of analysis of a script.

FIG. 82 is a diagram showing a concrete example of the results of analysis of an updated script.

FIG. 83 is a diagram showing a concrete example of a script on which a rewriting process for adding media data has been carried out.

FIG. 84 is a diagram showing a concrete example of a script from which the editing function has been eliminated after a rewriting process for adding media data has been carried out.

BEST MODES FOR CARRYING OUT THE INVENTION

In the following, the preferred embodiments of the present invention are described with reference to the drawings. In the following description, the same symbols are attached to parts and components that are the same. The names and functions of these are also the same. Accordingly, detailed descriptions thereof are not repeated.

First Embodiment

Figure 1:
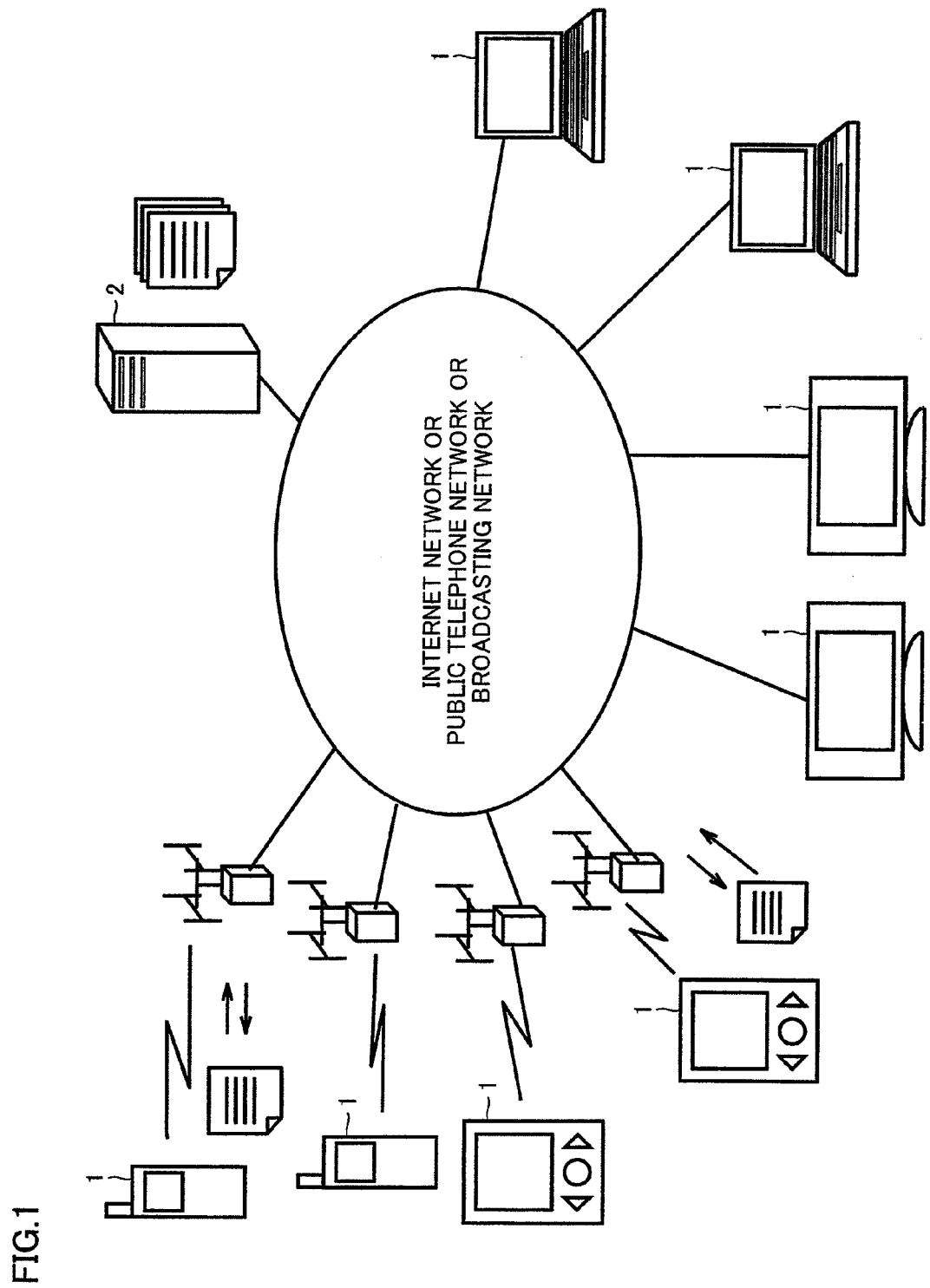
FIG. 1 is a diagram showing the configuration of a data communication system according to the present embodiment.

With reference to FIG. 1, a data communication system according to the present embodiment is formed so as to include a template providing server (hereinafter simply referred to as server) 2 for providing a template that is described in a script language, and a reproducing and editing devices 1 which are multimedia data processing devices for reproducing and editing a provided template, wherein server 2 and reproducing and editing devices 1 communicate via the internet, a public telephone network or a broadcasting network. In addition, though not shown in FIG. 1, server 2 and reproducing and editing devices 1 may communicate via a dedicated line, such as a LAN (Local Area Network) or over a wireless communication system. Here, as shown in FIG. 1, reproducing and editing devices 1 may be cellular phones, PDAs (Personal Digital Assistants), personal computers or the like, and in the following description, reproducing and editing devices 1 are assumed to be cellular phones 1.

Here, a reproducing and editing device 1 which is a multimedia data processing device may be an information communication apparatus, an audio and video apparatus, a home electronics apparatus, an amusement apparatus and the like.

In addition, an information communication apparatus may be an information apparatus such as personal computer or home server, a communication apparatus such as a telephone, in particular, a portable information communication apparatus such as a cellular phone, a PDA (Personal Digital Assistant), or a laptop type or wearable type computer.

In addition, an audio and video apparatus may be a digital still camera which is an image recording apparatus, a digital video camera, an HDD (Hard Disk Drive) recorder, a DVD (Digital Versatile Disk) recorder or a videotape recorder which is a video recording apparatus, a DVD player or a video player which is a video reproducing apparatus, a voice recorder which is a sound recording apparatus, a silicon audio recorder or player, an MD (Mini Disk) recorder or player, a CD (Compact Disk) recorder or player which is a music recording or reproducing apparatus, and a television set or a radio which is a broadcasting data receiving and reproducing apparatus.

In addition, a home electronics apparatus may be an apparatus such as a refrigerator, a washing machine, an air conditioner, a vacuum cleaner, an air purifier, a microwave oven or the like.

In addition, an amusement apparatus may be a game apparatus for home use or a portable game apparatus.

In addition, reproducing and editing device 1 which is a multimedia data processing device may be an apparatus that has more than one function from among the above-described information processing, communication, image recording and reproducing, video recording and reproducing, sound recording and reproducing, music recording and reproducing, and broadcasting data receiving and reproducing, or may be in any form, as long as it is an apparatus that can reproduce or edit multimedia data in the similar manner as the above-described apparatuses.

In the present embodiment, a case is described in detail, where reproducing and editing device 1 is specifically a cellular phone 1.

Here, in the present embodiment, media data indicates the multimedia data that follows below, which is any of image (still picture) data, animated image data, sound data, music data, text data and animation data, streaming data or broadcasting data that is received from the outside, or data that is obtained by integrating any of the above.

In addition, in the present embodiment, multimedia data indicates data that is obtained by integrating one or more types of media data, and the data may be described in a text style that can be read by a person, or may be in a binary style that cannot be directly be read by a person.

In addition, in the present embodiment, script indicates a description style that regulates attributes such as layout information on a screen, start of reproduction along the time axis, time of completion, reproduction speed and sound volume for each type of media data included in the above-described multimedia data for display, reproduction and editing of the multimedia data. In addition, it is possible to describe control information such as the startup of an external application, the acquisition of information from inside and outside the device, and the transition between links to other multimedia data in the script.

In addition, in the present embodiment, template indicates a form of multimedia data which is formed by including the above-described script and which can be reproduced and edited, where media data can be added, changed and deleted by rewriting the description of a portion that refers to the media data within the script, with user operation or the like as the trigger. The template may include one or more pieces of media data that is referred from the script.

Figure 2:
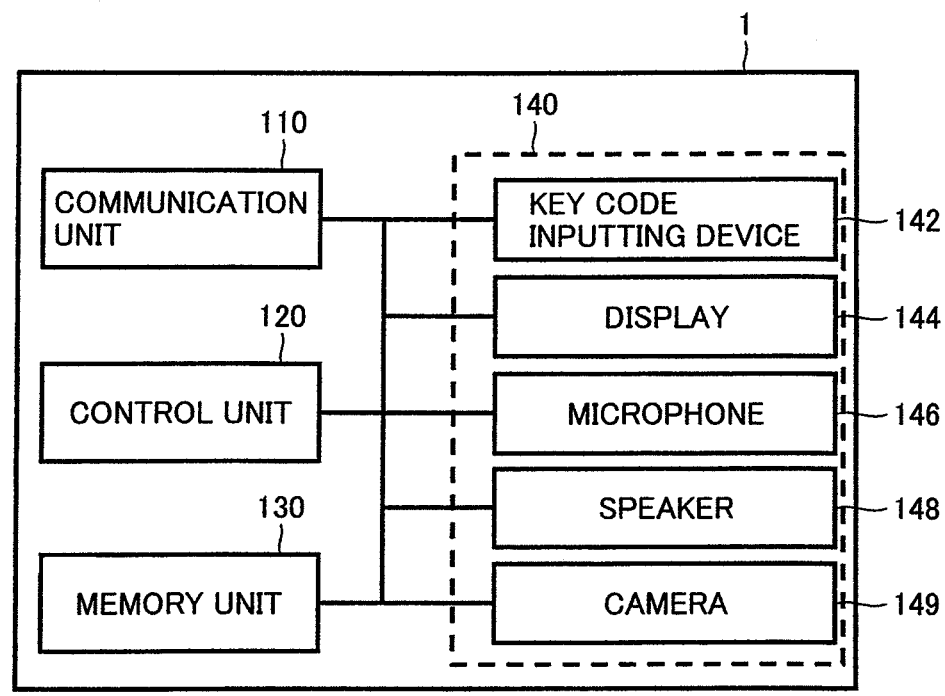
FIG. 2 is a block diagram showing a concrete example of the hardware configuration of a cellular phone 1 which is a reproducing and editing device that is included in the data communication system.

Next, with reference to FIG. 2, a cellular phone 1 that is included in a data communication system of the present embodiment is formed of an input/output unit 140 which is a user interface, a control unit 120 which is formed of a CPU (Central Processing Unit) or the like and which controls the entirety of this cellular phone 1, a communication unit 110 for communicating with another device, and a memory unit 130 which is formed of a ROM (Read Only Memory) or a RAM (Random Access Memory) and which stores a program that is executed in control unit 120, intermediate data of such a program, and data that has been received from another computer.

Furthermore, the above-described input/output unit 140 includes a key code inputting device 142 that includes numeral buttons such as "1" and "2" and direction buttons such as "R" and "L," a display 144, such as an LCD (Liquid Crystal Display) for displaying information for a user, a microphone 146 into which speech sound is inputted, a speaker 148 from which speech sound is outputted, and a camera 149 for taking an image that then is inputted.

In addition, control unit 120 includes a timer inside.

In such a cellular phone 1, processing for reproducing and editing a template that is obtained by the user from server 2 is carried out by means of the hardware of cellular phone 1, the software and the template which are stored in memory unit 130 and which are executed by the control unit 120. Here, the operation of cellular phone 1 itself shown in FIG. 2 is well known.

In addition, server 2 included in the present data communication system is a server that is formed of a general personal computer or the like, and the detailed description of this configuration is herein omitted.

Figure 3:
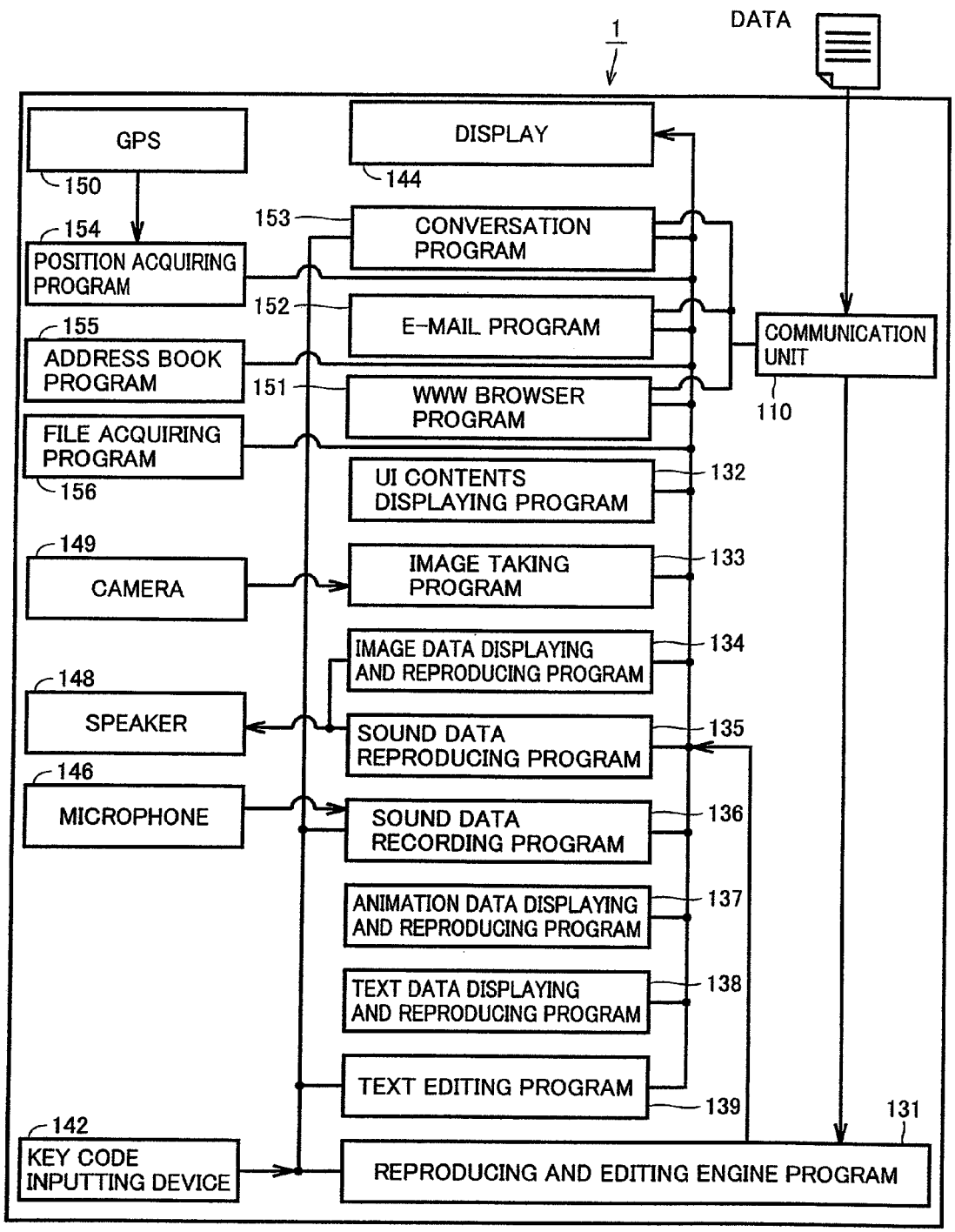
FIG. 3 is a diagram showing the programs which are stored in memory unit 130 of cellular phone 1 and the flow of data processing in cellular phone 1.

Next, FIG. 3 shows programs that are stored in memory unit 130 of cellular phone 1, and the flow of data processing in cellular phone 1. The flow of data processing shown in FIG. 3 is followed in cellular phone 1 when control unit 120 executes each of the programs stored in memory unit 130. That is to say, control unit 120 executes a program stored in memory unit 130, and thereby, reproducing and editing processing is carried out on a template that is received from server 2 by communication unit 110.

Concretely speaking, with reference to FIG. 3, first, control unit 120 executes a reproducing and editing engine program 131, and thereby, the template that is received in communication unit 110 and that includes the script and media data is processed. Here, the functional configuration of reproducing and editing engine program 131 is described below.

Next, control unit 120 executes a UI (User Interface) contents displaying program 132 on the basis of the processing results of reproducing and editing engine 131. UI contents displaying program 132 is executed so that the template is processed, and thereby, the contents of UI in the template are displayed on display 144.

In addition, control unit 120 executes image taking program 133 on the basis of the processing results of reproducing and editing engine program 131, and accepts an input of an image from camera 149 and a variety of instructions from key code inputting device 142. In addition, when a video image is taken, an input of sound from microphone 146 is additionally accepted.

In addition, control unit 120 executes an image data displaying and reproducing program 134 on the basis of the processing results of reproducing and editing engine program 131, and reproduces image data that is included in the template on display 144. In addition, in the case where sound is included in this image data, this sound is reproduced by speaker 148.

In addition, control unit 120 executes a sound data reproducing program 135 of the basis of the processing results of reproducing and editing engine program 131, and reproduces sound data that is included in the template in speaker 148.

In addition, control unit 120 executes a sound data recording program 136 on the basis of the processing results of reproducing editing engine program 131, and accepts an input of sound from microphone 146 and a variety of instructions from key code inputting device 142.

In addition, control unit 120 executes an animation data displaying and reproducing program 137 on the basis of the processing results of reproducing and editing engine program 131, and reproduces animation data that is included in the template on display 144.

In addition, control unit 120 executes a text data displaying and reproducing program 138 on the basis of the processing results of reproducing and editing engine program 131, and reproduces text data that is included in the template on display 144.

In addition, control unit 120 executes a text editing program 139 on the basis of the processing results of reproducing and editing engine program 131, and accepts text information and a variety of instructions from key code inputting device 142.

In addition, control unit 120 executes a WWW (World Wide Web) browser program 151 on the basis of the processing results of reproducing and editing engine program 131, and reproduces WWW contents.

In addition, control unit 120 executes a WWW browser program 151 on the basis of the processing results of reproducing and editing engine program 131, and acquires data from server 2 via communication unit 110.

In addition, control unit 120 executes an e-mail program 152 on the basis of the processing results of reproducing and editing engine program 131, and accepts text information and a variety of instructions from key code inputting device 142 so as to transmit an e-mail.

In addition, control unit 120 executes a conversation program 153 on the basis of the processing results of reproducing and editing engine program 131, and commences conversation.

In addition, control unit 120 executes a position acquiring program 154 on the basis of the processing results of reproducing and editing engine program 131, and acquires the present position of the terminal from a GPS (Global Positioning System) 150.

In addition, control unit 120 executes an address book program 155 on the basis of the processing results of reproducing and editing engine program 131, and acquires e-mail addresses and telephone numbers stored in memory unit 130.

In addition, control unit 120 executes a file acquiring program 156 on the basis of the processing results of reproducing and editing engine program 131, and acquires specific media type contents data that has been stored in memory unit 130.

In addition, control unit 120 executes reproducing and editing engine program 131 so as to process the template that includes the script and media data on the basis of information that has been accepted by executing the above-described image taking program 133, sound data recording program 136, text editing program 139, WWW browser program 151, position acquiring program 154, address book program 155 and file acquiring program 156.

Figure 4:
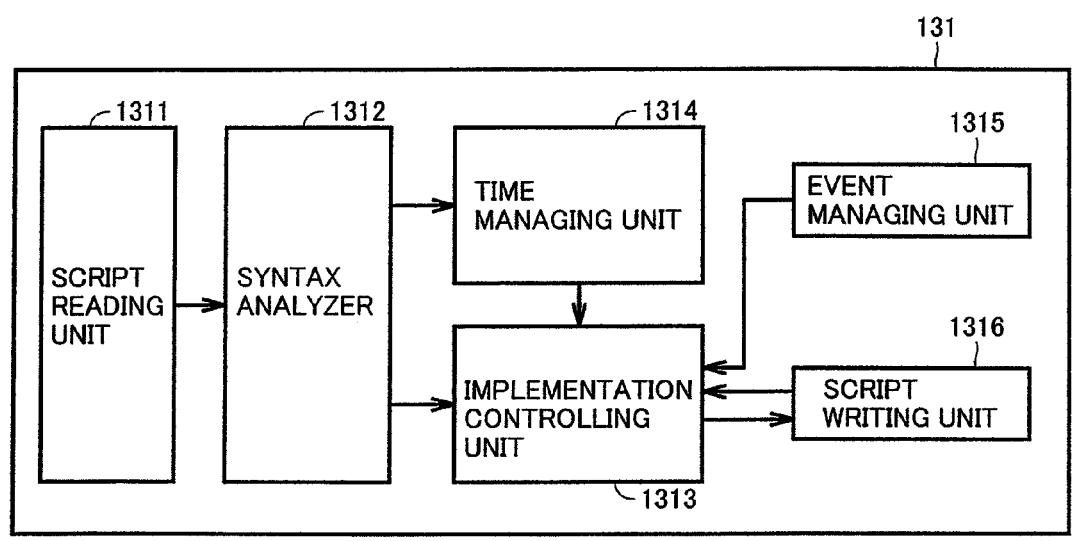
FIG. 4 is a block diagram showing the functional configuration of a reproducing and editing engine program 131.

Control unit 120 executes reproducing and editing engine program 131 that is stored in memory unit 130, and thereby, the respective functions shown in FIG. 4 are implemented in cellular phone 1. With reference to FIG. 4, first, a script reading unit 1311 reads the script that is included in the template that is received by communication unit 110. Then, script reading unit 1311 passes the script that has been read in to a syntax analyzer 1312.

Next, syntax analyzer 1312 analyzes the syntax of the script that has been passed from script reading unit 1311. Then, syntax analyzer 1312 passes the results of analysis to an implementation controlling unit 1313 and a time managing unit 1314.

Next, time managing unit 1314 prepares a timetable on the basis of the results of analysis that have been passed from syntax analyzer 1312. Then, time managing unit 1314 passes the prepared timetable to implementation controlling unit 1313.

In addition, an event managing unit 1315 detects the occurrence of an event. Then, event managing unit 1315 passes the results of detection to implementation controlling unit 1313.

Next, implementation controlling unit 1313 carries out the script on the basis of the timetable that has been passed from time managing unit 1314, the results of detection of the occurrence of an event that have passed from event managing unit 1315, and the results of analysis that have been passed from syntax analyzer 1312. In addition, implementation controlling unit 1313 instructs a script writing unit 1316 to rewrite the script on the basis of the results of detection of the occurrence of an event that has been passed from event managing unit 1315.

Script writing unit 1316 rewrites the script on the basis of the instruction from implementation controlling unit 1313 and passes the rewritten script to implementation controlling unit 1313. Then, the rewritten script is implemented in implementation controlling unit 1313.

Here, a case where a template that has been provided by server 2 is processed in cellular phone 1 according to the present embodiment is described, wherein a portion or the entirety of the script that is included in the template and media data may be stored in memory unit 130 of cellular phone 1, and in this case, the respective units shown in FIG. 3 or 4 processes the script or media data that has been read out and acquired from memory unit 130.

Figure 5:
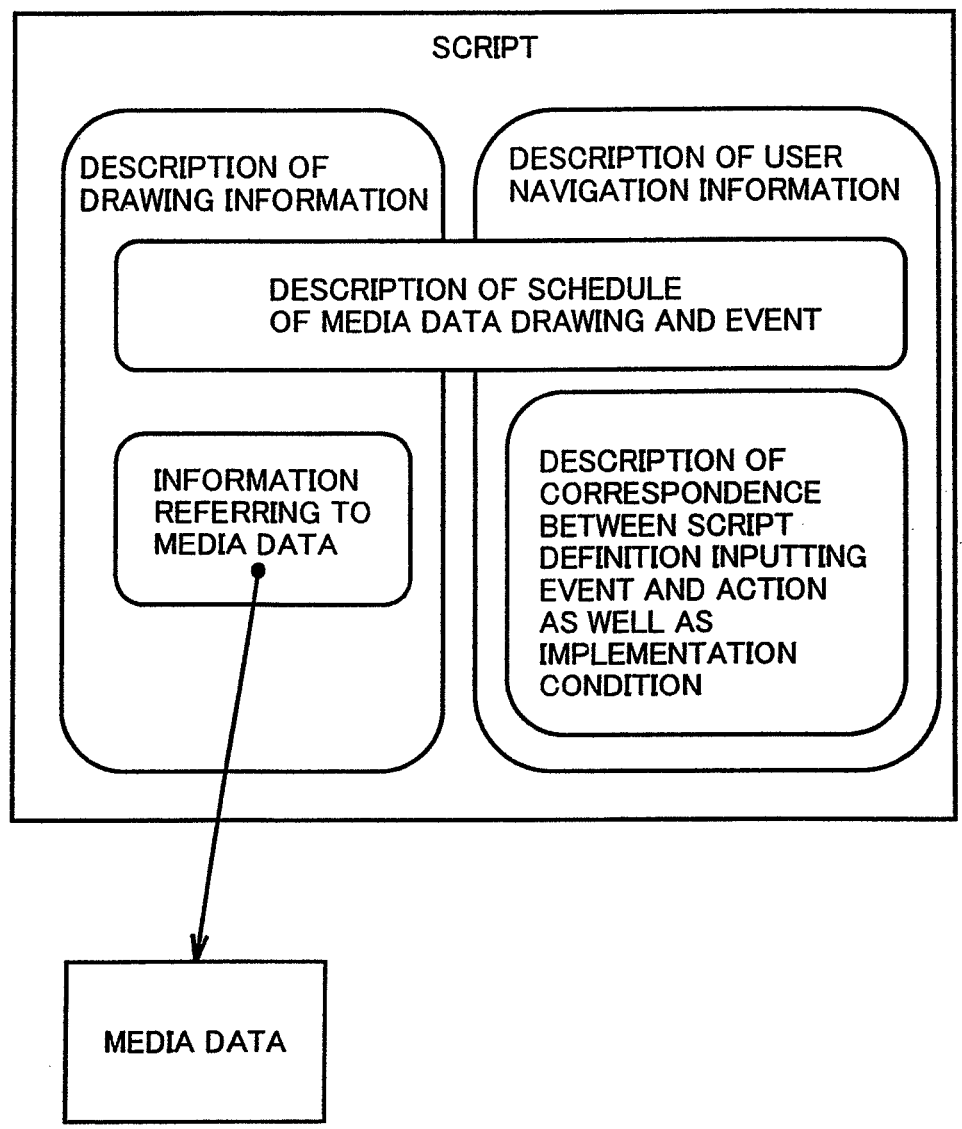
FIG. 5 is a diagram schematically showing the data structure of a script.

Next, a script which is provided to cellular phone 1 by server 2 and which is included in a template that is processed in cellular phone 1 is described. With reference to FIG. 5, the script that is processed in cellular phone 1 according to the present embodiment is characterized by being formed of a drawing information describing portion and a user navigation information describing portion.

In the drawing information describing portion, image (still image) data, animated image data, sound data, music data, text data, animation data, streaming data and information (file name, URL (Uniform Resource Locators), frequency and channel of broadcasting stations) referring to media data such as broadcasting data are described.

Here, a describing style such as data URL, prescribed by RFC2397 is utilized, and thereby, the substance of media data itself, as opposed to information referring to media data, may be described in the drawing information describing portion.

In addition, a script definition inputting event for implementing a link movement, startup of an application, display of help and the like, correspondence to an action (operation) and implementation conditions are described in the user navigation information describing portion.

As for examples of the above-described action, taking video or still images by means of startup of a camera, acquisition of user inputted text data by means of startup of a text editor, acquisition of sound data by means of startup of a voice recorder, acquisition of media data file by means of startup of a file selecting application, automatic acquisition of time information, position information, address book, schedule information, and other information from the inside or the outside of the apparatus, startup of the application of an apparatus, such as a WWW browser or a mailer, the call of a function inherent to an apparatus such as a telephone call, a melody reproduction, turning on a light or the like, a link transition to the implementation of another script or oscillation of a control signal for controlling another apparatus, such as switching of channels of a TV or temperature setting of an air conditioner can be cited.

Furthermore, the embodiment is characterized by including chronological descriptions in both the drawing information describing portion and the user navigation description portion. That is to say, the embodiment is characterized in that information referring to media data is chronologically described in the drawing information describing portion, and events are chronologically described in the user navigation information describing portion.

In such a configuration, multimedia data that allows chronological reproduction of media data, such as image (still image) data, music data, text data, animation data, streaming data and broadcasting data one after another can be described in a script.

Furthermore, events can be described chronologically, and thereby, for example, an event such as startup of a camera can be implemented at a predetermined time or in a predetermined time slot while reproducing a script. Furthermore, such a camera startup event is described so as to correspond to an action that is replaced with a predetermined image, and thereby, an application can be implemented in such a manner that when a user presses down a predetermined key in a time slot where the above-described predetermined image is displayed so that a camera is immediately started up while pausing the reproduction of the script, and at this point, the operation of taking an image is carried out, the image that has been taken at this time is displayed in a predetermined position when the mode returns to the reproduction of the script.

As described above, an event that starts up along the time sequence and an action that corresponds to this are clearly prescribed within a script, and thereby, the operation procedure can be simplified, increasing convenience for the user, even in the case where such multimedia data as that where a number of pieces of media data are reproduced chronologically by utilizing functions such as camera, microphone and address book in a portable terminal or the like is prepared.

FIGS. 6 and 7 show a concrete example of a script which described below.

With reference to FIG. 6, first, lines 12 to 15 of the header portion (lines 2 to 16) of the script define the contents of the action. That is to say, with reference to FIG. 6, lines 12 to 15 define identification information inherent to each action (action id), implementation style (type) of this action, the action contents (dest) and the implementation region of the action (Image) as the contents of the action.

Concretely speaking, according to line 12 of FIG. 6, the action of which the identification information is act_movie is defined as having contents which replace information that is displayed in the "Image" region with the file that is stored in "movie."

In addition, line 5 of FIG. 6 describes a suggestion as to how the script can be utilized in cellular phone 1. That is to say, the script is defined as a template navigates the contents editing operation. In addition to this, the script can be defined as the contents exclusively for reference which do not navigate the editing operation.

Next, with reference to FIG. 7, media data and actions that are implemented in parallel are described in the paragraph of lines 18 to 39 of the body portion (lines 17 to 40) of the script. Furthermore, lines 19 to 37 describe that these media data and actions are implemented chronologically. Furthermore, the media data and actions which are implemented between the $0^{th}$ second to the $8^{th}$ second, between the $8^{th}$ second to the $15^{th}$ second and between the $15^{th}$ second to the $19^{th}$ second are described in the paragraphs of lines 20 to 25, lines 26 to 31 and lines 32 to 36, respectively.

Figures 8, 9:
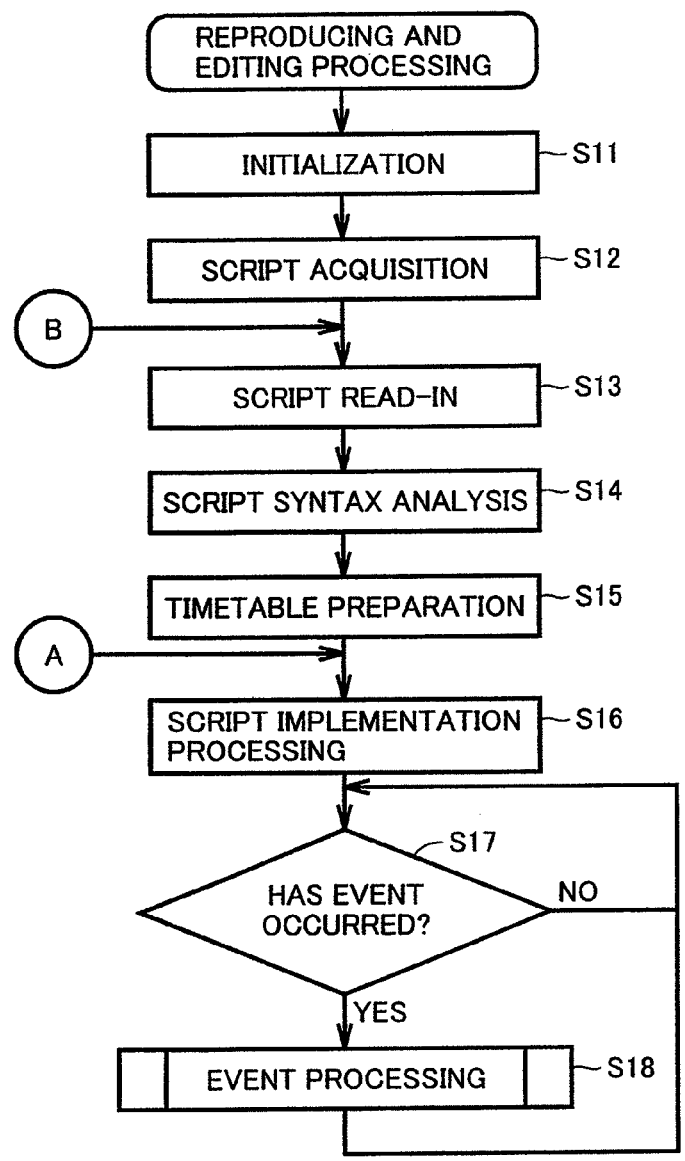
FIG. 8 is a diagram showing a concrete example of a table that prescribes the correspondence between startup applications and UI's which are displayed at the time of startup.
FIG. 9 is a flowchart showing reproducing and editing processing of a script in cellular phone 1.

Concretely speaking, lines 21 to 23 of FIG. 7 describe that image data, text data and sound data are reproduced between the $0^{th}$ second and the $8^{th}$ second, and line 24 describes that the action of which the identification information is act_ovie is implemented in the case where the UI of "movie startup" is displayed and the select key has been operated. Line 30 describes that the UI of "sound recording" is displayed, and then, two seconds later, a notification is received from the timer and the action of which the identification information is act-speech is implemented. Here, the name that is described following "src=" in lines 28 to 30 is the source ID that represents the origin of the occurrence of the event. The display of the UI may be described in the script, as shown in FIG. 7, or may be displayed by automatically reading out a table that prescribes the correspondence between the startup application and the UI that is displayed at this time, as shown in FIG. 8, when this table has been stored in advance in memory unit 130 of cellular phone 1, and control unit 120 of cellular phone 1 executes reproducing and editing engine program 131.

As described above, the script that is processed in cellular phone 1 according to the present embodiment is characterized by being formed of a drawing information describing portion and a user navigation information describing portion which describe drawing information and user navigation information, which are chronologically carried out.

Here, though in the present embodiment, a case is described where a script in a text style that can be read by a person is processed in cellular phone 1, the script may be in a binary style that cannot directly be read by a person.

In addition, though in the present embodiment, a case is described where a unified script is processed in cellular phone 1, a script may be formed so as to be divided into a drawing information describing portion that includes information referring to media data and a user navigation information describing portion, and in such a configuration, only a portion of a script where the drawing information describing portion that includes information referring to media data is described is edited at the time when media data is replaced or inserted.

Concretely speaking, FIGS. 70 and 71 show scripts, each of which is formed so as to be divided into a drawing information describing portion and a user navigation describing portion, which are scripts where drawing information describing portions are described and scripts where user navigation information describing portions are described.

Concretely speaking, the script where the drawing information describing portion shown in FIG. 70 is described describes that still image top.jpg and text top.txt are displayed for 0 to 2 seconds after the start of implementation of the script, and still image image.jpg, music data bgm.amr and text message.txt are reproduced for 2 to 8 seconds after the start of implementation of the script.

In addition, the script where the user navigation information describing portion shown in FIG. 71 is described is a script that carries out the function of replacing and inserting image.jpg and message.txt from among media data of which the reference information is described in FIG. 70 as the information to be referred to.

FIGS. 72A to 72D show concrete examples of screen displays, where the above-described script shown in FIGS. 70 and 71 is implemented after syntax analysis in cellular phone 1 according to the present embodiment. First, as shown in FIG. 72A, an image file selecting form, together with a letter sequence of "SELECT PHOTO," as well as a letter sequence inputting form together with a letter sequence of "ENTER BIRTHDAY MESSAGE," are displayed in accordance with the description of FIG. 71. A user selects an image file in the screen shown in FIG. 72A, and the condition when the text is inputted is shown in FIG. 72B. When the "send" button is selected and operated in the screen shown in FIG. 72B, the image file that has been selected at this time is incorporated into a template as "image.jpg" and the inputted text is incorporated into the template as "message.txt," so as to be reproduced and implemented. That is to say, still image top.jpg and text top.txt are displayed as shown in FIG. 72C for 0 to 2 seconds after the start of the reproduction of this script, and subsequently, image.jpg and message.txt are displayed, as shown in FIG. 72D, for 2 to 8 seconds after the start of the reproduction of the script, and at the same time, music data bgm.amr is reproduced. Image.jpg displayed in FIG. 72D is an image selected by the user on the screen shown in FIG. 72B, and message.txt is a text that is inputted on the screen shown in FIG. 72B.

As described above, a script is formed so as to be divided into a drawing information describing portion and a user navigation describing portion, and thereby, a merit can be obtained, where in the case as described below where the user navigation describing portion is deleted from the script and transmitted by being attached to an e-mail, only the drawing information describing portion may be attached, and the process for analyzing the script taking which portion is to be deleted into consideration can be omitted.

Here, in order to relate the script that includes a drawing information describing portion to the script that includes a user navigation describing portion, it is preferable to separately prepare a script that includes a describing portion which connects the two scripts to each other as a script such as, for example, that shown in FIG. 73, and it is preferable to handle a set of these scripts and a media data group that is referred from the script that includes the drawing information describing portion as a template.

In addition, a link to the script that includes the corresponding user navigation describing portion is described within the script that includes the drawing information describing portion, and thereby, the operation can be shifted to the implementation of the script that includes the user navigation describing portion according to a predetermined timing while reproducing the script that includes the drawing information describing portion, so that the screen can be switched to the inputting screen, as shown in FIG. 72A.

Next, reproducing and editing processing of a script in cellular phone 1 according to the present embodiment is described with reference to the flowchart of FIG. 9. Control unit 120 of cellular phone 1 reads out reproducing and editing engine program 131 of which the configuration is shown in FIG. 4 from memory unit 130 and implements this program, and thereby, the process shown in the flowchart of FIG. 9 is implemented.

With reference to FIG. 9, first, initialization is implemented in step S11, and after that, a script is acquired from server 2 via the internet by communication unit 110 in step S12.

Next, in step S13, control unit 120 executes reproducing and editing engine program 131 and reads in the script that has been acquired by script reading unit 1311.

Next, in step S14, syntax analyzer 1312 carries out syntax analysis on the read in script. Here, the method for syntax analysis is not limited to one specifically for the present invention, but rather, may be a general syntax analyzing method.

Figure 10:
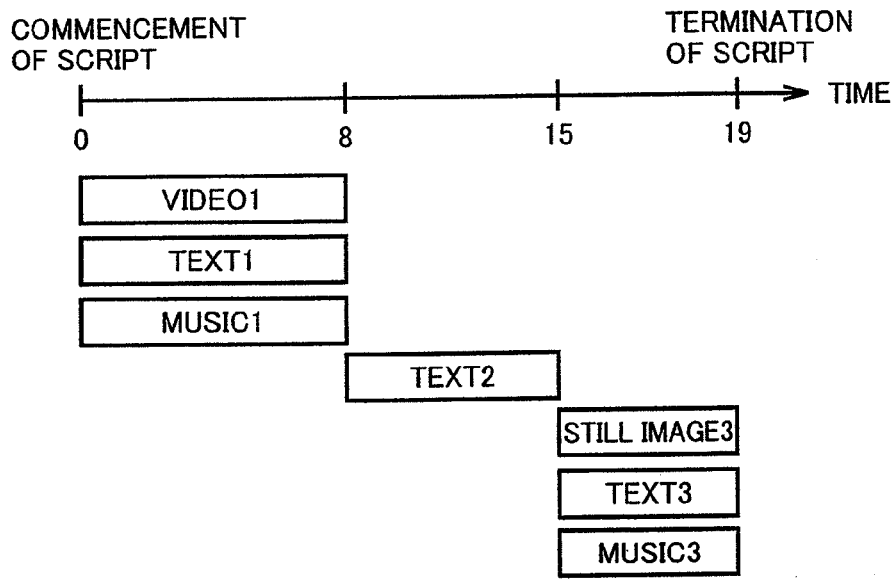
FIG. 10 is diagram showing a concrete example of a time table of media data drawing processing.
Figure 11:
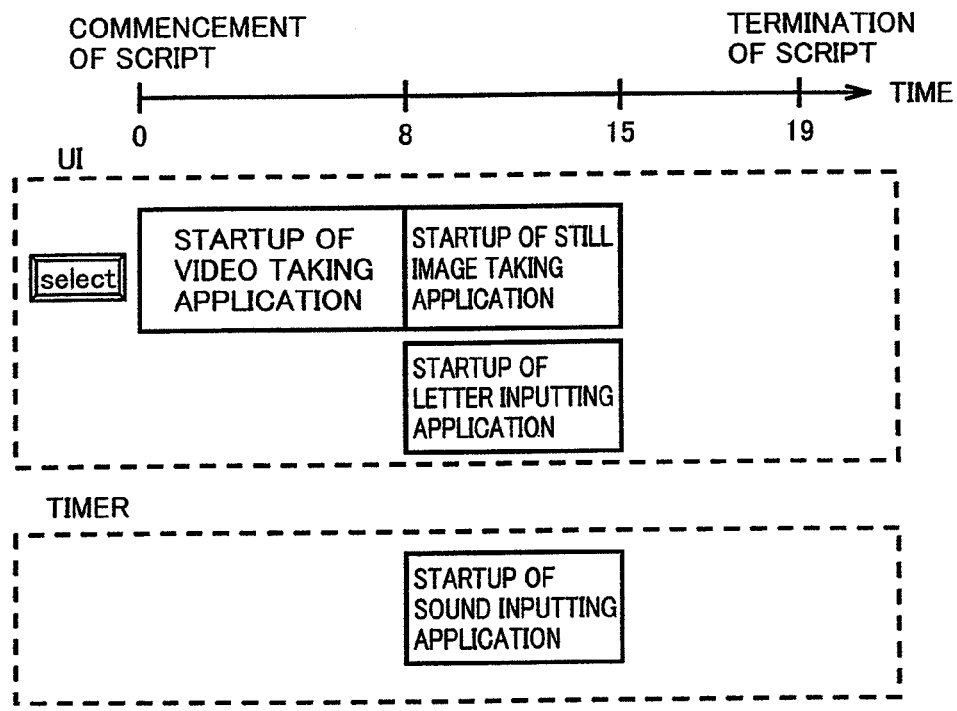
FIG. 11 is a diagram showing a concrete example of an event processing time table.
Figure 12:
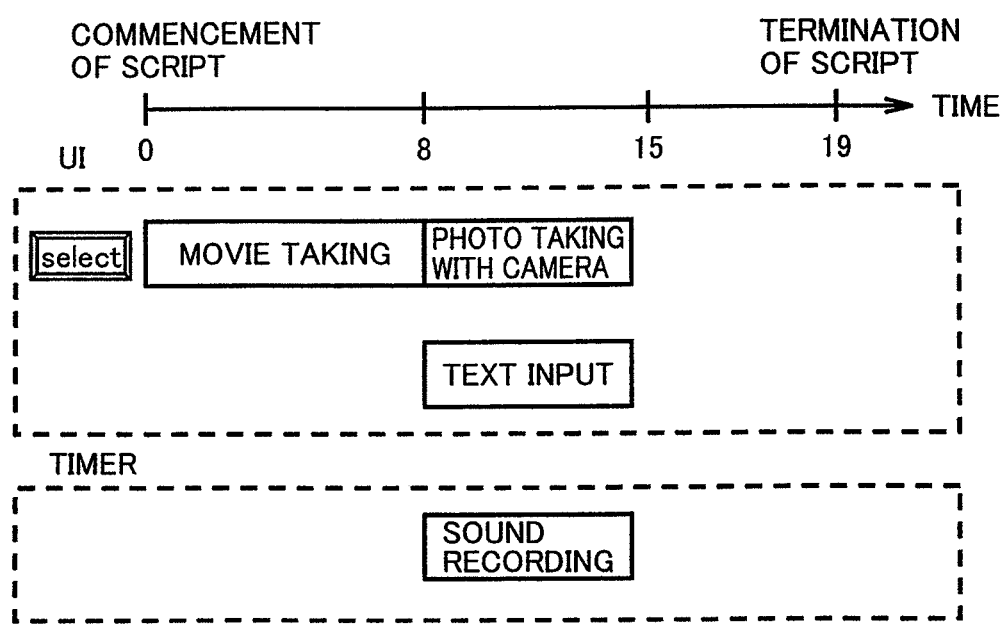
FIG. 12 is a diagram showing a concrete example of a UI allocation state displaying time table.

Next, in step S15, time managing unit 1314 prepares timetables, as shown in FIGS. 10 to 12, on the basis of the results of syntax analysis. FIG. 10 is a diagram showing a concrete example of a timetable of a media drawing process that has been prepared on the basis of the drawing information describing portion of the script shown in FIGS. 6 and 7, and FIGS. 11 and 12 show concrete examples of an event processing timetable and a UI allocation state displaying timetable, which have been prepared on the basis of the user navigation information describing portion of the script shown in FIGS. 6 and 7. That is to say, in step S15, time managing unit 1314 prepares correspondence between script implementation time and media data that is reproduced at this time, correspondence between script implementation time and a process in accordance with the event that has occurred at this time, and correspondence between script implementation time and allocation of UI's which are operated at this time in timetable style, as shown in FIGS. 10 to 12, on the basis of the script that has been analyzed in step S14.

Concretely speaking, the timetable of a media drawing process shown in FIG. 10 is a timetable showing that animated image 1 (FirstImage.mpg), text 1 (FirstText.txt) and music 1 (FirstSound.smf) are reproduced from 0 to 8 seconds after the start of the implementation of the script, text 2 (SecondText.txt) is reproduced from 8 to 15 seconds after the start of the implementation of the script, and still image 3 (ThirdImage.jpg), text 3 (ThirdText.txt) and music 3 (ThirdSound.smf) are reproduced from 15 to 19 seconds after the start of the implementation of the script on the basis of the drawing information describing portion of the script shown in FIGS. 6 and 7.

Here, in the case where a text that is included in a script and a text that is inputted by the user is displayed so as to be overlapped with other images or videos in the same region, it is preferable to automatically adjust attributes such as color, font and the like, in order to enhance the visibility of the text. The simplest implementation of such an automatic adjustment is obtained by using the complementary color (color that has the complement of one of each component value of RGB of the background as an RGB component) of the color attributes of the background as the color attributes of the text, in the case where the distance $\sqrt{((\Delta R)^2+(\Delta G)^2+(\Delta B)^2)}$ of the color attributes between the text and the background is smaller than the predetermined threshold value when concrete expressions of the color attributes are made by a combination of three values of RGB.

In addition, the event processing timetable shown in FIG. 11 is a timetable that shows that an animated image taking application that is image taking program 133 starts up when the select key is operated between 0 and 8 seconds after the start of the implementation of the script, a screen for selecting one of an animated image taking application that is, for example, image taking program 133 and a letter inputting application that is text editing program 139 is displayed on display 144, and a program that is selected from among these starts up when the select key is operated between 8 and 15 seconds after the start of the implementation of the script, and a sound inputting application that is sound data recording program 136 starts up by means of a timer between 8 and 15 seconds after the start of the implementation of the script, on the basis of the user navigation information describing portion of the script shown in FIGS. 6 and 7.

In addition, the UI allocation state displaying timetable shown in FIG. 12 is a timetable showing that display 144 displays "take movie" as the description of the select key, in order to show the user that the animated image taking application that is image program 133 starts up when the select key is operated between 0 and 8 seconds after the start of the implementation of the script, display 144 displays "take image with camera," "input text" as the description of the select key, in order to show the user that either the animated image taking application that is image taking program 133 or a letter editing application that is text editing program 139 starts up when the select key is operated between 8 and 15 seconds after the start of the implementation of the script, and display 144 displays "recording" as the description of startup by means of the timer, in order to show the user that a sound inputting application that is sound data recording program 136 starts up by means of the timer between 8 and 15 seconds after the start of the implementation of the script.

Next, in step S16, implementation controlling unit 1313 implements the script on the basis of the results of the syntax analysis and the timetable. In addition, at the time of the implementation of the script, implementation controlling unit 1313 instructs UI contents displaying program 132 to display the UI that varies along the time of implementation of the script on display 144 on the basis of the UI allocation state displaying timetable. Here, the process for implementing the script is described below, by citing concrete examples using as a base the script that is shown in FIGS. 6 and 7.

Then, when, in step S17, event managing unit 1315 detects the occurrence of an event (YES in S17), in step S18, a process that corresponds to this event is carried out in implementation controlling unit 1313. Here, the process that corresponds to the event is described below, by citing a subroutine.

The events that are detected in step S17 are primarily divided into three types, system events that are terminal reaching events where the implementation of the script reaches the terminal of the implementation time at the time when the script is implemented chronologically, stable inputting events for implementing a stable process, such as indication of a menu display, and script definition inputting events that indicate link shift, application startup, display of help or the like. Concretely speaking, inputs of indications by the user or the like from key code inputting device 142 and the like during the implementation of the script correspond to stable inputting events and script definition inputting events. Therefore, the implementation of the script is continued until certain events, such as inputs of an indication from key code inputting device 142, occur during the implementation of the script.

At this point, reproducing and editing processing of the script in cellular phone 1 is completed.

Here, in the case where the above-described reproducing and editing processing is interrupted by a conversation program or the like during processing, or is discontinued for the convenience of the user or as a result of depletion of the battery, the script during reproducing and editing and the script during modification are stored in memory unit 130 so that processing can be discontinued, and it is preferable for the configuration to, at the time when it is later resumed, allow the script during reproduction and editing and the script during modification to be read out from memory unit 130 so as to be resumed from the point during reproduction and editing where it was stopped.

Figure 79:
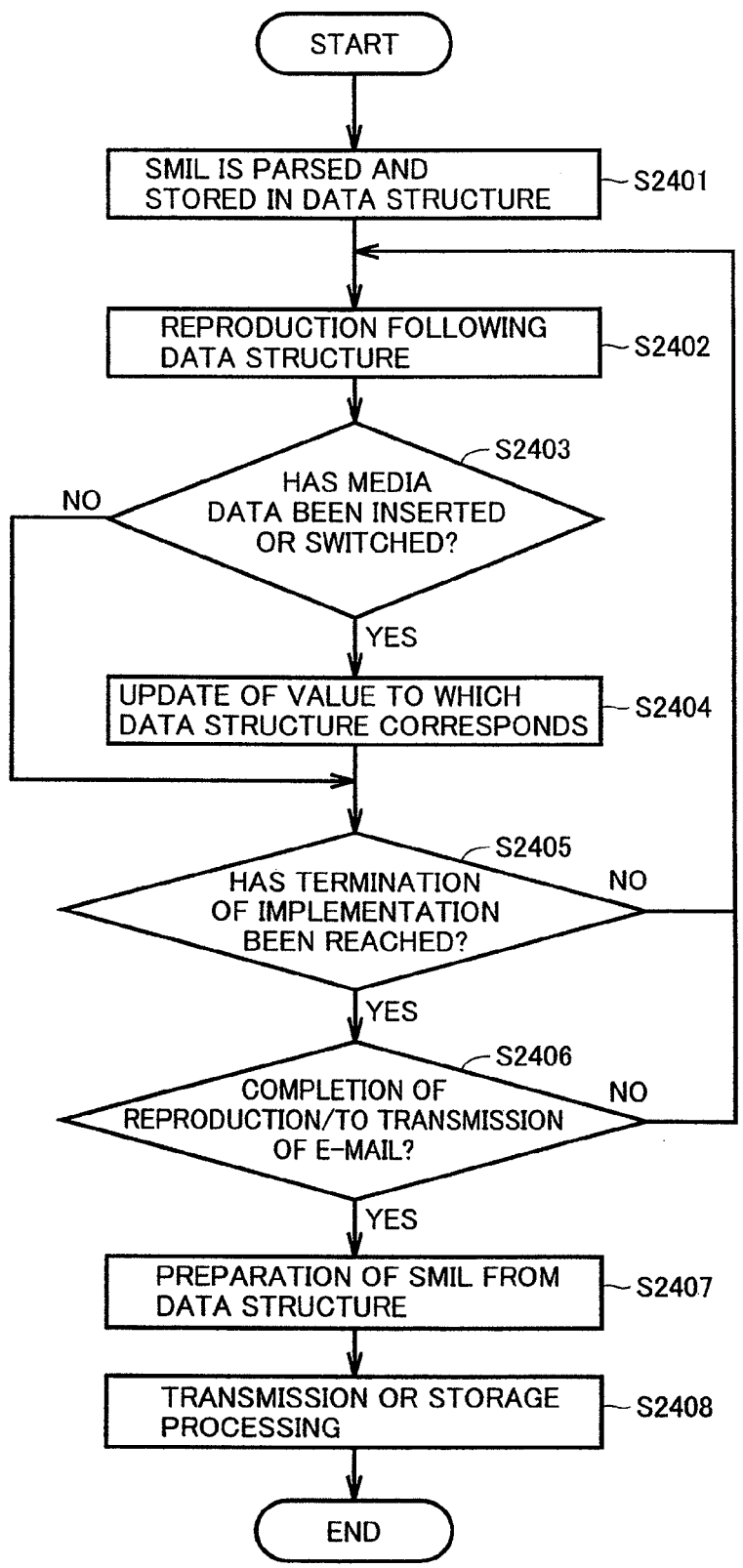
FIG. 79 is a flowchart showing the flow of reproducing and editing process in the case where a script is described with SMIL.

Furthermore, reproducing and editing processing in the case where the script is written in SMIL (Synchronized Multimedia Integration Language) is concretely described using the flowchart of FIG. 79.

With reference to FIG. 79, first, the script that is written in SMIL included in the template is analyzed (parsed) so as to be stored in the data structure (S2401).

FIGS. 80A and 80B show a concrete example of a data structure where the results of analysis are stored in step S2401. As shown in FIG. 80B, in step S2401, an instance in the DisplayContent class for holding attribute values, such as types of media, file names and display regions, is prepared for each piece of media data of which the reference information is described in the script and referred to, and the instances are unified into a set, which is then managed in DisplayScheduler shown in FIG. 80A.

Furthermore, the results of analysis of the script in step S2401 are shown in FIG. 81. FIG. 81 concretely shows the results of the analysis of the script shown in FIGS. 6 and 7, and 11 instances in the DisplayContent class are prepared as the results of analysis of the script. This number indicates the number of pieces of media data which are referred to from reference information that is finally described in this script.

Here, the files of the media data (Mediafile) designated by instances 5, 6 and 7 from among these 11 instances are empty, and show that the initial condition shown in FIGS. 6 and 7 is a condition where the corresponding media data is not referred to. The reference information is described by accepting the designation of the media data in the below described editing process, and the media data is referred to. Alternatively, a guidance can be display by designating a predetermined file. In the case where instance 5 is cited as an example, the action contents have been found by analysis to be image taking and insertion by means of the startup of a camera, and thus, the illustration image of the camera is displayed as guidance by designating the illustration image of the camera (camera.jpg). In addition, in a simpler manner, a letter sequence which is the value of EvDesc (such as "startup of camera") may be displayed in the bottom line of the screen as a guidance display.

Then, this script is reproduced (S2402) while following the data structure as shown in FIGS. 80A and 80B.

In the case where a process for insertion and switching of media data is carried out as described below (YES in S2403), the corresponding value is updated (S2404) in the data structure that stores the results of analysis in step S2401. Here, rewriting processes, such as processes for insertion and switching of media data are described in detail below.

FIG. 82 shows a concrete example of the results of analysis of the script that has been updated in step S2404. The results of editing shown in FIG. 82 are the results where rewriting processing has been carried out on the script shown in FIGS. 6 and 7 in the initial condition shown in FIG. 81. Concretely speaking, a case is shown where the above-described rewriting processing is carried out and media data "CameraPict01.jpg" "EditText01.txt" and "Voice01.amr" are added to the script in the initial state, and these pieces of reference information are described in corresponding instances 5, 6 and 7. Here, the file name is prescribed on the script side on the basis of image data "FirstImage.mpg," and therefore, the movie file that is obtained as a result of the taking of a movie is also stored under this name. That is to say, the substance of the file is rewritten and updated without the file name being rewritten.

The processes of steps S2402 to S2404 are repeatedly carried out (NO in S2405) until the implementation of this script has reached the termination, and when the implementation reaches the termination (YES in S2405), the reproducing processing of the script is completed, and whether or not the script is transmitted by being attached to an e-mail is determined (S2406).

In the case where insertion of media data or editing of a script, such as inserted and switching process of media data, are not completed (NO in S2406), the process is returned to step S2402, and the implementation of this script is reproduced from the beginning.

Meanwhile, in the case where editing is completed and the script is transmitted by being attached to an e-mail (YES in S2406), the script that is written in SMIL is generated from the data structure shown in FIG. 82 (S2407). Then, the script that is written in SMIL and has been generated in step S2407 is transmitted by being attached to an e-mail, or is stored (S2408). Here, the process for attachment to an e-mail in step S2408 is also described below.

FIG. 83 shows a concrete example of a script that is transmitted in step S2408. The script shown in FIG. 83 is a script on which rewriting processing is carried out so that media data such as image data, text data and sound data are added to the script in the initial state shown in FIGS. 6 and 7, and, concretely speaking, the underlined portions in FIG. 83 are reference information of media data that has been inserted by means of a rewriting process.

In addition, at the time when a script is transmitted, the editing function that is a user navigation information describing portion may be deleted and transmitted. The script shown in FIG. 84 is a script that is obtained by carrying out rewriting processing for adding media data such as image data, text data and sound data to the script in the initial state shown in FIGS. 6 and 7, and by subsequently deleting the editing function, and, concretely speaking, the definition portion of the action contents described in <action id= . . . > and the portion that corresponds to the event and the action to each other described in <event ref= . . . > has been deleted. This is shown in FIG. 84 by underlining.

Here, when the script written in SMIL is read out from the data structure shown in FIG. 82 in step S2407 so as to generate the script shown in FIG. 84, the attributes concerning Event and Action, which are included in the data structure, are ignored in the case where the editing function is deleted. Alternatively, though in the case where the script that includes the editing function is written out, "insert" has been designated as the action contents (Act Type="insert"), the reference information of media data has already been described as a result of the above-described process, and therefore, the action contents are changed to "replace" (Act Type="replace"). This is shown in FIG. 83 by underlining.

Figure 13:
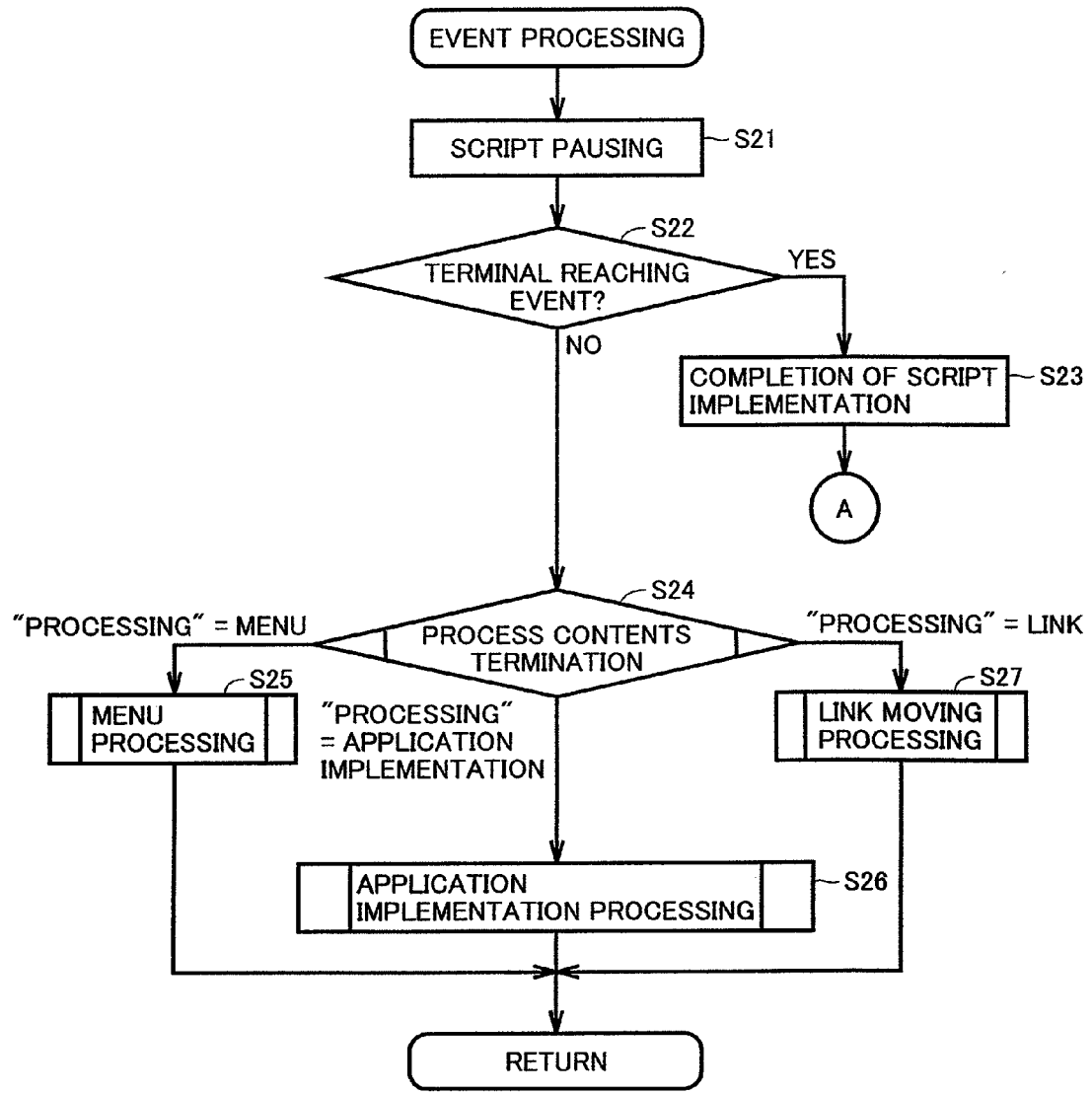
FIG. 13 is a flowchart showing a process in accordance with the event that is implemented in step S18.

Next, a process that corresponds to the event that is carried out in step S18 is described using the flowchart of FIG. 13.

With reference to FIG. 13, implementation controlling unit 1312 pauses the script that is implemented in step S21 when detection information of the occurrence of the event is received from event managing unit 1315 in step S17.

Then, in the case where the event that has been detected in step S17 is an event that indicates that the implementation of the script has reached the termination of the implementation (YES in S22), implementation controlling unit 1313 completes the implementation of this script in step S23, and the process returns to step S16 of FIG. 9, so that the implementation of the script is started again. That is to say, the implementation of the script is returned to the beginning of the implementation again, and the implementation of the script is repeated from the start. Here, though in the present embodiment, the script that is included in the acquired template is repeatedly implemented, the implementation of the script may be completed after this has been implemented one or more predetermined times. Alternatively, choices as to whether the implementation of the script is to be repeated or completed are proposed on the screen so that the repetition or the completion of the implementation of the script may be instructed through input by the user by means of, for example, button operation.

In the case where the event that has been detected in step S17 is an event other than the event that shows the implementation of the script has reached the terminal of the implementation (NO in S22), implementation controlling unit 1313 determines process contents in step S24 on the basis of the event that has been detected, and carries out the determined process in steps S25 to S27. Here, the process for determining the process contents in step S24 and the respective processes shown in steps S25 to S27 are described below by citing the respective flowcharts.

At this point the process that corresponds to the event in step S18 is completed, and the process is returned to the reproducing and editing process shown in the flowchart of FIG. 9.

Next, the process of determining the process contents in step S24 is described with reference to the flowchart of FIG. 14.

Figure 14:
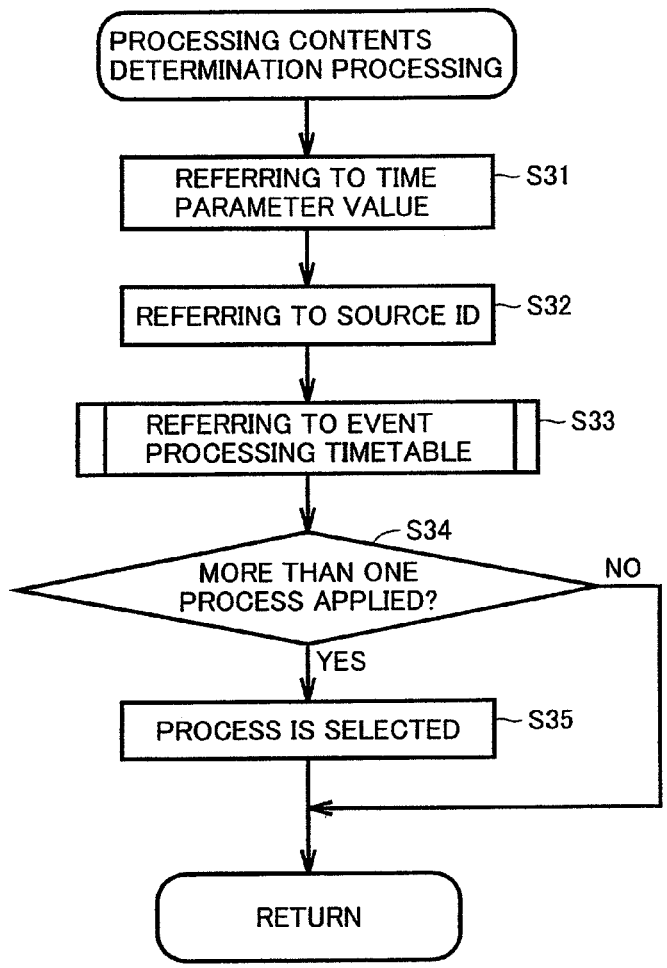
FIG. 14 is a flowchart showing a determining process of the process contents in step S24.

With reference to FIG. 14, when the occurrence of an event is detected in step S17, implementation controlling unit 1313 refers to the time parameter value (S31) at this time, that is to say, the parameter that represents the time of implementation of this script, the source ID (S32), that is to say, the identification information of the origin from which the event occurs, and the event occurrence processing timetable (S33) that is prepared by time managing unit 1314, and thereby, determines the event that has occurred. Furthermore, the processing contents that are made to correspond to this event at the time of the occurrence of the event are determined from the determined event and the event occurrence processing timetable. Here, in the case where two or more processes are determined (YES in S34), implementation controlling unit 1313 displays a screen for selection on display 144 or the like in step S35, and accepts the selection of the process that is started from the present time from among the two or more processes. In the case where, for example, "invoke camera" and "local folder" are proposed to the list that is displayed on the screen for selection, as shown in FIG. 54A, and "invoke camera" is selected, the camera is started up, and in the case where "local folder" is selected, as shown in FIG. 54B, the data folder is accessed.

Alternatively, a configuration may be provided where, in step S35, implementation controlling unit 1313 may implement all of the determined two or more processes sequentially, one by one. In such a case, the processes are implemented in the order in which the schedule descriptions of the events that correspond to these processes appear. Concretely speaking, when time between the $8^{th}$ and $15^{th}$ second in the script of FIG. 7 is cited as an example and in the case where the select key is pressed, "startup of camera" which is described in line 28 in accordance with the order of descriptions is first implemented, and after that, "text input" that is described in line 29 is implemented. Here, the priority order of the implementation of the two or more processes is described in the script so that the two or more processes may be implemented sequentially following this order in the configuration.

Alternatively, in step S35, in the case where there is a shortcut means for respectively implementing the two or more processes, the process that corresponds to the shortcut means designated by the user may be directly implemented in the configuration. Concretely speaking, when the time between the $8^{th}$ and $15^{th}$ second in the script of FIG. 7 is cited as an example, in the case where the key for starting up the camera is pressed down, "camera startup" that is described in line 28 is implemented, while in the case where the key for text input is pressed down, "text input" that is described in line 29 is implemented, in the configuration.

At this point, the process that corresponds to the event in step S24 is completed, and the process returns to the event processing that is shown in the flowchart of FIG. 13.

Figures 27, 28:
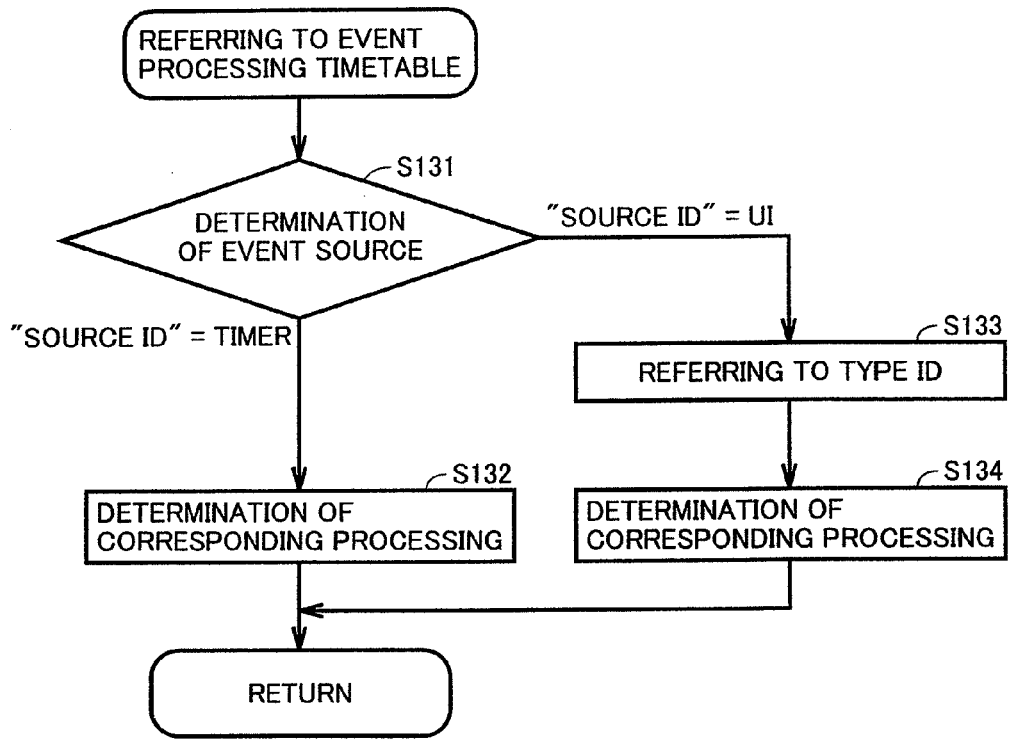
FIG. 27 is a flowchart showing an event time table referring process in step S33.
FIG. 28 is a diagram showing a concrete example of a table that prescribes correspondence between logic symbols and hardware keys.

Furthermore, reference to the event timetable in step S33 is described using the flowchart of FIG. 27.

With reference to FIG. 27, in the case where the referred source ID is "Timer" ("source ID"=TIMER in S131), the corresponding processes are determined with reference to the column of "Timer" in the event processing time table and the time parameter value (S132).

Meanwhile, in the case where the referred source ID is "UI" ("source ID"=UI in S131), the column of the UI in the event processing timetable, type ID, that is to say, the identification information inherent to the key that is operated at the time of the occurrence of the event and the time parameter value are referred to (S133), and the corresponding processes are determined (S134).

Here, the identification information of the hardware key of the terminal may be directly utilized as the identification information inherent to the above-described key that is described in the event processing timetable and the script, or the logic symbol may be utilized in a manner where, as shown in FIG. 28, the table that prescribes the correspondence between the logic symbol and the hardware key is stored in advance in memory unit 130 of cellular phone 1, and implementation controlling portion 1313 may read out this table at the time when the event timetable is referred to so that the logic symbol is referred to from the operated hardware key, and thereby, the event may be determined.

At this point, reference to the event timetable in step S33 is completed, and the process returns to the process contents determining process shown in the flowchart of FIG. 14.

Figure 15:
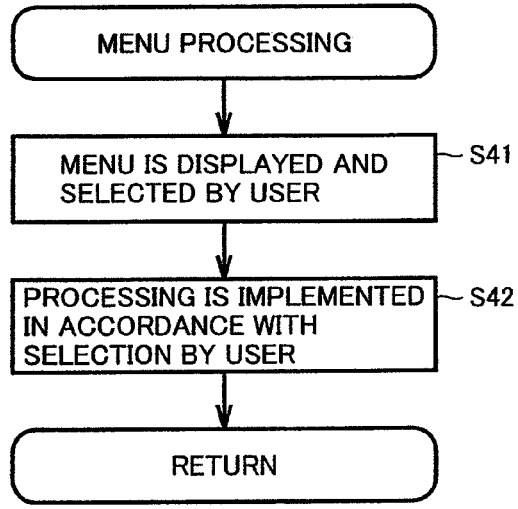
FIG. 15 is a flowchart showing a menu process in step S25.
Figure 16:
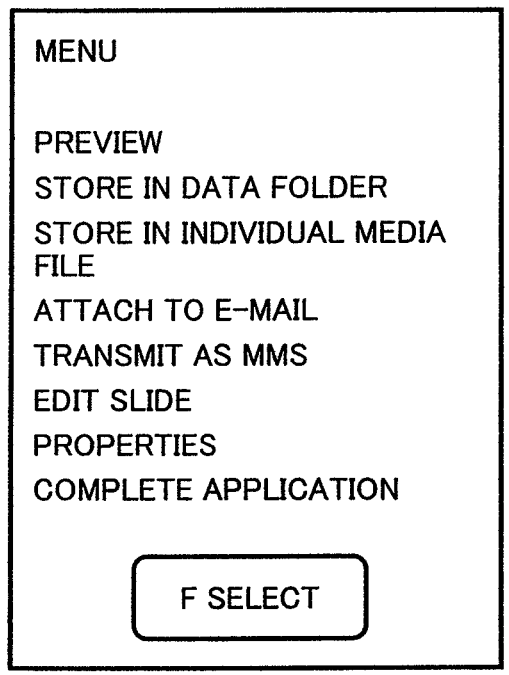
FIG. 16 is a diagram showing a concrete example of a menu screen.

In the case where the event of which the occurrence is detected in step S17 is determined to be an event that implements the menu processing in the above-described process, the process shown in FIG. 15 is implemented in step S25. That is to say, with reference to FIG. 15, first, implementation controlling unit 1313 displays a menu screen as shown in FIG. 16 on display 144 in step S41, and accepts the selection of the user. Concretely speaking, with reference to FIG. 16, selections from among the preview processing of this script, storage processing in a data folder, a process for storing media data that is referred from this script in an individual media file, a process for attaching this script and media data to an e-mail, a process for transmitting this script and media data to an MMS (Multimedia Messaging Service), a process for editing the slide during reproduction of this script, a process for displaying the properties of this script, a process for completing the application and the like are accepted. Then, in step S42, the process that corresponds to the selection of the user is implemented. Here, the slide represents a portion of the script that is implemented in parallel as described in lines 20 to 25 in FIG. 7. That is to say, the script that is shown in FIG.

7 is formed of three slides of lines 20 to 25, lines 26 to 31 and lines 32 to 36, which are reproduced sequentially.

Figure 36:
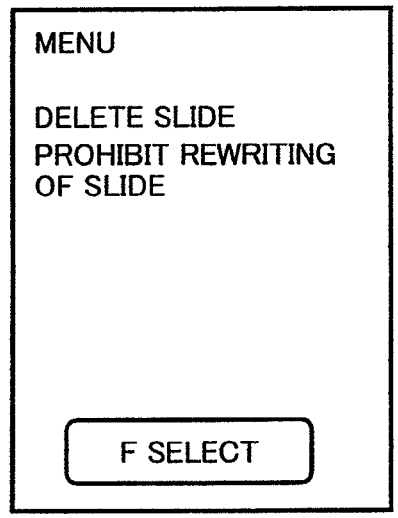
FIG. 36 is a diagram showing a concrete example of a menu screen at the time of the slide eliminating process.

Furthermore, in the case where "slide editing" is selected in a menu screen, as shown in FIG. 16, implementation controlling unit 1313 displays a menu screen for editing slides, as shown in FIG. 36, on display 144 in step S41, and accepts a selection of a slide deleting process or a slide rewriting prohibiting process.

Here, whether slide editing is permitted or prohibited is described in the script, and in the case where it is prohibited, slide editing may not be carried out without proposing choices of the above-described slide editing in the configuration.

Figure 69:
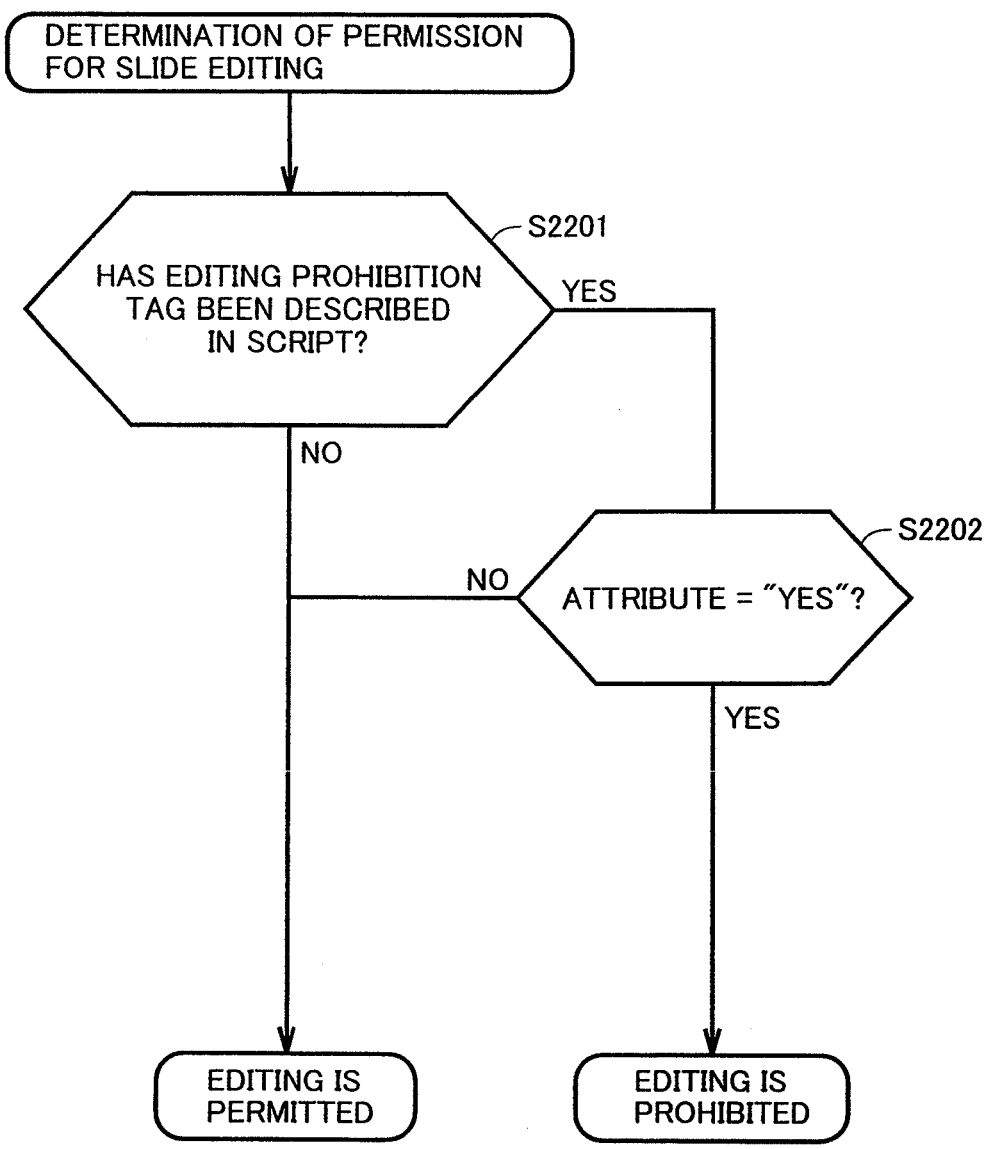
FIG. 69 is a flowchart showing a process for determining permission for implementing slide editing in step S42.

Concretely speaking, an example of a script where whether such slide editing is permitted or prohibited is described is shown in FIG. 68, and the process of determining a permission that implements editing of slides in step S42 is described using the flowchart of FIG. 69. That is to say, with reference to FIG. 69, in the case where meta-description (name="readOnly"), which is edition prohibition, as shown in line 4 of FIG. 68 is described in the script (YES in S2201), the attributes (contents) that describe the prohibition are referred to. Then, in the case where the attributes are "yes" (YES in S2202), editing of the slide is prohibited in step S42. Meanwhile, in the case where the attributes are not "yes" (NO in S2202), editing of the slide in step S42 is permitted. In addition, even in the case where there is no meta-description of editing prohibition from the start in this script (NO in S2201), editing of the slide is permitted in step S42.

At this point, the descriptions of the slide editing permission determination are completed, on the basis of concrete examples.

Figure 35:
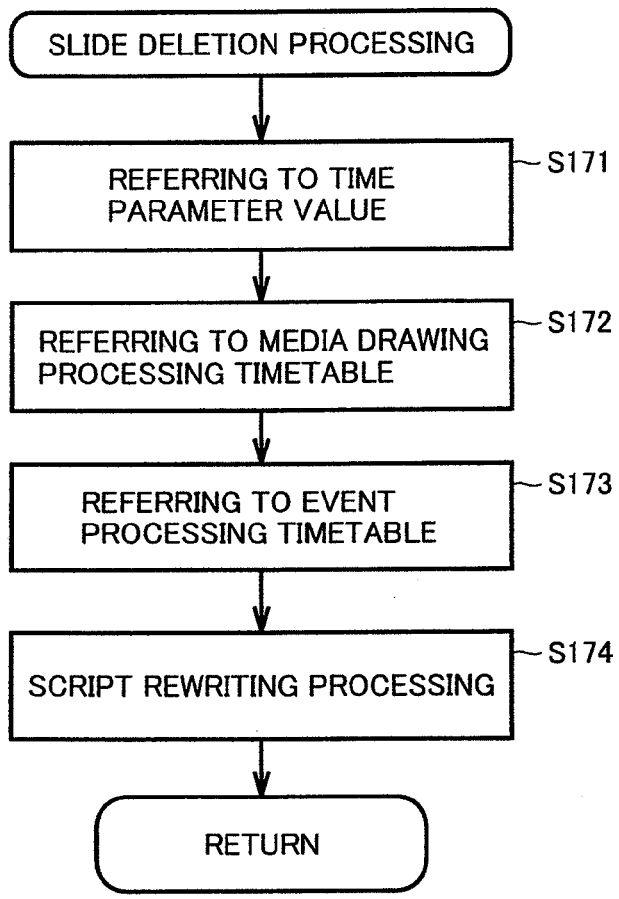
FIG. 35 is a flowchart showing a slide eliminating process of a script in cellular phone 1.

In addition, the process in step S42 in the case where slide deleting is selected on a menu screen for slide editing as shown in FIG. 36 in step S41 is described using the flowchart of FIG. 35.

With reference to FIG. 35, when a process for deleting the slide during reproduction of this script is selected in step S41, implementation controlling unit 1313 refers to the time parameter value at this time, a media drawing processing timetable and the event processing timetable (S171 to S173), and determines the media drawing processing and the event processing that are effective at this point in time. Then, the schedule describing portion of the media drawing processing and the event processing that have been determined to be effective at this point in time is deleted from the script, and thus, this script is rewritten (S174).

At this point, the process in step S42 in the case where the process of deleting the slide is implemented is completed, and the process returns to the menu process shown in the flowchart of FIG. 15.

Figure 37:
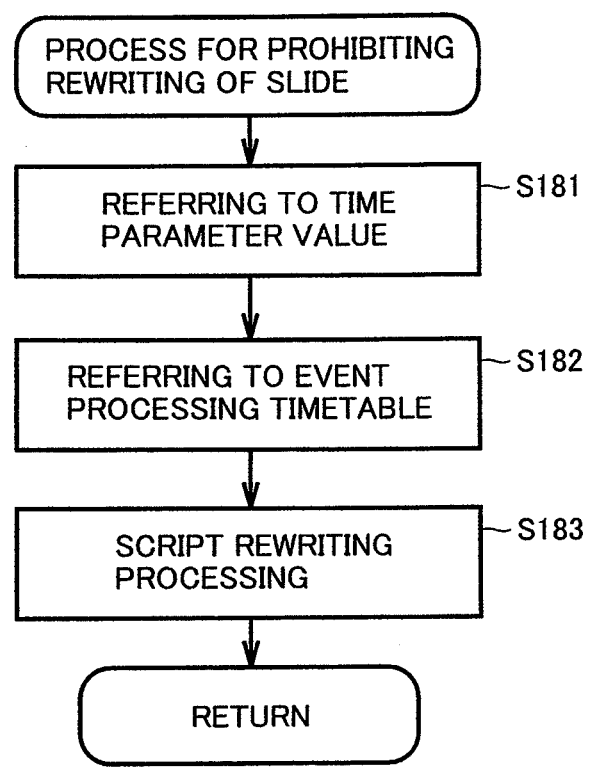
FIG. 37 is a flowchart showing slide rewriting prohibition process of a script in cellular phone 1.

In addition, the process in step S42 in the case where slide rewriting prohibition is selected on a menu screen for slide editing as shown in FIG. 36 in step S41 is described using the flowchart of FIG. 37.

With reference to FIG. 37, when the rewriting prohibition process in the slide during reproduction of this script is selected in step S41, implementation controlling unit 1313 refers to the time parameter value at this time and the event processing timetable (S181 and S182), and the event processing that is effective at this point in time is determined. Then, the schedule describing portion of the event processing that has been determined to be effective at this point in time is deleted from the script, and then, this script is rewritten (S183).

At this point, the process in step S42 in the case where rewriting of the slide is prohibited is completed, and the process returns to the menu process shown in the flowchart of FIG. 15.

Figure 17:
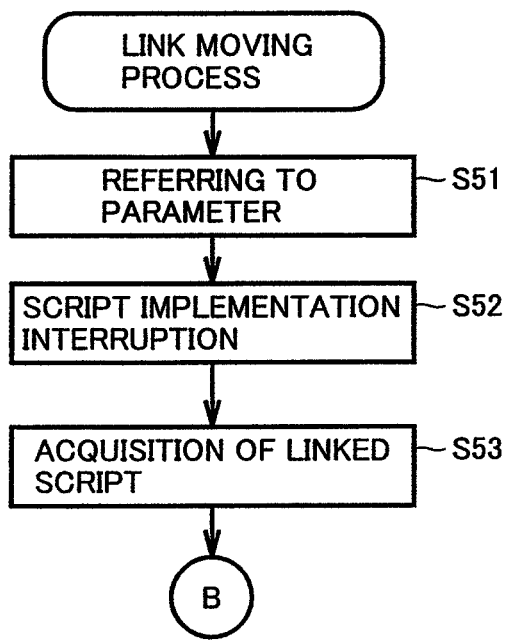
FIG. 17 is a flowchart showing a link transfer process in step S27.

In addition, in the case where the event of which the occurrence has been detected in step S17 is determined to be an event that implements a link shifting process, in the above-described process, the process shown in FIG. 17 is implemented in step S27. That is to say, with reference to FIG. 17, first, in step S51, implementation controlling unit 1313 refers to the parameter that indicates the script that is linked which is included in the script, and interrupts the implementation of this script in step S52. Then, in step S53, the script that is linked is acquired on the basis of the parameter that is referred to in step S51. After that, the process is returned to step S13, where the process shown in FIG. 9 is implemented, and the acquired script is read out so as to be implemented in the same manner.

Figure 18:
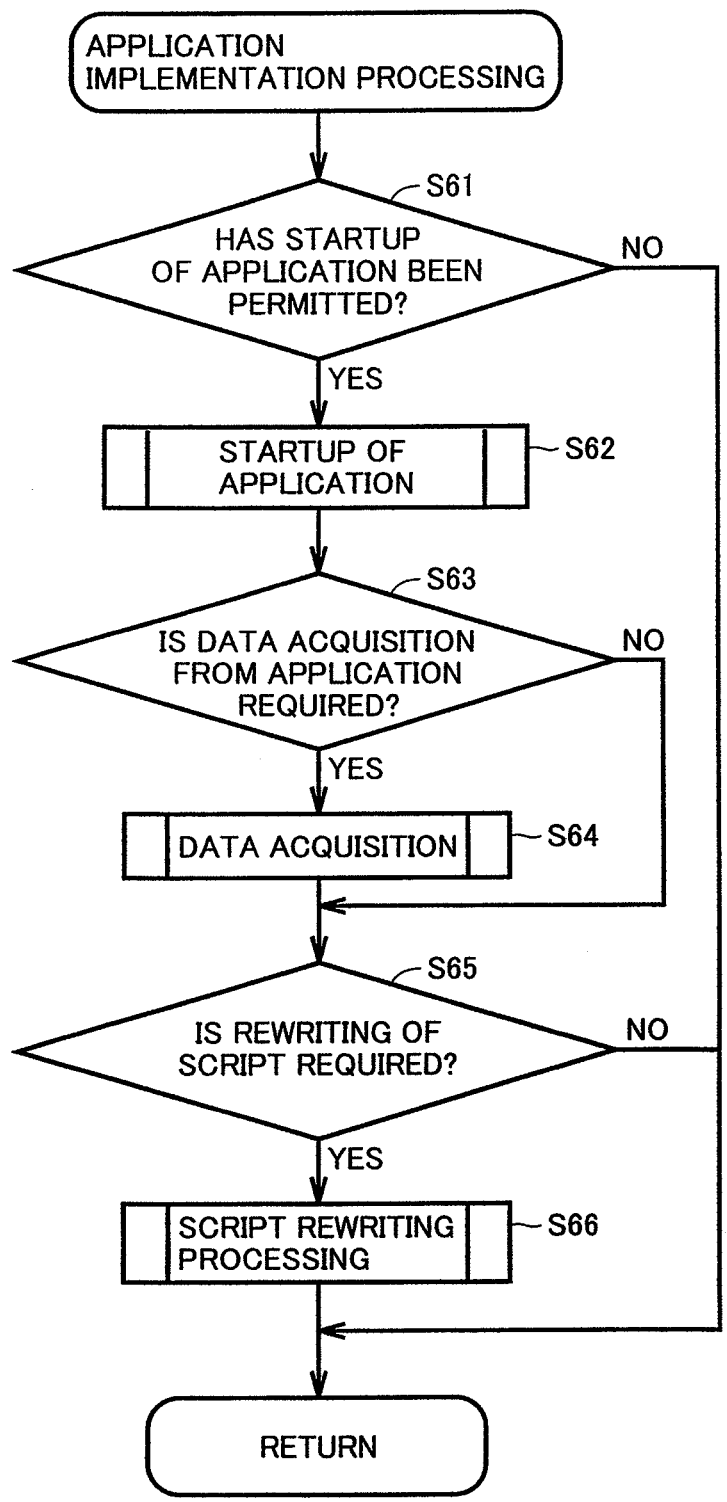
FIG. 18 is a flowchart showing an application implementing process in step S26.

In addition, in the case where the event of which the occurrence is detected in step S17 is determined to be an event that implements an application implementing process in the above-described process, the process shown in FIG. 18 is implemented in step S26. That is to say, with reference to FIG. 18, first, implementation controlling unit 1313 displays a screen for selecting whether or not the application is to be started up on display 144. In the case where startup of the application is selected (YES in S61) implementation controlling unit 1313 starts up a predetermined application in step S62. Next, in the case where predetermined data needs to be acquired from this application (YES in S63), this data is acquired in step S64. Then, in the case where this script which is being implemented needs to be rewritten (YES in S65), script writing unit 1316 implements a writing process of the script in step S66.

Furthermore, implementation controlling unit 1313 resumes the reproduction of the script after the completion of the above-described process of script rewriting. The reproduction of the script can be started at the point in time when the reproduction of the script is started, at the point in time when the script is reproduced at this point in time, or at the point in time when the rewritten section is started. Any of the above-described configurations may be provided, or the configuration may allow a user to select from among the above-described choices.

Here, the above-described point in time of resumption may be determined dynamically in accordance with a predetermined rule that has been set in this terminal. In the same manner, time of reproduction of the script or other times concerning the reproduction, such as the point in time of completion, may be determined. In the following, a process for determining the point in time of resumption of the script reproduction in accordance with the rule "the script is resumed from the position of reproduction at the present time in the case where the remaining reproduction time of the script is 10 seconds or less, and the script is resumed from the point in time of the start of the script in other cases" is concretely described using the flowchart of FIG. 67.

Figure 67:
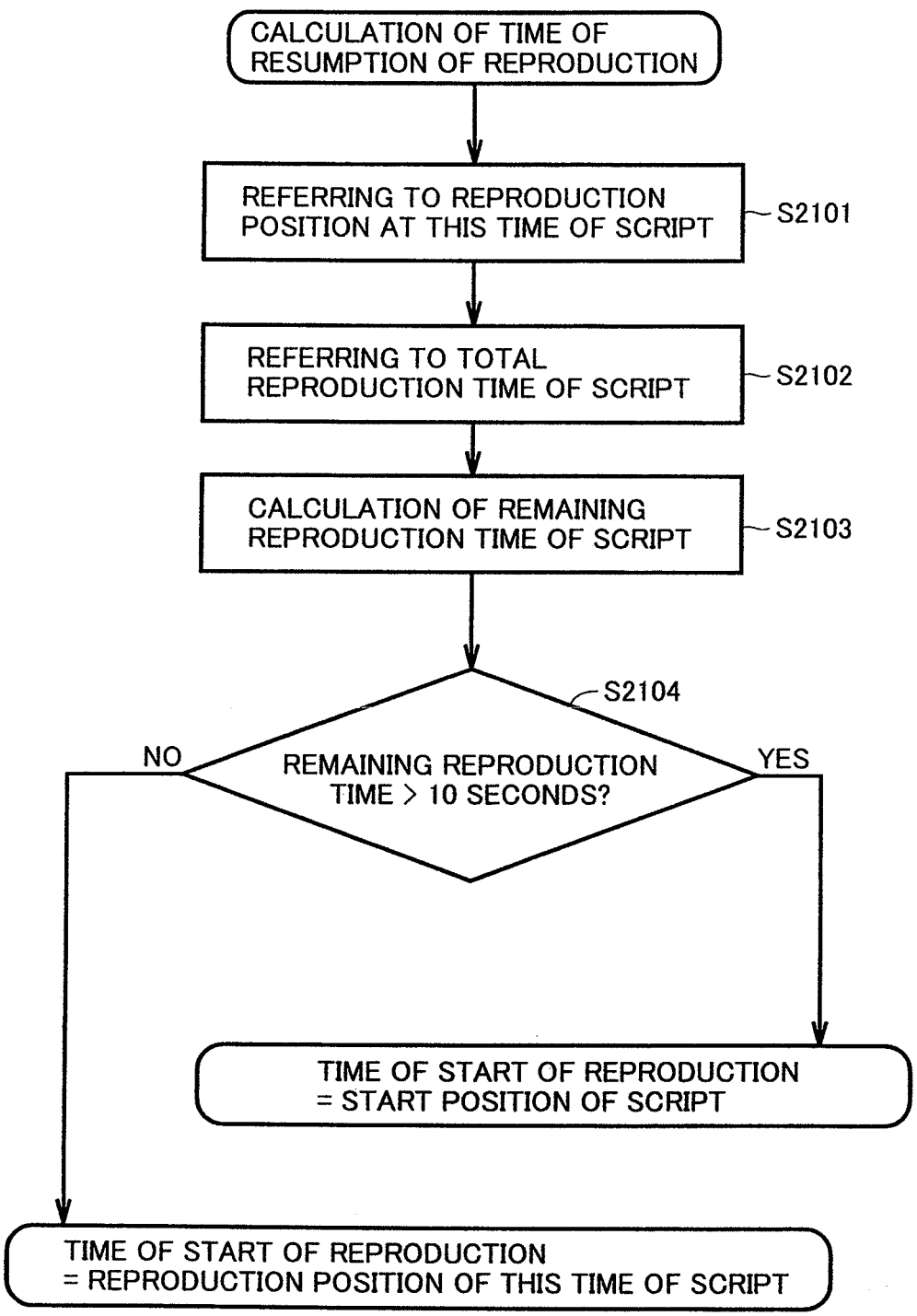
FIG. 67 is a flowchart showing a process for determining the point in time when script reproduction is resumed.

With reference to FIG. 67, first, implementation controlling unit 1313 refers to the present position of reproduction of the script (S2101). This point of reproduction indicates the point of reproduction at the point in time when the script is paused in step S21.

Next, implementation controlling unit 1313 refers to the total time of reproduction of the script (S2102). The total time of reproduction of the script is acquired from the schedule describing portion of the script. In the case where the script is the one shown in FIG. 7, for example, in step S2102, the sum of the reproduction time of lines 20 to 25, lines 26 to 31 and lines 32 to 36, which are chronologically implemented, is calculated in a manner where the total reproduction time of the script is acquired as 19 seconds.

Next, implementation controlling unit 1313 subtracts the present point of reproduction of the script from the total reproduction time of the script that has been acquired in step S2102, and thereby, the remaining reproduction time of the script is calculated (S2103).

Then, in the case where the remaining reproduction time of the script that has been calculated in step S2103 is 10 seconds or less (NO in S2104), implementation controlling unit 1313 sets the point in time of the start of the reproduction as the present point in time of the reproduction of the script. In other cases (YES in S2104) implementation controlling unit 1313 sets the point in time of the reproduction start as the point in time of the start of the script.

At this point, the descriptions of the process for determining the point in time of the reproduction of the concrete script reproduction are completed.

Figure 24:
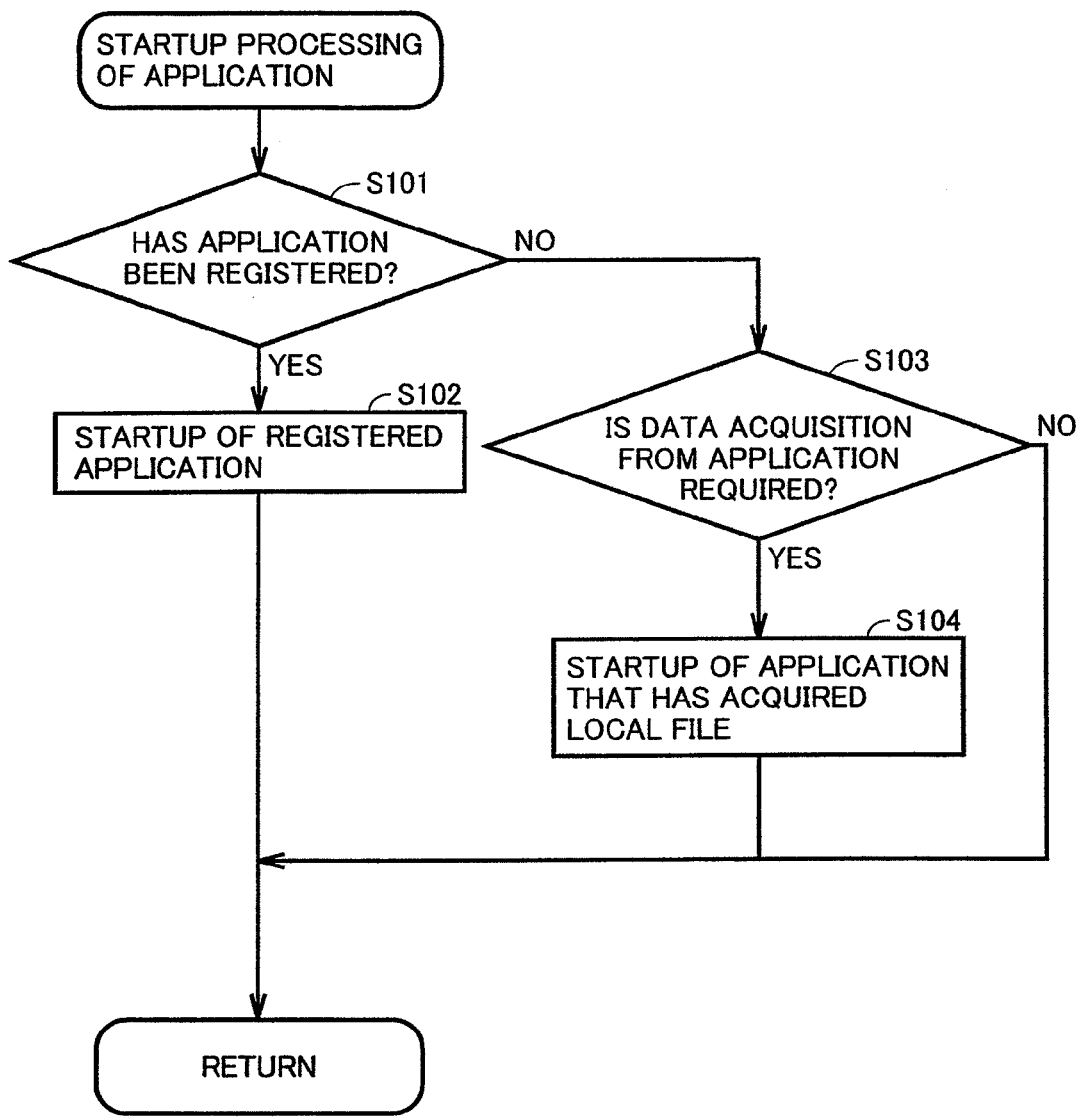
FIG. 24 is a flowchart showing an application startup process in step S62.

Next, the startup of the application in step S62 is described using the flowchart of FIG. 24.

With reference to FIG. 24, in the case where implementation controlling unit 1313 is started up (S102) using the reproduction time and the size of the region that have been described in the script as startup parameters in the case where a predetermined application is registered in memory unit 130 of cellular phone 1 (YES in S101). In the case where a predetermined application is not registered in memory unit 130 of cellular phone 1 (NO in S101), and in addition, in the case where data needs to be acquired from the application in this script (YES in S103), a local file acquiring application that is a file acquiring program 156 is started up (S104).

Here, in the case where a predetermined application is not registered in memory unit 130 of cellular phone 1 in step S101, a predetermined application is downloaded from server 2 via communication unit 110, and is stored in memory unit 130 of cellular phone 1, and then, the configuration may allow startup of the application.

Furthermore, the operation in step S102 is described in the following, using the flowchart of FIG. 66, by citing a case where the application that is started up is an image taking application as a concrete example.

Figure 66:
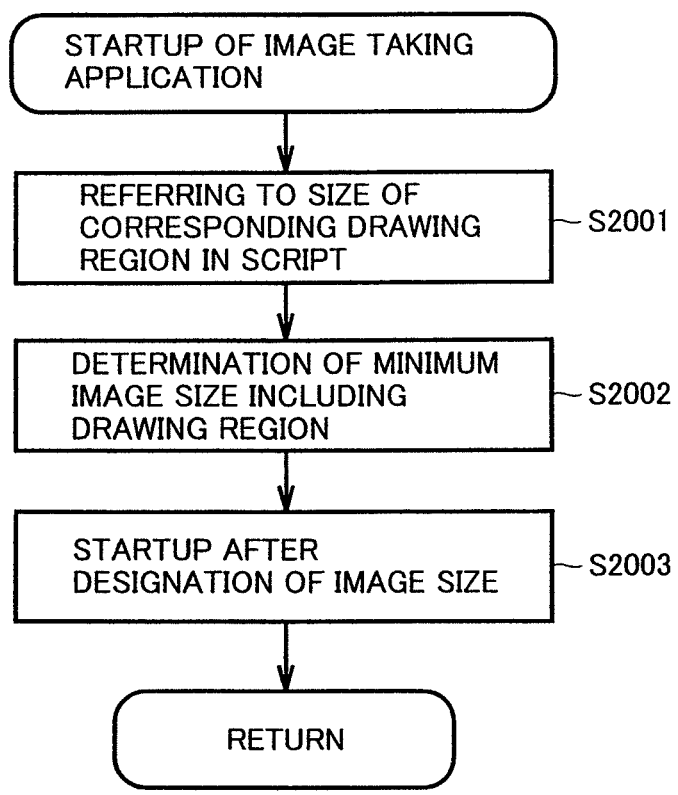
FIG. 66 is a flowchart showing an image taking application startup process in step S102.

With reference to FIG. 66, first, implementation controlling unit 1313 acquires the size of the drawing region on which replacing media data is displayed from the script (S2001). The size of the drawing region is generally described in the header portion of the script. Concretely speaking, when the script is assumed to be the one shown in FIG. 6, numeral values 176 and 120, which are designated as the width and the height of the drawing region, are acquired from the description in line 8 of FIG. 6.

Next, implementation controlling unit 1313 determines the minimum image size that can include this drawing region by means of this image taking application (S2002) on the basis of the size of the drawing region that has been acquired in step S2001. Concretely speaking, in the case where the image taking application can select width 600×height 480, width 120×height 160 or width 120×height 128 as the image size, it is determined in step S2002 that the image size width 600×height 480 can include the size of drawing region of width 176×height 120, in the concrete example.

Then, implementation controlling unit 1313 designates the image size in the image taking application at width 600×height 480 on the basis of the determination results in step S2002, and then, starts up the image taking application (S2003).

Here, in the case where the application that has started up is a sound recording application, recording can be carried out for the time that is described in the script, by carrying out the same process as the above-described process. In addition, in the case where the application that is started up is a file acquiring application, a file of which the size is greater than the remaining size can be utilized can be prohibited from being selected, so that the sum of the file sizes of the messages does not exceed the upper limit of the size that can be transmitted. In addition, in the case where the application that has started up is a file acquiring application that acquires animated images, a file of which the reproduction time is longer than the reproduction time that is described in the script can be prohibited from being selected.

At this point, the startup of the application in step S62 is completed, and the process returns to the process for implementing the application shown in the flowchart of FIG. 18.

Figure 25:
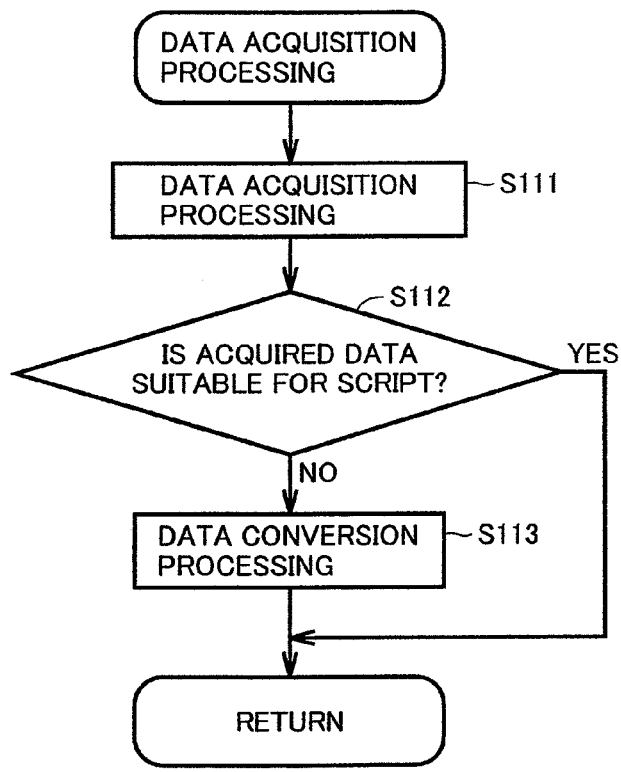
FIG. 25 is a flowchart showing a data acquiring process in step S64.

Next, the data acquisition in step S64 is described using the flowchart of FIG. 25.

With reference to FIG. 25, first, implementation controlling unit 1313 receives data from the application that is started up in step S62 (S111). Then, in the case where this acquisition data is not suitable for the reproduction time that is described in the script, and the size of the region (NO in S112), implementation controlling unit 1313 converts the acquisition data to one that is suitable for the description of the script (S113).

Here, in step S113, the reference information that has been described in advance in the script may be used to synthesize the media data that is referred to and the acquisition data, so as to generate a new script or media data. In the case where the acquisition data is media data having the reproduction time, this generation process can be described as follows, using FIGS. 56A to 56C.

Figures 56A, 56B, 56C:
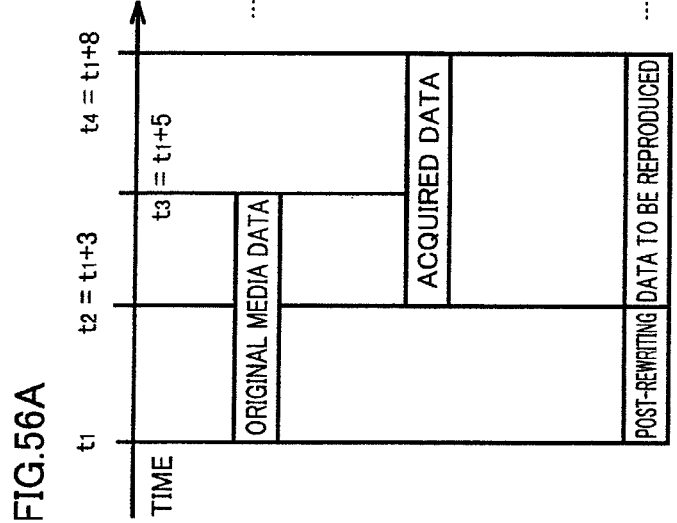
FIGS. 56A to 56C are diagrams showing an example where media data and acquired data which are referred from reference information of a script are synthesized at a point in time of a time parameter value of an event.

As shown in the upper portion of FIG. 56A and in FIG. 56B, in this concrete example, "original media data" has the reproduction time of 5 seconds, and is initially described so as to be reproduced from time t1. In addition, "acquisition data" is a video that has been taken for 5 seconds starting from time t2 (=t1+3), which is a time parameter value of the event that is referred to in step S31. In this case, when the user instructs the portion of "original media data" of which the reproduction time corresponds to the time when the acquisition data is being taken to be replaced with "acquisition data" by means of an appropriate user interface, the contents of "data that is reproduced after rewriting" and the time of reproduction become the data that is shown in the lower portion of FIG. 56A and in FIG. 56C. According to one method for implementing a process that obtains such effects, a predetermined portion of the original media data where the time of taking the acquisition data and the reproduction time overlap is stored by rewriting by means of image data taking and editing program 133 following the instruction of implementation controlling unit 1313. According to another implementation method, script writing unit 1316 that has received an instruction from implementation controlling unit 1313 generates and respectively writes out a script that expresses the time of a new start and the time of reproduction of the original media data and acquisition data. According to the latter implementation method, the script that is written out by script writing unit 1316 in the above-described concrete example becomes the script shown in FIGS. 56B and 56C. Here, it is preferable to indicate by means of an appropriate user interface whether or not the portion of the acquisition data between time t3 and time t4 which does not overlap with the original media data is added to the generated data.

Here, in step S113, new media data may be generated by, for example, taking out a portion of the acquisition data where a process for taking out only sound data from video data is carried out.

In addition, in step S112 and step S113, where the above-described process is carried out, in the case where the size of the memory region occupied by the acquisition data exceeds a predetermined value, a process for reducing the size of the data, such as reduction of the colors of the image data or reduction of the sampling rate of the sound data, may be carried out.

In addition, in step S112, where the above-described process is being carried out, in the case where the acquisition data is not suitable for the description of the script, predetermined media data (default data) that is stored in memory unit 130 of cellular phone 1 may be utilized in place of the acquisition data.

At this point, the data acquisition in step S64 is completed, and the process returns to the process of application implementation shown in the flowchart of FIG. 18.

Figure 26:
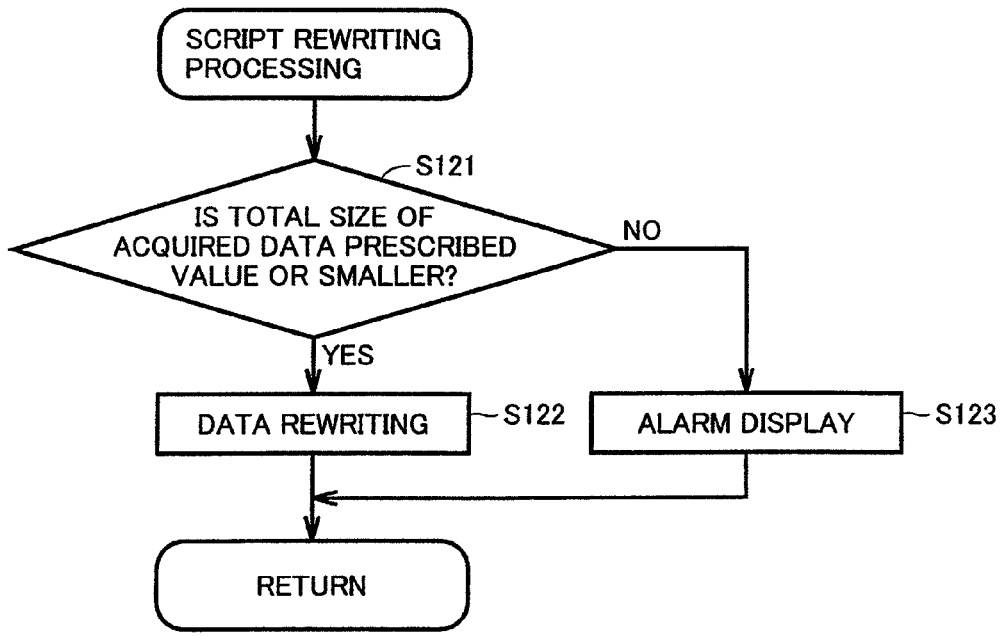
FIG. 26 is a flowchart showing a script rewriting process in step S66.

Next, the process of rewriting the script in step S66 is described using the flowchart of FIG. 26.

With reference to FIG. 26, implementation controlling unit 1313 implements the process of rewriting the script in script writing unit 1316 (S122) in the case where the sum of the media data and the acquisition data which are included in the script is no greater than the limit value that is stored in memory unit 130 (YES in S121). In other cases (NO in S121), implementation controlling unit 1313 displays a message to the effect that script cannot be rewritten on display 144 (S123).

Figure 57A:
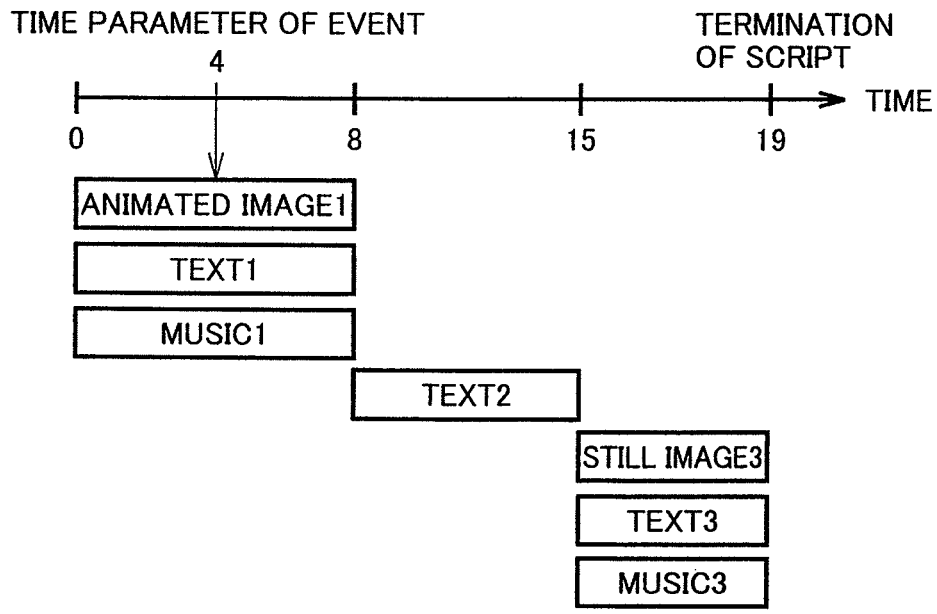
FIGS. 57A and 57B are diagrams showing an example of writing the acquired data into points in time of time parameter values of the event.
Figure 57B:
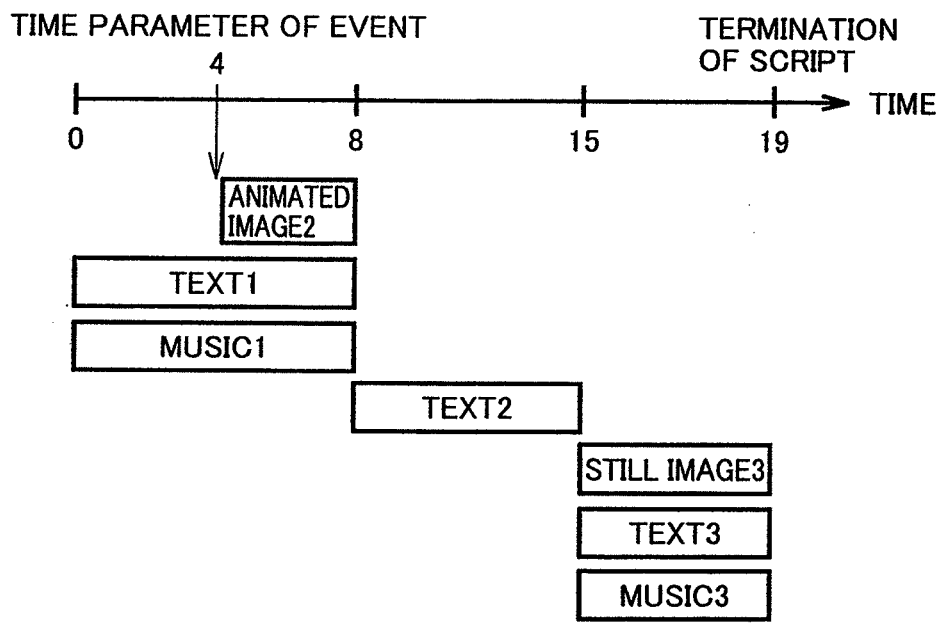

Here, in step S122, implantation controlling unit 1313 can modify the point in time where the acquisition data is written by utilizing the time parameter value of the event that is referred to in step S31. In the case where a process for rewriting media data by starting up a camera application is carried out as a process for rewriting a script by carrying out a key operation 4 seconds after the start of the reproduction as shown in FIG. 57B in a script as shown in FIG. 57A, image taking is started at the time when the key operation is carried out (fourth second), and thereby, video 2 that has been acquired from the camera application after the completion of image taking is written into the section between the time when the key operation is carried out (fourth second) and the time when the reproduction of video 1 which is the original media data is completed (eight second). Here, though in this example, media data is written in at the point in time of the time parameter value of the event, the media data can be written in at the point in time before or after the time parameter value of the event.

At this point, the process of rewriting the script in step S66 is completed, and the process is returned to the process of application implementation shown in the flowchart of FIG. 18.

At this point, reproducing and editing processing of the script is completed in cellular phone 1 in the present data communication system.

Figure 19:
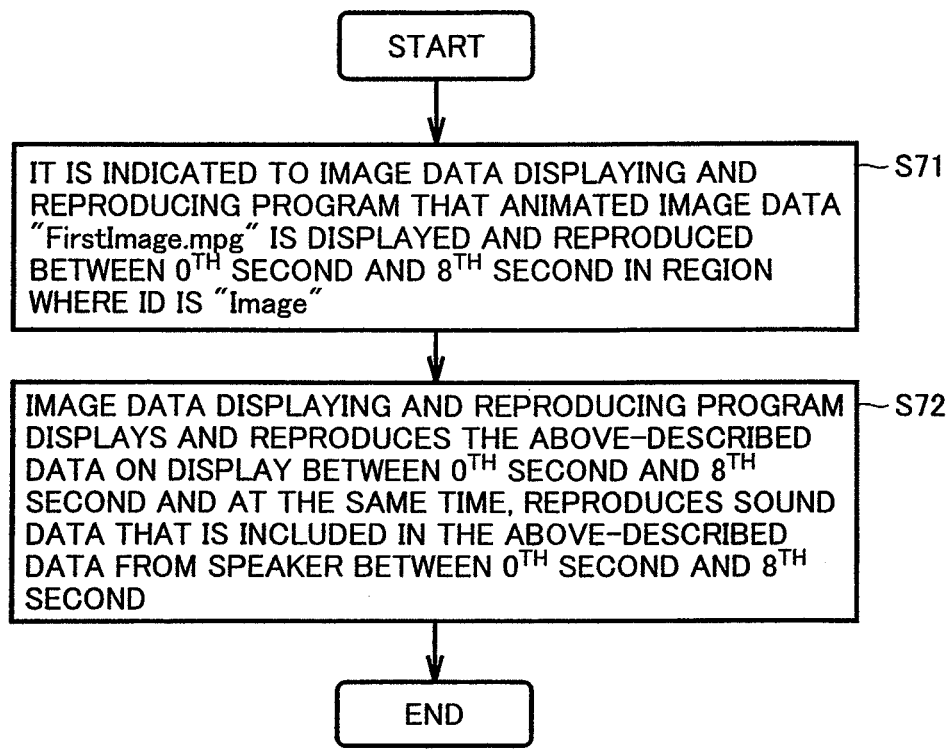
FIGS. 19 and 20 are flowcharts showing processes at the time when lines 20 and 23 of the script shown in FIG. 7 are implemented.
Figure 20:
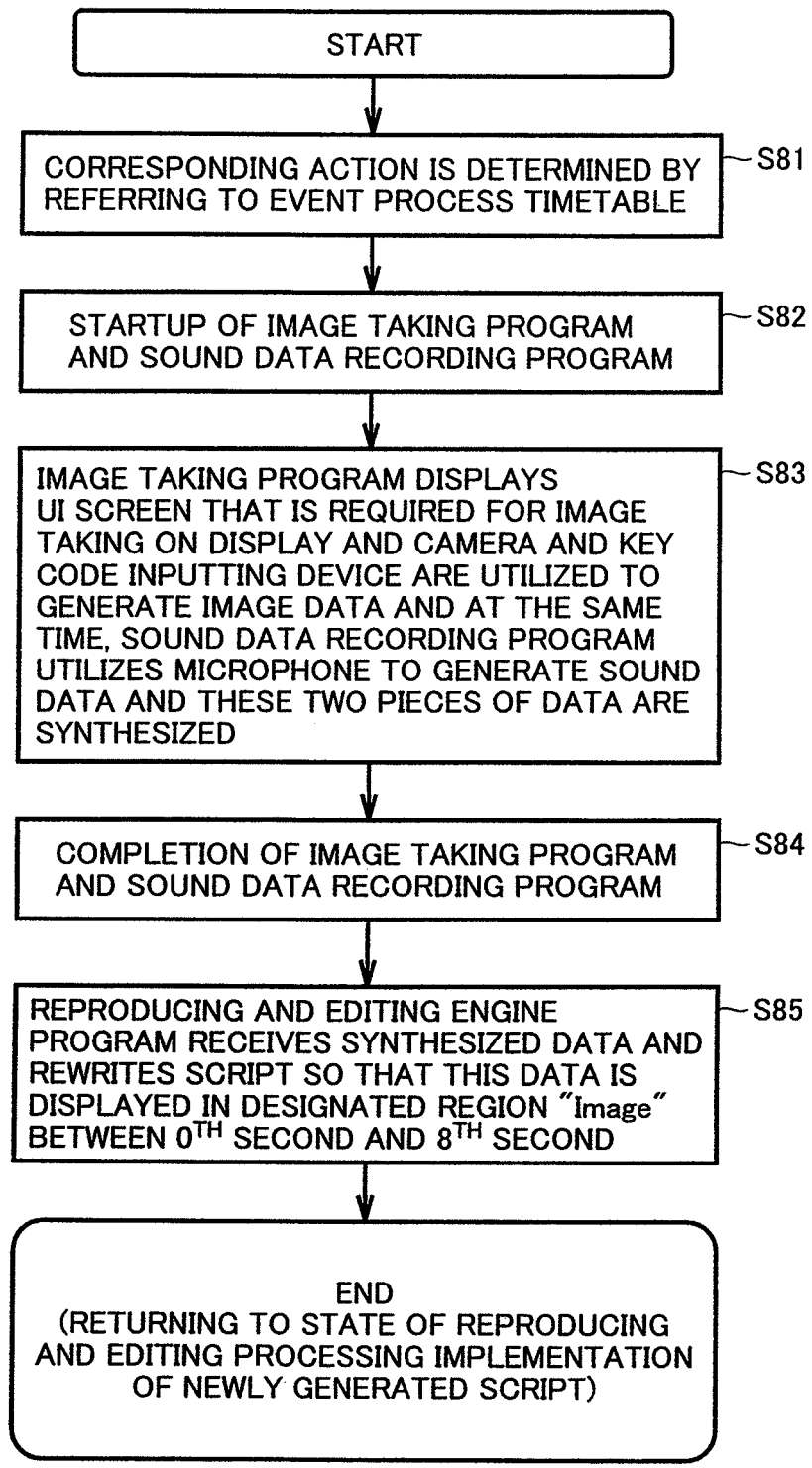

Concretely speaking, a case where reproducing and editing processing of the script shown in FIGS. 6 and 7 is carried out in cellular phone 1 in the present data communication system is described using the flowchart of FIGS. 19 and 20.

With reference to FIG. 19, when line 20 of the script shown in FIG. 7 is implemented, first, script analysis is carried out in syntax analyzer 1312 of reproducing and editing engine program 131, and in step S71, implementation controlling unit 1313 instructs image data displaying and reproducing program 134 to display and reproduce animated image data "FirstImage.mpg" in the "Image" region between 0 and 8 seconds. Then, in step S72, image data displaying and reproducing program 134 displays and reproduces animated image data "FirstImage.mpg" on display 144 between 0 and 8 seconds, and furthermore, the sound data is reproduced from speaker 148 in the case where the animated image data includes sound data.

Next, in the case where an event where a user operates the select key occurs between 0 and 8 seconds, the process shown in FIG. 20, which is a process described on line 24 of the script shown in FIG. 7, is implemented. That is to say, with reference to FIG. 20, when event managing unit 1315 detects the occurrence of the event where the select key is operated, in step S81, implementation controlling unit 1313 refers to the event processing timetable, of which a concrete example is shown in FIG. 11, and determines the corresponding processing contents (action). That is to say, in step S82, implementation controlling unit 1313 refers to the event processing timetable and starts up image taking program 133 and sound data recording program 136, which are the corresponding applications.

Next, in step S83, image taking program 133 displays the UI that is required for image taking on display 144, and generates image data by utilizing camera 149 and key code inputting device 142. In addition, at the same time as this, sound data recording program 136 utilizes microphone 146 so as to generate sound data. Then, a data synthesizing program, not shown, synthesizes the generated image data and sound data. As a result of this, in step S83, new data is acquired.

Upon the completion of the above-described process, in step S84, implementation controlling unit 1313 completes image taking program 133 and sound data recording program 136.

Then, in step S85, reproducing and editing engine program 131 receives the synthesized data, and script writing unit 1316 rewrites the script so that this data is displayed in the "Image" region between 0 and 8 seconds.

At this point, the process of line 24 in the script shown in FIGS. 6 and 7 is completed, and reproducing and editing processing of the newly generated script is implemented.

When reproducing and editing processing of the script shown in FIGS. 6 and 7 is implemented in cellular phone 1 of the present data communication system, the above-described process is carried out one line at a time.

Figure 21:
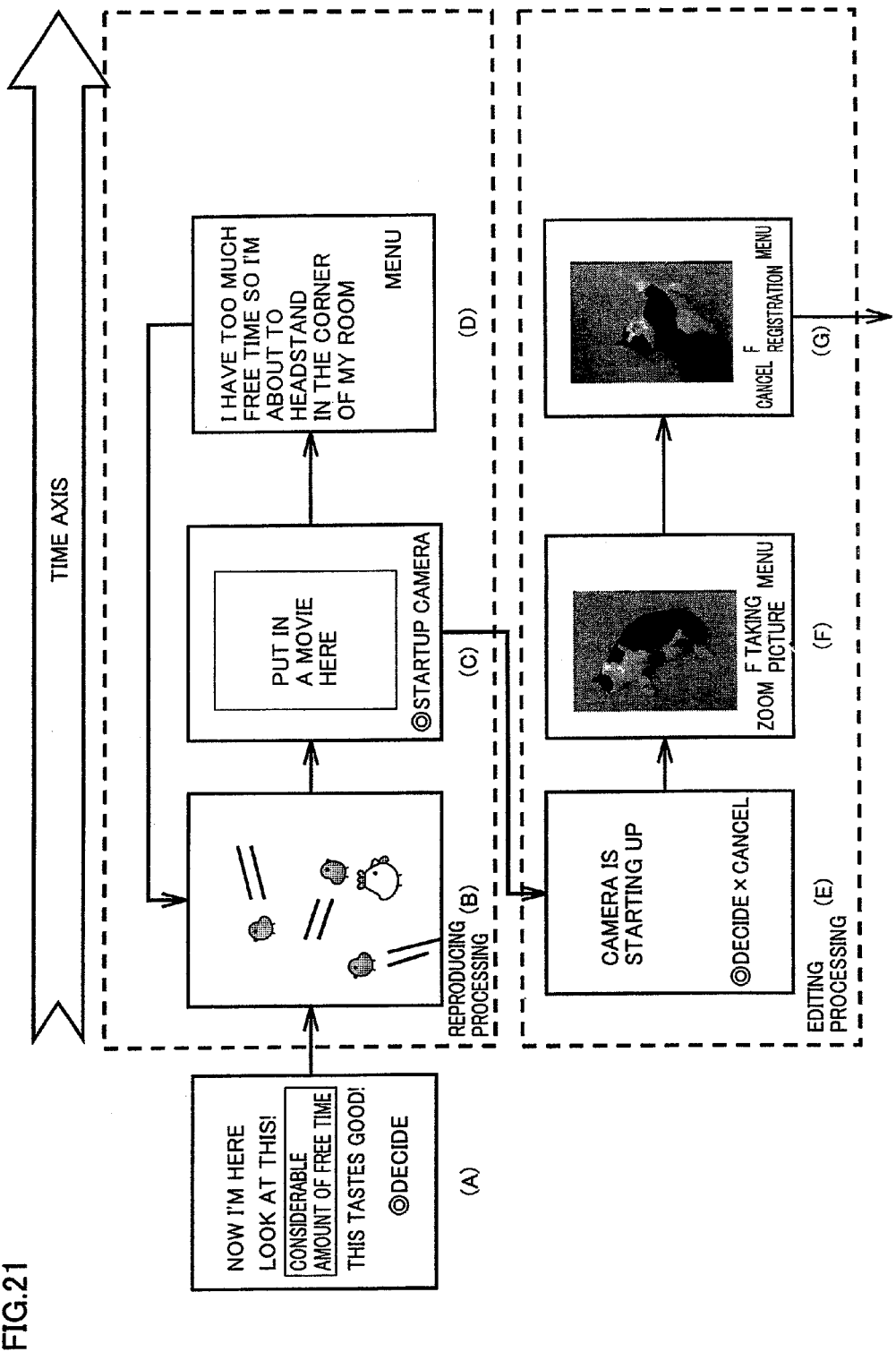
FIGS. 21, 22, 33 and 85 are diagrams showing concrete examples of transitions of display screens at the time when a script is implemented.
Figure 22:
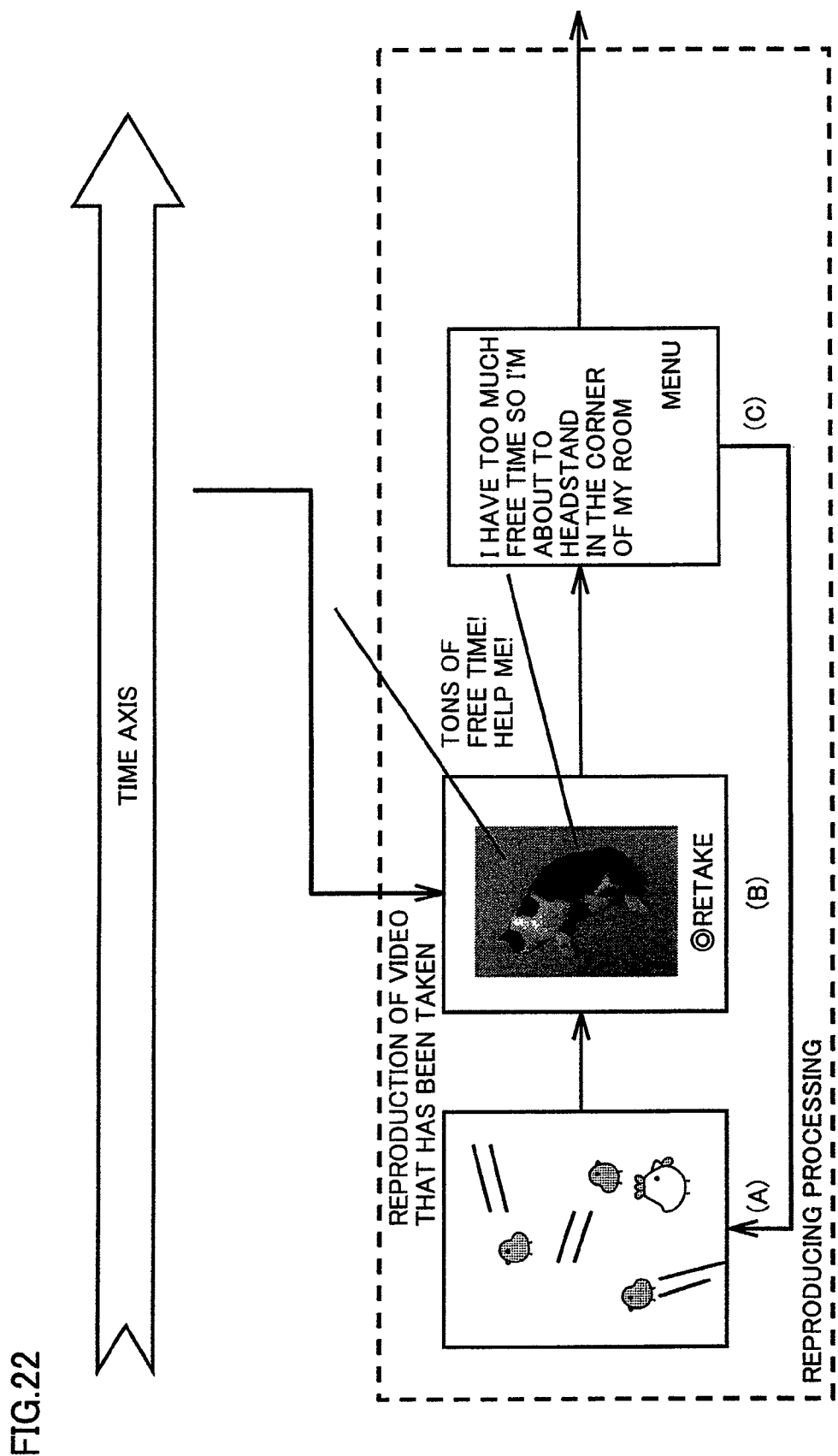
Figure 85:
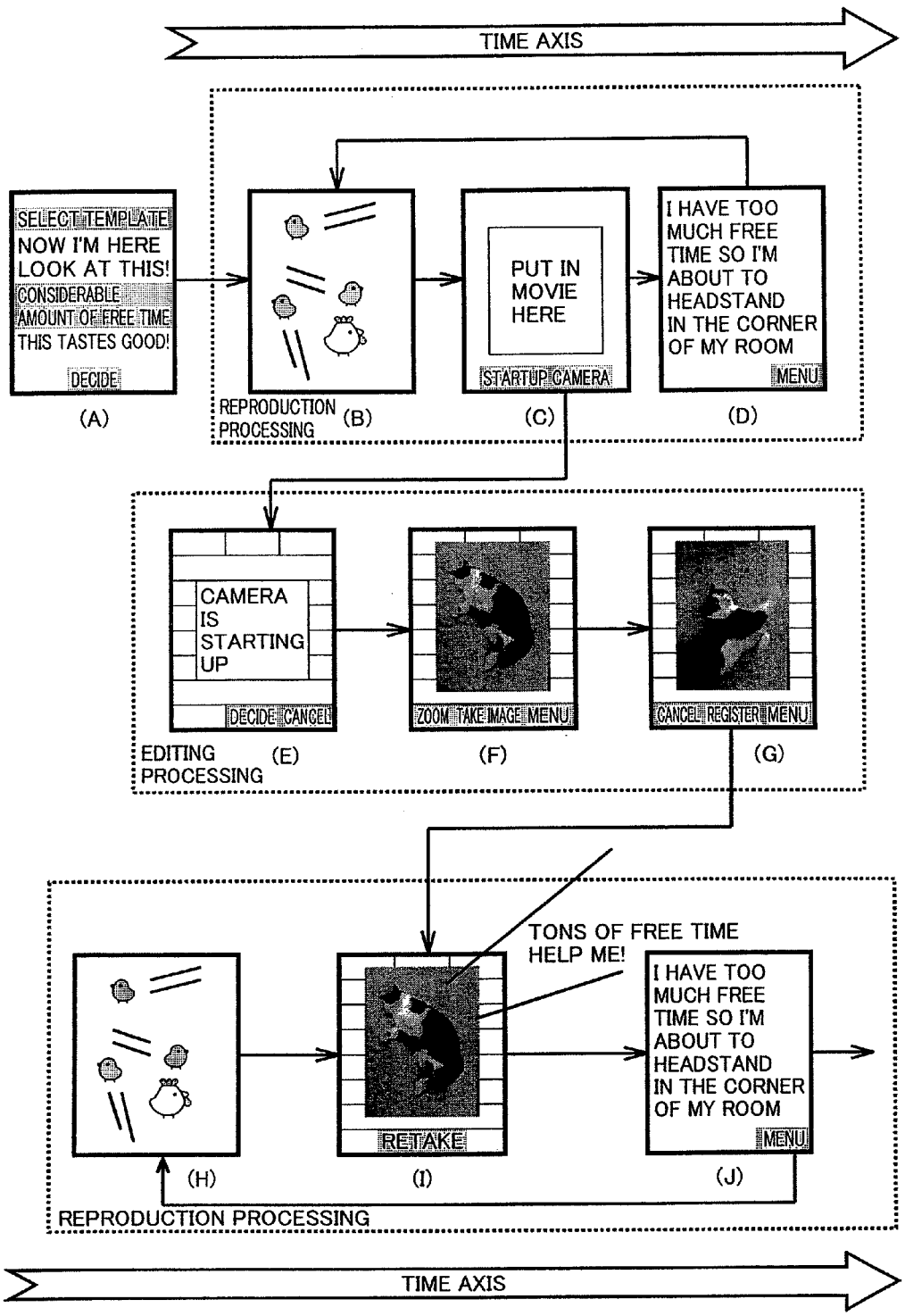

Such reproducing and editing processing of the script is described below using the switching of concrete display screens shown in FIGS. 21, 22 and 85. FIGS. 21 and 22 are diagrams sequentially showing the transition of concrete display screens, and FIG. 85 shows concrete examples of these display screens in a single diagram.

FIG. 21(A) shows a concrete example of a screen that displays a list of available templates. In the screen shown in FIG. 21(A), four templates "now I'm here," "look at this!," "considerable amount of free time" and "this tastes good!" are displayed so as to be selectable. Here, though in this example, only the names of the templates are displayed, it is more preferable for concrete images for a message that can be prepared by utilizing a template to be displayed together with the titles as thumbnail mages.

In addition, though the templates that are displayed in a list are templates which are usually stored in a memory within the terminal, templates that can be downloaded from an external apparatus or a server through a network connection may be displayed.

In addition, it is possible to display all the templates that have been acquired or that can be acquired in the screen of this list of templates, or it is possible to display only some templates. In the case where such templates are displayed, a method for displaying only the templates which are often utilized and which are selected through user operation or the like, a method for displaying only the templates which have been recently utilized, a method for displaying only templates from which the terminal to which the message is to be transferred can be interpreted or understood in the case where a message is transmitted to a person who has been designated in advance, and in the case where the functions of the terminal of the person to whom the message is transmitted are known and the like can be considered as a method for selecting which templates are displayed. As described above, in a case where a template is selected and displayed in accordance with the functions of the terminal of a person to whom a message is transmitted, a template for the purpose of taking a picture and transmitting the picture on the spot by starting up a camera, for example, can be removed from the list, in the case where the terminal of a person to which a message is transmitted is a cellular phone which does not have a camera.

Here, even in the case where only some templates are displayed in a list, as described above, it is preferable for all of the templates which have been acquired or which can be acquired to be displayed by means of a predetermined user operation. Furthermore, in the case where the functions of the terminal of a person to whom a message is transmitted can be found, colors or fonts are displayed in a different manner or an alarm screen is shown, in order to alert the user at a selected time, or the selection operation may be incapacitated for the templates where all of the described functions are found not to be interpreted or implemented in the terminal of the person to whom a message is transmitted.

Next, a process in a case where the template "considerable amount of free time" is selected in the screen shown in FIG. 21(A), and the reproduction process is implemented is concretely described.

With reference to FIG. 21, first, a predetermined navigation frame, the script "considerable amount of free time" is selected, and the reproduction process is implemented. In cellular phone 1, the above-described process is implemented and the script that is included in this template is analyzed, and then, as shown in FIG. 21(B), the implementation of this script is started.

A UI part for navigating the user, which is a UI part that changes chronologically as the script is implemented, is displayed on display 144, as shown in the screens in and after FIG. 21(C). Concretely speaking, a letter sequence "startup of camera" is displayed on display 144 at the time of reproduction of the second frame from among the screens which are implemented and shown in FIG. 21(C). In the case where the user does not carry out any operation in this state, the letter sequence "startup of camera" is displayed for a predetermined period of time, and after that, the script is implemented to the termination of the screen shown in FIG. 21(D), and the screen automatically returns to the one at the beginning shown in FIG. 21(B), from where reproduction is repeated.

Here, though a letter sequence is displayed as a UI part in this example, an icon image such as that of a camera or an animated image may be displayed, or sound or music may be reproduced.

A user can carry out a predetermined key operation according to the timing where the letter sequence "startup of camera" is displayed on display 144, as shown in FIG. 21(C), and thereby, image taking program 133 may be implemented so that a video can be taken by camera 149, as shown in FIGS. 21(E) and 21(F). Then, as shown in FIG. 21(G), the template "considerable amount of free time" is rewritten so that the video data that was taken in the time slot when the letter sequence "startup of camera" was displayed can be reproduced. That is to say, when the implementation of the script is returned to the time where the start of the script or the UI part of "startup of camera" is displayed on display 144 after the user has taken an image following the navigation of the UI part, as shown in FIG. 22, the video that has been taken as shown in FIG. 22(B) is reproduced in the time slot where the UI part of "startup of camera" is displayed on display 144 when the template "considerable amount of free time" was previously implemented. Here, in this case, it is preferable for the UI part of "startup of camera" not to be displayed in the time slot where the UI part of "startup of camera" is displayed when the video data is determined to have been registered in this time slot at the time when the script is implemented. Alternatively, it may be preferable for the display to be changed to one where the UI part "retake video" is displayed in this time slot, as shown in FIG. 22(B).

Hereinafter, implementation of the script that has automatically been rewritten is repeated, until the operation of completion is carried out.

Figure 40:
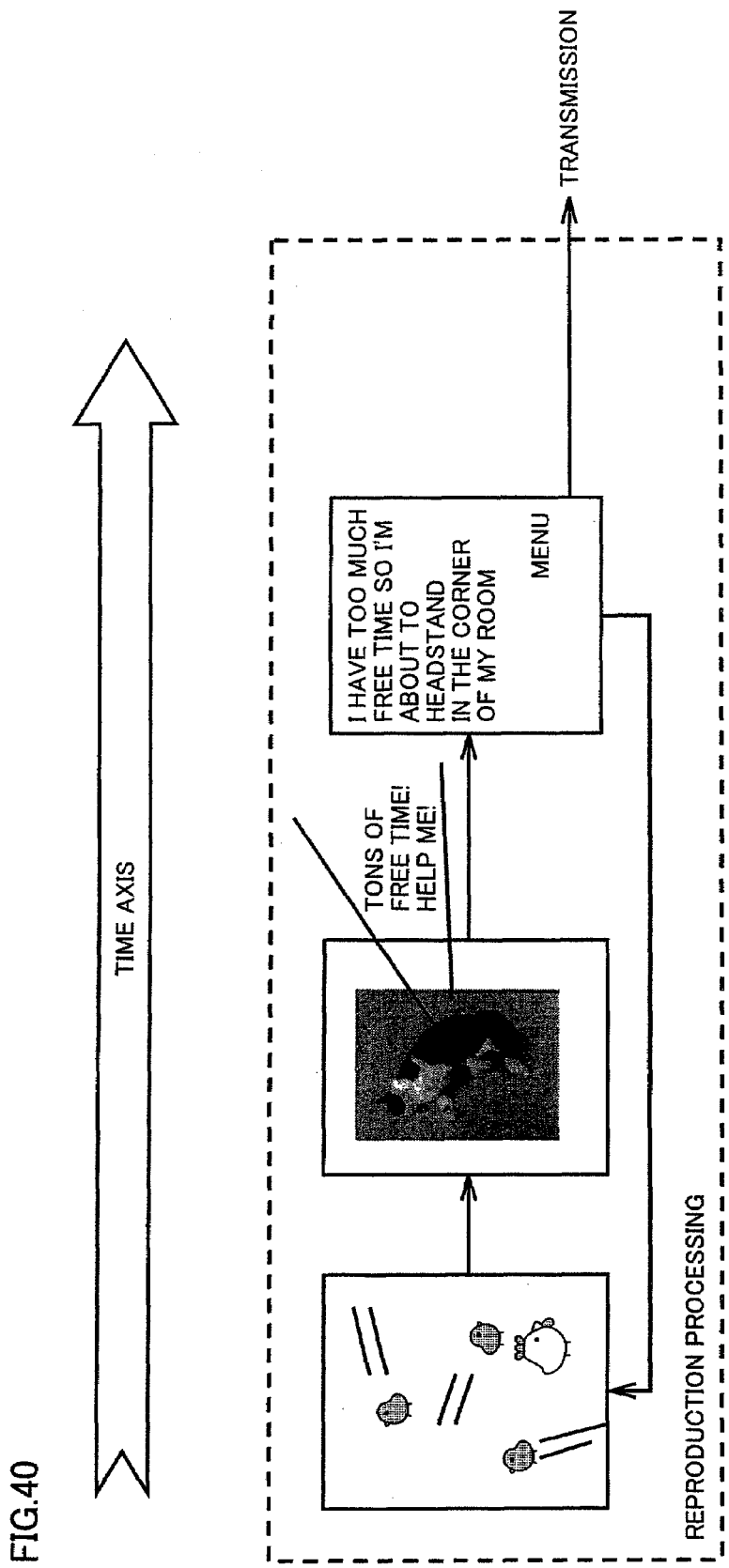
FIG. 40 is a diagram showing a concrete example of a screen transition at the time of the preview process.

Next, "preview" is selected from the menu, and the process where the preview is implemented is carried out. In the implementation of the preview, as shown in FIG. 40, the script after editing is reproduced in the state where the display and reproduction of the UI part are all incapacitated. That is to say, the letter sequence "retake video" shown in FIG. 22(B) is not displayed, and image taking program 133 is not executed, even in the case where the user carries out the predetermined key operation. Here, the process of the preview is described in the following.

After the confirmation of the display of the script after editing in the preview, "attachment to an e-mail" is selected from the menu, and the script and media data are transmitted to another cellular phone 1. Here, the process of attachment to en e-mail is described in the following.

Figure 31:
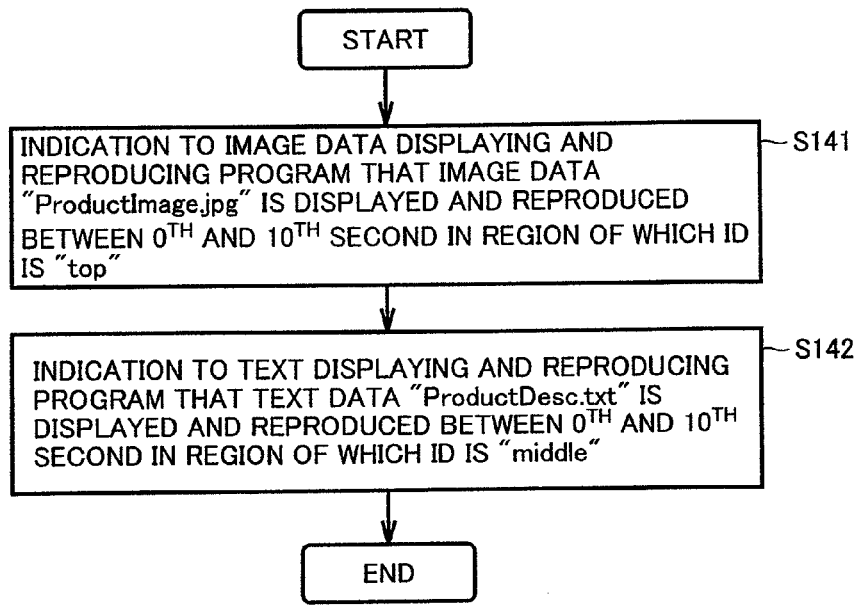
FIGS. 31 and 32 are flowcharts showing processes at the time when lines 19 and 21 of the script shown in FIG. 30 are implemented.
Figure 32:
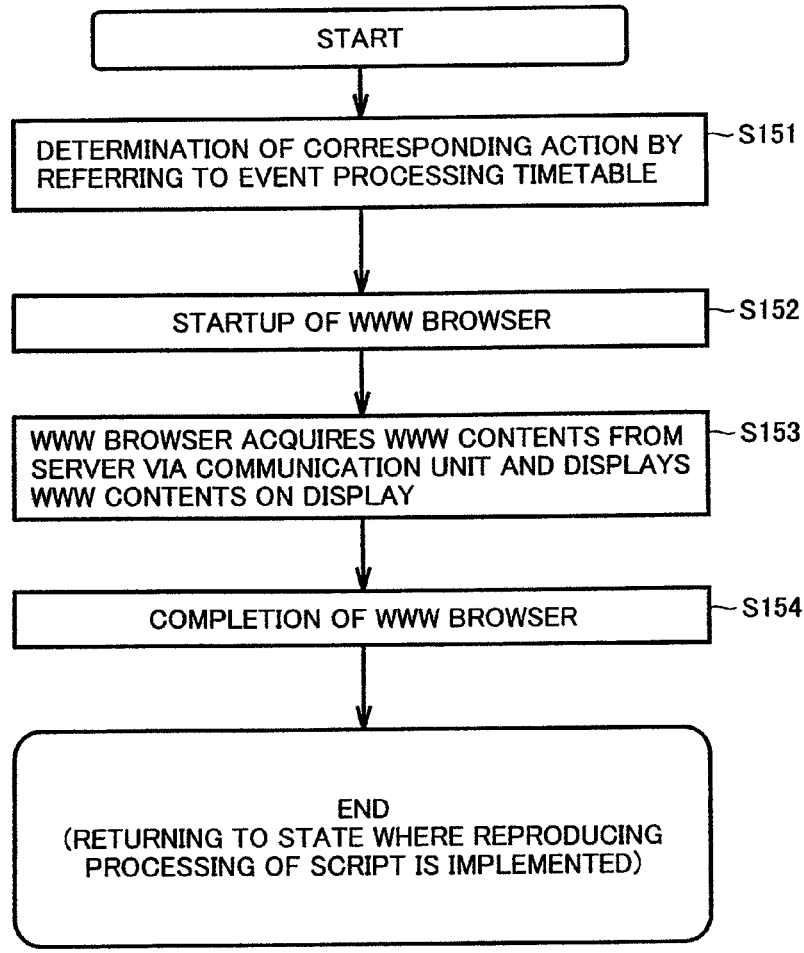

Furthermore, a case where the reproduction of the script shown in FIGS. 29 and 30 is implemented in cellular phone 1 in the present data communication system is described as another concrete example of the present embodiment using the flowchart of FIGS. 31 and 32.

With reference to FIG. 31, when line 19 of the script shown in FIG. 30 is implemented in cellular phone 1 according to the present embodiment, first, script analysis is carried out in syntax analyzer 1312 of reproducing and editing engine program 131, and implementation controlling 1313 instructs image data displaying and reproducing program 134 to display and reproduce image data "ProductImage.jpg" in "top" region between 0 and 10 seconds (S141). Then, image data displaying and reproducing program 134 displays and reproduces image data "ProductImage.jpg" on display 144 between 0 and 10 seconds.

Next, when line 20 of the script shown in FIG. 30 is implemented, in step S142, implementation controlling unit 1313 instructs, in the same manner, text displaying reproducing program 134 to display and reproduce text data "ProductDesc.txt" in the "middle" region between 0 and 10 seconds (S142). Then, text data displaying and reproducing program 138 displays and reproduces text data "ProductDesc.txt" on display 144 between 0 and 10 seconds.

Next, in the case where an event where a user operates the select key occurs between one and four seconds, the process shown in FIG. 32 which is the process described in line 21 of the script shown in FIG. 30 is implemented. That is to say, with reference to FIG. 32, when event managing unit 1315 detects the occurrence of an event where the select key has been operated, implementation controlling unit 1313 refers to the event processing timetable and determines the corresponding processing contents (action) (S151). Then, implementation controlling unit 1313 refers to the event processing timetable and starts up WWW browser program 151 which is the corresponding application (S152).

Next, WWW browser program 151 acquires the WWW contents, which are then displayed on display 144, via communication unit 110 (S153).

Upon the completion of the above-described process, implementation controlling unit 1313 completes WWW browser program 151 (S154).

At this point, the process of line 21 of the script shown in FIGS. 29 and 30 is completed, and the process of reproduction of the script is implemented.

When the process of reproduction of the script shown in FIGS. 29 and 30 is implemented in cellular phone 1 of the present data communication system, the above-described process is carried out one line at a time. Such a process of reproduction of the script is described using a transaction of concrete display screens shown in FIG. 33.

Figure 33:
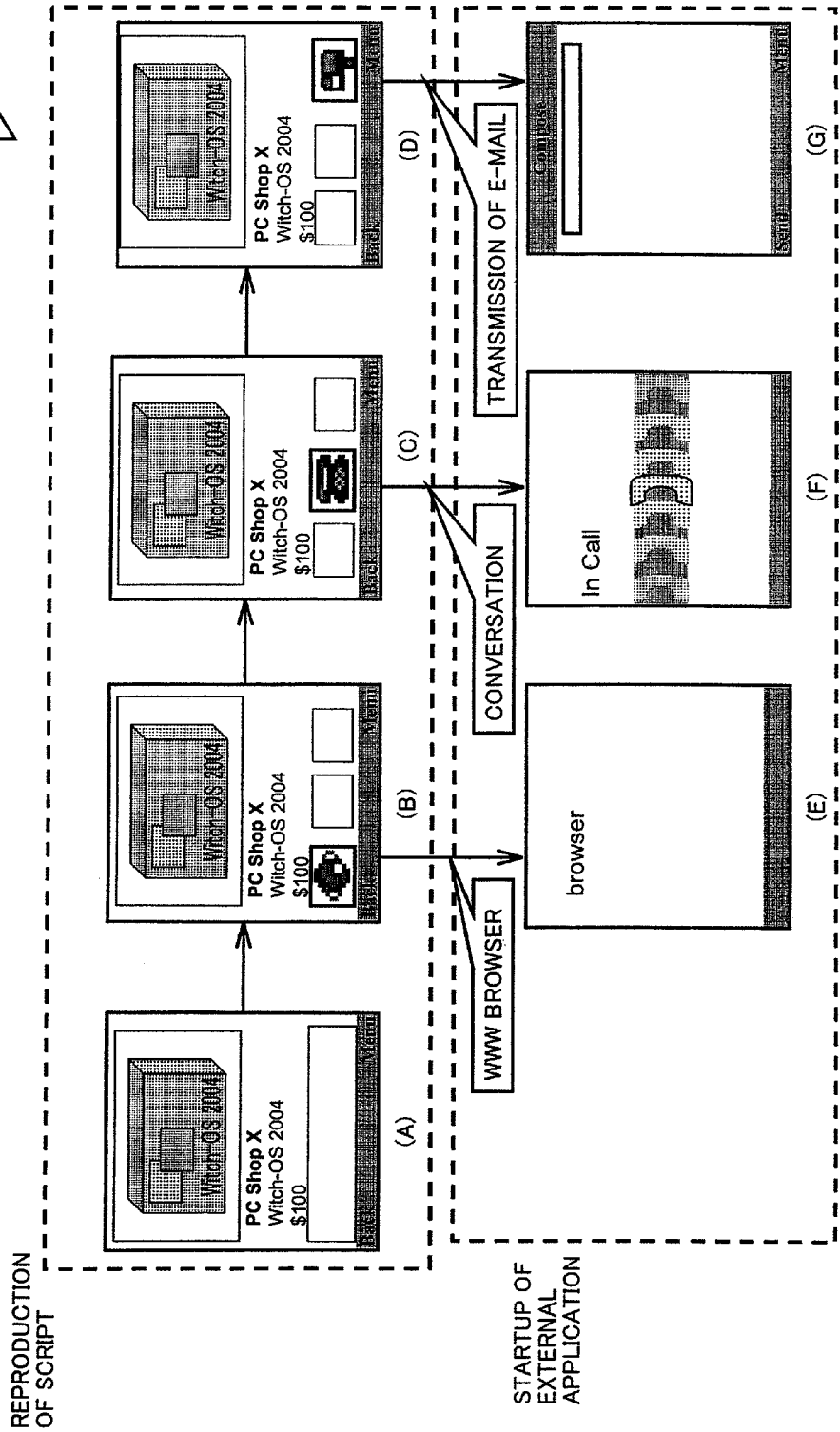

With reference to FIG. 33, cellular phone 1 of the present data communication system acquires a script from communication unit 110 and carries out the process of reproduction. In cellular phone 1, the above-described process is carried out so as to analyze the script, and implementation of the script is started.

When implementation of the script is started, a UI part that changes chronologically as the script is implemented, which is a UI part that navigates the user, is displayed on display 144, as shown in FIG. 33. Concretely speaking, the icon image of "WWW browser" is displayed on display 144 at the time of reproduction shown in FIG. 33(B). In the case where the user does not carry out any operation in this state, the state automatically transitions to that shown in FIG. 33(C), and the icon image of "conversation" is displayed on display 144. Furthermore, in the case where the user does not carry out any operation in this condition, the state automatically transitions to that shown in FIG. 33(D), and an icon image of "transmit e-mail" is displayed on display 144.

The user carries out a predetermined key operation in the time slot shown in FIG. 33(B), where the icon image of "WWW browser" is displayed on display 144, and thereby, WWW browser program 151 is executed, and predetermined WWW contents can be acquired via communication unit 110 and reproduced on display 144. When the WWW browser program is completed after referring the WWW contents, the reproduction of the script is resumed from the point of the previous reproduction.

Hereinafter, the reproduction of the script is repeated until the operation of completion is carried out.

Figure 23:
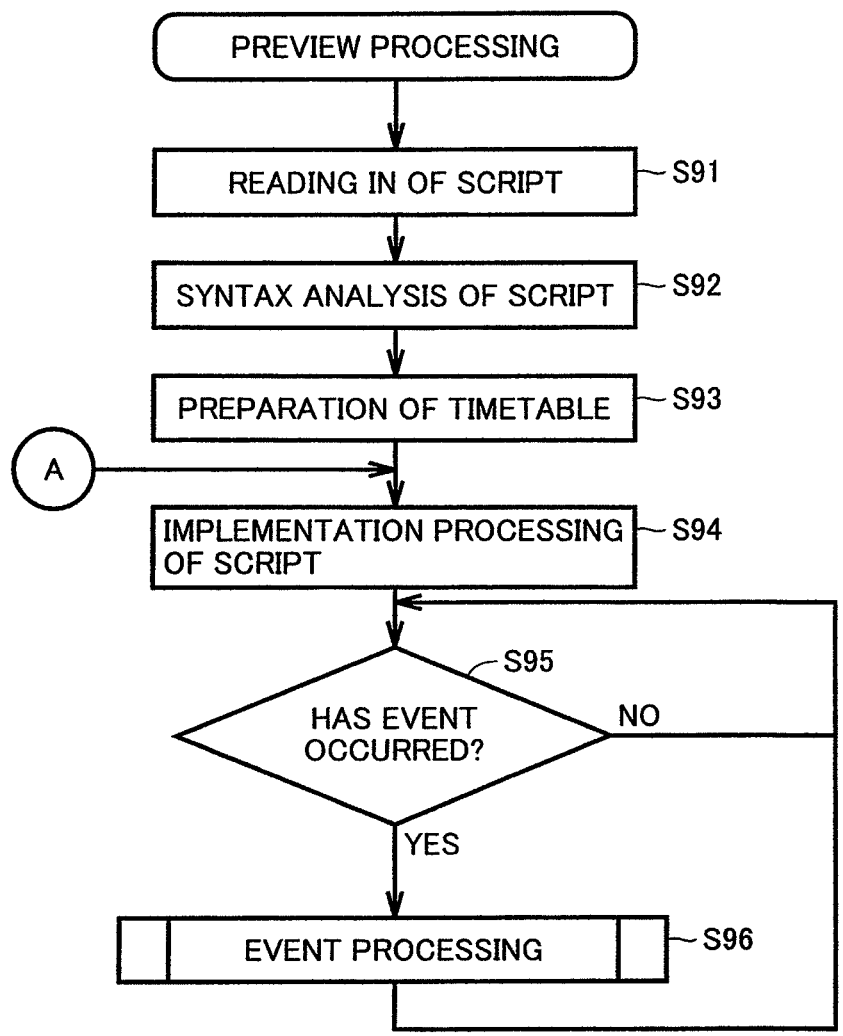
FIG. 23 is a flowchart showing a preview process of a script in cellular phone 1.

Furthermore, the process of the preview in cellular phone 1 is described using the flowchart of FIG. 23 in the case where "preview" is selected on the menu screen, of which a concrete example in FIG. 16. With reference to FIG. 23, the process of the preview is approximately the same as the reproducing and editing processing of the script shown in FIG. 9, and in the process of the preview, only the timetable for the process of media data drawing is prepared, in step S93, on the basis of the results of analysis in step S92 and on the basis of the drawing information describing portion of the script. Then, in step S94, the reproduction of the portion on the basis of the user navigation information describing portion of the script is not implemented, but the portion on the basis of the drawing information describing portion is implemented. Then, implementation controlling unit 1313 implements the process that corresponds to this event (S96), when event managing unit 1315 detects the occurrence of an event (YES in S95). Here, this process that corresponds to the event is described in the following, by citing a subroutine. In the case of the process of the preview, the script definition inputting event is invalid, and only the system event and stable inputting event are processed in step S96.

At this point, the process of the preview of the script in cellular phone 1 is completed.

Figure 38:
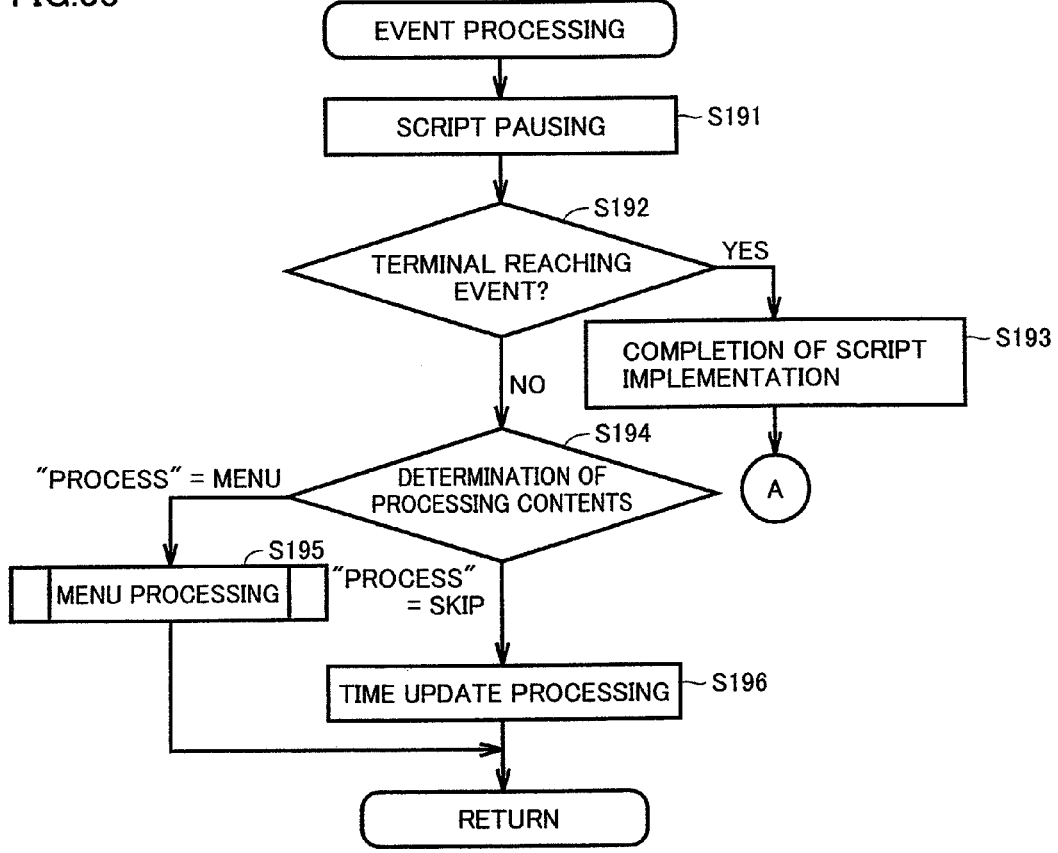
FIG. 38 is a flowchart showing an event process in step S96.

Next, the process that corresponds to the event which is implemented in step S96 is described using the flowchart of FIG. 38.

With reference to FIG. 38, first, when detection information of the occurrence of an event is received from event managing unit 1315 in step S95, implementation controlling unit 1312 pauses the script that is being implemented (S191).

Then, in the case where the event that has been detected in step S95 is an event that indicates that the implementation of the script has reached the terminal of the implementation of this script (YES in S192), implementation controlling unit 1313 completes the implementation of this script (S193), and the process returns to step S94 of FIG. 23 and the implementation of the script is started again. That is to say, the implementation of the script is returned to the beginning of the implementation again, and the implementation of the script is repeated from the beginning.

Meanwhile, in the case where the event that has been detected in step S95 is an event other than the event that indicates that the implementation of the script has reached the terminal of the implementation (NO in S192), implementation controlling unit 1313 determines the contents of processing on the basis of the event that has been detected (S194).

Figure 39:
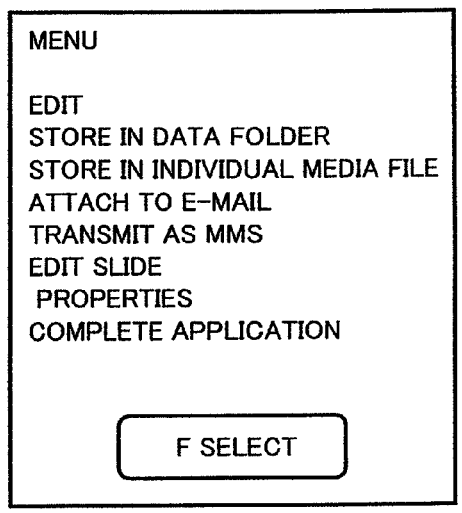
FIG. 39 is a diagram showing a concrete example of a menu screen at the time of the preview process.

In the case where the processing contents that have been determined in step S194 are "menu" ("process"=menu in S194), implementation controlling unit 1312 carries out the menu process shown in FIG. 15 (S195). The procedure of implementation of the menu process is the same as that in a case where the reproducing and editing is carried out, and, as shown in FIG. 39, the menu screen where the editing process becomes choices instead of the preview process is exhibited on display 144. In the case where the editing process is selected, the reproducing and editing processing shown in FIG. 9 is implemented. Here, in the case where the reproducing and editing processing is started from the menu, it may be started at the start point of the script, or it may be started at the time of implementation of the script at the time of the preview process.

Meanwhile, in the case where the processing contents which have been determined in step S194 are "skip" ("process"=skip in S194), implementation controlling unit 1312 refers to the media drawing processing timetable so as to determine the media drawing process that is to be implemented next and updates the implementation of the script to the starting time of this media drawing process (S196).

Here, in addition to the above-described starting time of the media drawing process that is to be implemented next, the starting time of the media drawing process that is to be implemented as any of the processes after the next or the time of implementation when a predetermined time has passed in the case where the script is continued to be implemented as it is without a selection of the skipping process may be the time to which the implementation of the script is moved.

Figure 34:
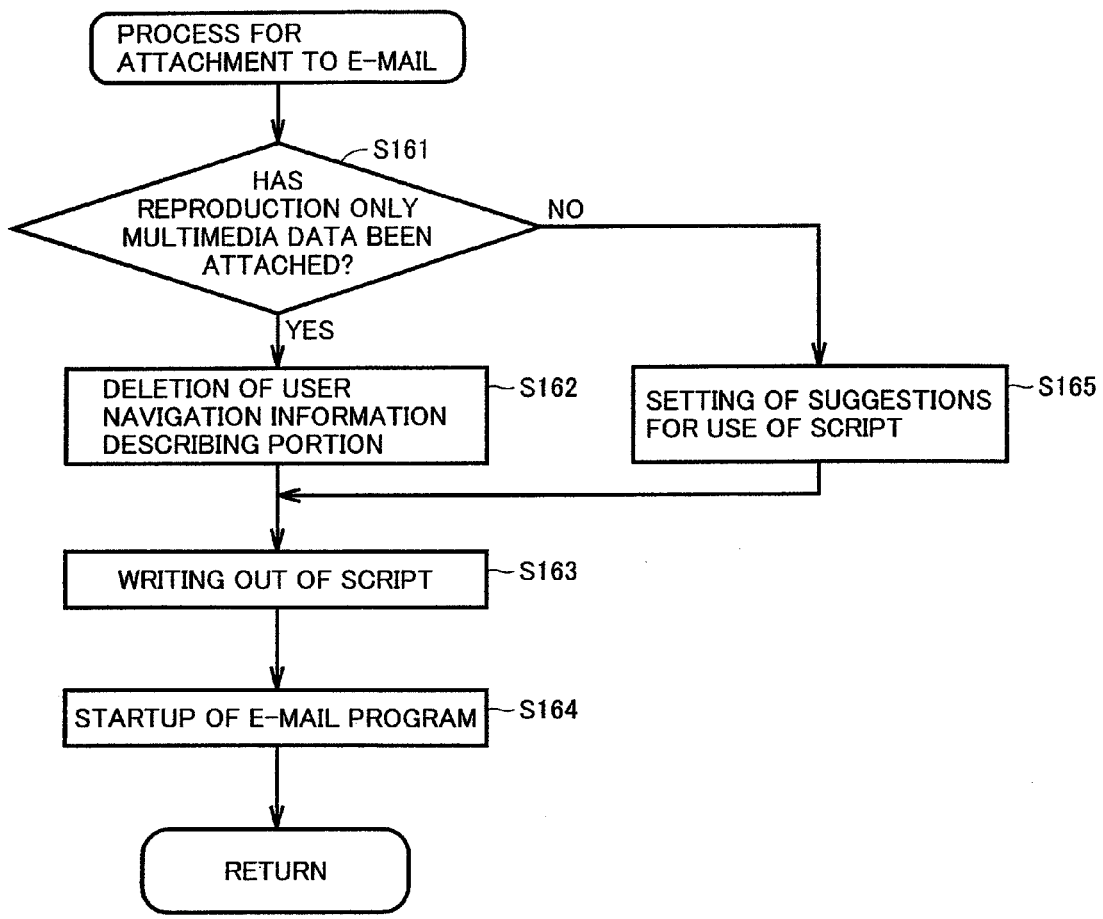
FIG. 34 is a flowchart showing an e-mail attaching process of a script in cellular phone 1.

Next, in the case where a process of attaching this script and media data to an e-mail is selected in the menu screen of which a concrete example is shown in FIG. 16, the process of attachment to an e-mail in cellular phone 1 is described using the flowchart of FIG. 34.

With reference to FIG. 34, first, implementation controlling unit 1313 displays a screen for selecting whether or not the script is transmitted as multimedia data specified for reproduction on display 144. Then, in the case where attachment of the multimedia data specified for reproduction is not selected on this screen (NO in S161), implementation controlling unit 1313 sets a suggestion as to how the multimedia data can be utilized in another cellular phone 1 that receives the multimedia data (S165). That is to say, in step S165, implementation controlling unit 1313 sets whether this multimedia data is to be utilized as a template for navigating the contents editing operation or as the contents simply for reference. Then, the process is made to progress to step S163.

Meanwhile, in the case where the attachment of the multimedia data specified for reproduction is selected on the screen for selecting whether or not the script is transmitted as multimedia data specified for reproduction (YES in S161), implementation controlling unit 1313 deletes the user navigation information describing portion (S162).

Next, implementation controlling unit 1313 writes a script in memory unit 130 (S163). Then, implementation controlling unit 1313 sets the above-described script and multimedia data as a file to be attached, and starts up an e-mail program (S164).

Here, in the case where the attachment of the multimedia data specified for reproduction is selected in the above-described process for attachment to an e-mail (YES in S161), the multimedia data template before being edited may be added to an e-mail together with the multimedia data specified for reproduction. In addition, in the case where there is a portion of description where it has been found in advance that cellular phone 1 that receives the e-mail cannot process the portion of description, in step S162, which is the above-described process for attachment to an e-mail, such a portion of description may be deleted from the script.

Second Embodiment

Next, with reference to the drawings, the second embodiment of the present invention is described.

The configuration of the data communication system that includes a multimedia data processing device according to the second embodiment of the present invention is the same as in the case of the first embodiment shown in FIG. 1. In addition, the configuration of cellular phones 1 and the programs stored in memory unit 130 and the flow of data processing of a cellular phone 1 are also the same as in the case of the first embodiment shown in FIGS. 2 and 3, respectively.

First, a case is described where a script that includes reproduction order information of media data is reproduced in cellular phone 1, which is a multimedia processing device, according to the second embodiment, and a script that has been modified when media data is written into the script, and that includes the reproduction order information of the media data is reproduced.

Figure 41:
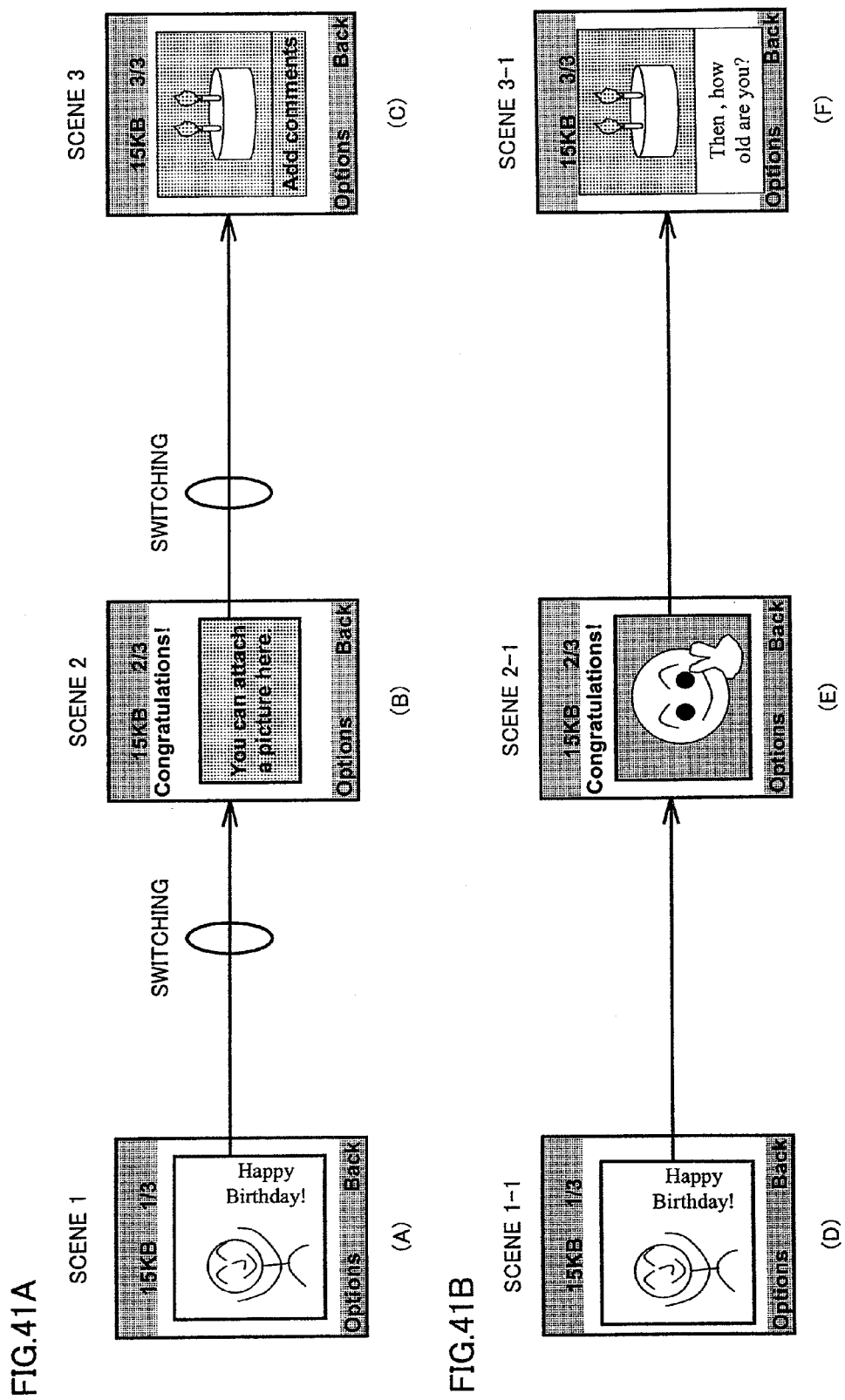
FIG. 41A is a diagram showing a concrete example of display screens before template rewriting.
FIG. 41B is a diagram showing a concrete example of display screens after template rewriting.

The template shown in FIG. 41A is formed of three scenes, scene 1 to scene 3. The transition between these scenes is not particularly limited according to the present invention, though a case where time information is described in the script within the template and the transition follows this, a case where the transition follows the time of switching that has been set in the terminal, a case where a user clarifies the switching of the scenes and the like are considered. The concrete example shown in FIGS. 41A and 41B is a case where the still image of scene 2 shown in FIG. 41A (B) and the text of scene 3 shown in FIG. 41A (C) are switched by the user in a manner as shown in FIGS. 41B (E) and 41B (F), respectively, and thereby, modification is carried out.

Furthermore, FIG. 47 shows a concrete example of a script for implementing the screen display of FIG. 41A. The script shown in FIG. 47 is a script that represents a sequential reproduction of the scenes that express collected media data that is reproduced in parallel. That is to say, with reference to FIG. 47, descriptions in lines 15 to 17, lines 18 to 21 and lines 22 to 25 represent the respective scenes 1 to 3.

In further detail, line 19 describes a reproduction of an image, and line 20 describes the reproduction of a text in scene 2 that is described in lines 18 to 21. These images and texts belong to the scene described in lines 18 to 21, and are reproduced in parallel.

Furthermore, the time that is displayed after "dur=" within the script represents the time for reproducing the corresponding scene, and after this time has passed, the reproduction switches to the next scene. Though a script is shown as one where such a describing method is used in the present embodiment, the method for describing a script is not limited in the present invention, and any style of script may be used, as long as sequence information for reproducing media can be described.

Here, sequence indicates a relationship of chronological order at the time of reproduction of multimedia data. A sequence includes one or more specific sections along the axis of the reproduction time as elements (concretely speaking, "scene," "slide," and more concretely, segments defined by being surrounded by <par> tags or <seq> tags in SMIL). The sequence is managed by grasping the relationship of the order of the respective segments along the time axis, and by preparing and maintaining the data structure that becomes a clue at the time when the reproduction of (media data that is included in) the respective segments is started or stopped, or loading and unloading of media data is carried out. Concretely speaking, a timetable as shown in FIGS. 10 to 12 is used, and thereby, the sequence is managed. The times when the respective segments are started and completed are referred to as changing points of a sequence along the axis of reproduction time. In the concrete example of the UI allocation state displaying timetable shown in FIG. 7, $0^{th}$, $8^{th}$, $15^{th}$, $19^{th}$ seconds correspond to the changing points of the sequence.

Figure 42:
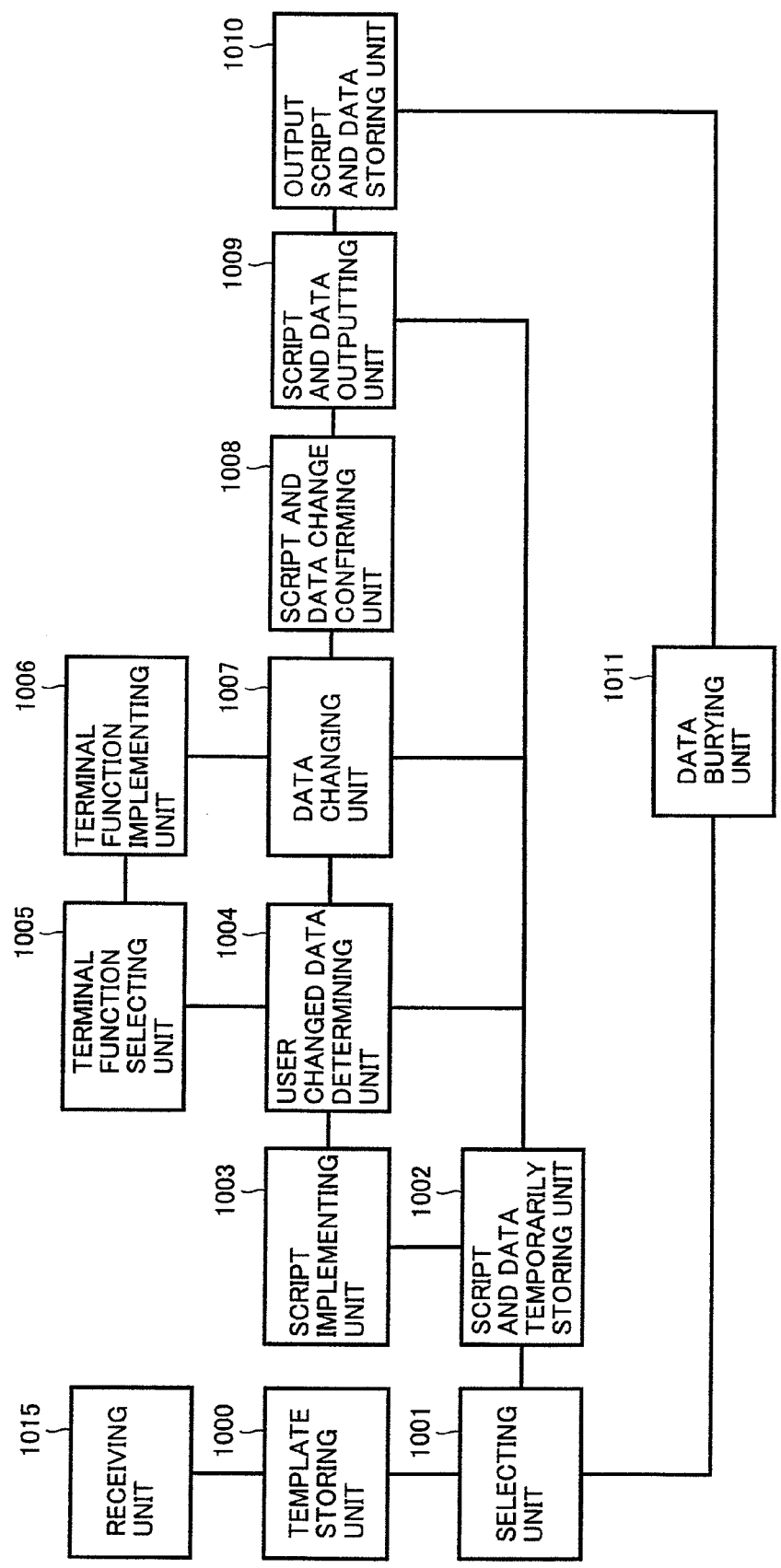
FIG. 42 is a block diagram showing the functional configuration of reproducing and editing engine program 131 according to the second embodiment.

Furthermore, FIG. 42 is a block diagram showing the function configuration of reproducing and editing engine program 131 of cellular phone 1 that is a multimedia data processing device according to the present embodiment. Control unit 120 executes reproducing and editing engine program 131 that is stored in memory unit 130, and thereby, the respective functions shown in FIG. 42 are implemented in cellular phone 1.

With reference to FIG. 42, the functions of reproducing and editing engine program 131 of cellular phone 1 according to the present embodiment is formed so as to include a template storing unit 1000, a selecting unit 1001, a script and data temporarily storing unit 1002, a script implementing unit 1003, a user changed data determining unit 1004, a terminal function selecting unit 1005, a terminal function implementing unit 1006, a data changing unit 1007, a script and data change confirming unit 1008, a script and data outputting unit 1009, an output script and data storing unit 1010 and a data burying unit 1011.

Template storing unit 1000 stores one or more template that is passed to and received by a receiving unit 1015. Though a template that is stored in template storing unit 1000 usually includes both a script as shown in FIG. 47 and sample media data (still image or text) that is utilized by this script, the script may be in another form, in the case where only the media data is in the form of a file or the like, so as to be separately managed, exists in a server that is connected to a network, or is accessible when the template is utilized.

Here, it is preferable for operations such as separately transferring or storing only the media data that is included in the template and that is taken out from the template to be prohibited or permitted from being carried out according to the description of the script that is included in the template. Furthermore, it is preferable for two or more templates to be usually stored in a terminal in a manner where a template that is desired to be used by a user can be added from a server that is connected to a network from a memory card or the like.

Selecting unit 1001 receives a selection of a template from a user in the list of templates that are displayed so as to be selectable. The template selection screen of FIG. 21 is a typical example.

Script and data temporarily storing unit 1002 temporarily stores a script and media data which are included in a template. A script includes a portion that is rewritable, and therefore, a template is usually copied and stored in script and data temporarily storing unit 1002, which is a temporary storing area for this. In the case where media data itself is not modified, for example, when rewriting of the file name of media data, however, it is not necessary to especially prepare duplication.

Script implementing unit 1003 is a portion of the core of the present invention. According to the present invention, the script is used to implement a display of which the scene has been switched. It is preferable for script implementing unit 1003 to be managed by preparing in advance a table for a scene or time at the time of script reproduction User changed data determining unit 1004 determines whether or not a medium that is included in a template can be changed. The majority of a media that is included in a template cannot be rewritten, but reference information within the media for referring to a media, such as a media file name is rewritten, and thereby, multimedia data that is desired by the user can be finally generated.

Media data that is included in a template is usually described in a script by being designated the form of a file name. User changed data determining unit 1004 determines whether or not this media data can be changed. In the case of scene 2 that is shown in FIG. 41A (B), for example, it is possible to switch still images on the terminal side, and therefore, user changed data determining unit 1004 determines that switching of still images is possible. In addition, even in the case where a still image file is designated in a script, there may be a case where data change is impossible in this still image file.

Furthermore, in the case of a script that is managed by time, it is preferable to make it possible for the time when this media data is reproduced to be selected in user changed data determining unit 1004 so that the reproduction time itself is rewritten or a fourth scene is added to the three scenes, after these are determined by user changed data determining unit 1004.

Terminal function selecting unit 1005 selects a terminal function that is required to change the portion that has been selected by user changed data determining unit 1004 from among the functions provided with this cellular phone 1. In the case where the portion selected by user changed data determining unit 1004 is a still image, for example, terminal function selecting unit 1005 selects the function for switching still images. In addition, in the case where this cellular phone 1 is a terminal with a camera, for example, it is preferable for terminal function selecting unit 1005 to be able to select the function of starting up a camera.

Terminal function implementing unit 1006 acquires media data by using a terminal function that has been selected by terminal function selecting unit 1005. Then terminal function implementing unit 1006 outputs the acquired media data to data changing unit 1007.

Data changing unit 1007 switches the media data that has been inputted from terminal function implementing unit 1006 to the original media data that is referred from the script. At this time, it is possible for a still image in a template to be converted to another type of media data, such as video or text, after the change.

In addition, at this time, in the case where reference information to media data in a script is information that is described under a file name, the media data after the change is maintained in a file style, and this name is used as a file name that is described in the script, or in the case where the media data after the change is originally in a file style and is managed by having a name attached to it, it is necessary to rewrite the portion within the script that designates this media data to this file name.

Script and data change confirming unit 1008 receives confirmation that changes in the script and media data have all been completed from the user. Then, script and data change confirming unit 1008 outputs the confirmation of change in the script and media data to script and data outputting unit 1009.

Script and data outputting unit 1009 outputs the script and media data which have been changed and confirmed. Script and data outputting unit 1009 transmits data to another terminal or a server typically in the form of an e-mail such as an MMS (Multimedia Messaging Service). Then, script and data outputting unit 1009 outputs the script and media data that have been outputted to another terminal or the like to output script and data storing unit 1010 and data burying unit 1011.

Output script and data storing unit 1010 stores the script and media data that have been outputted from script and data outputting unit 1009. In addition, data burying unit 1011 takes out media data from the outputted script and media data, and buries it in a template.

Figure 43:
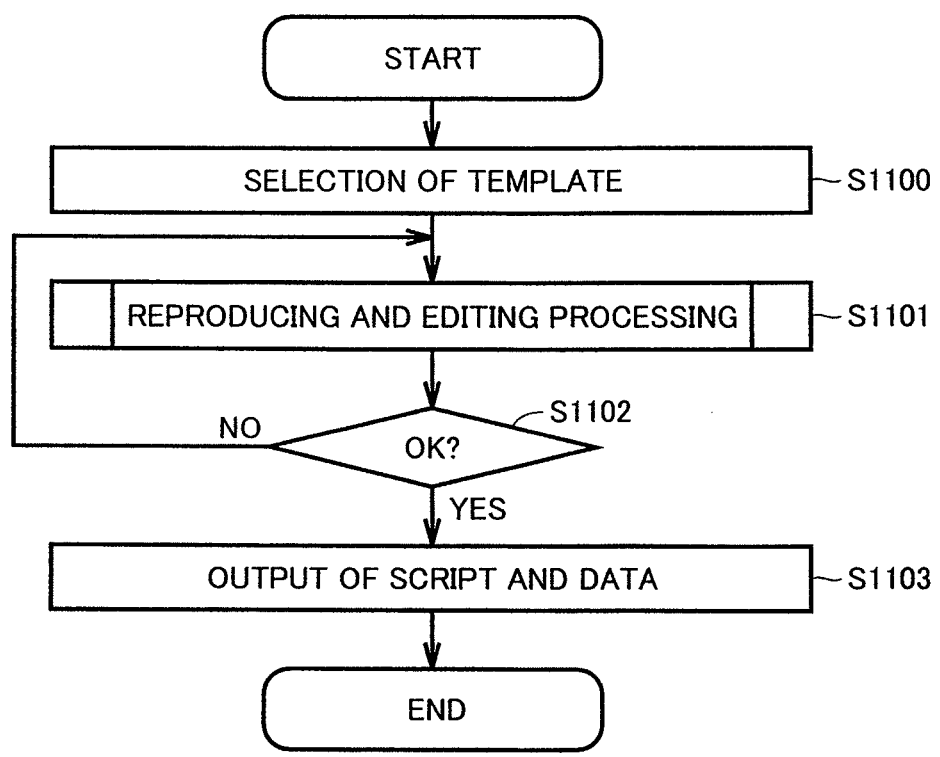
FIG. 43 is a flowchart showing a process in the reproducing and editing engine program.

Next, processing in the reproducing and editing engine program of cellular phone 1 that is a multimedia data processing device according to the second embodiment is described using the flowchart of FIG. 43. The processing shown in the flowchart of FIG. 43 is also implemented by control unit 120 of cellular phone 1, reading out reproducing and editing engine program 131 of which the configuration is shown in FIG. 42 from memory unit 130, and implementing it.

With reference to FIG. 43, first, selecting unit 1001 reads out a template that is stored in template storing unit 1000 or a template that is acquired from another device, and displays a list from which a template can be selected on display 144, and then, accepts a selection by a user (S1100). It is preferable for selecting unit 1001 to convert the initial or representative screen of each template into a thumbnail, and to display this together with the title of this template in step S1100.

Next, Script implementing unit 1003 implements reproducing and editing processing where editing is carried out in accordance with the instruction by the user while reproducing a template that is selected in step S1100 (S1101). Here, the reproducing and editing processing in step S1101 is described in detail below. Furthermore, though reproduction and editing generally have modes that can be switched by the user, it is preferable for editing and reproduction to be carried out simultaneously.

Next, script and data change confirming unit 1008 confirms whether or not change of script by the user has been completed (S1102). Then, in the case where the change of the script has been completed (YES in S1102), script and data outputting unit 1009 outputs either or both of the confirmed script and data (S1103).

At this point, reproducing and editing processing of a template according to the present embodiment is completed.

Figure 46:
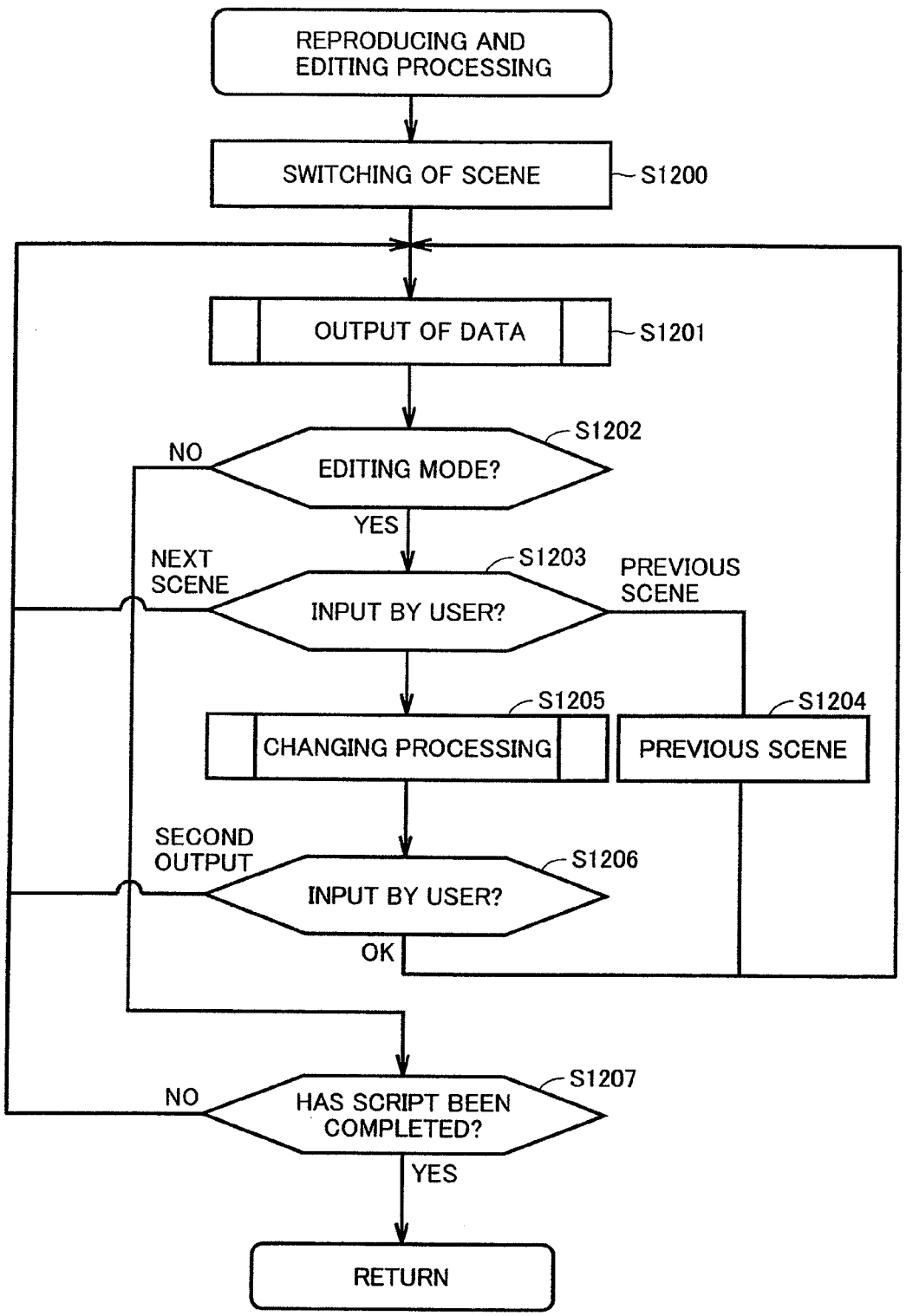
FIG. 46 is a flowchart showing a reproducing and editing process in step S1011.

Next, the reproducing and editing processing in step S1101 is described using the flowchart of FIG. 46.

With reference to FIG. 46, first, script implementing unit 1003 switches the reproduced scene in accordance with the script (S1200). Though the process in step S1200 is not limited in the present invention, a method for first preparing a timetable or a switching table as shown in FIG. 58 and for shifting to the next scene on the basis of this can be cited as the typical method for processing FIG. 58 shows a concrete example of a media managing table in the case where the script shown in FIG. 47 is reproduced and edited. Concretely speaking, with reference to FIG. 58, "still image 1" is reproduced in "scene 1" (FIG. 58(A)), "still image 2" and "text 2" are reproduced in "scene 2" (FIG. 58(B)), and "still image 3" and "text 3" are reproduced in "scene 3" (FIG. 58(C)). Data changing unit 1007 sequentially reproduces and edits scene units with reference to such a media managing table in step S1200.

Next, script and data outputting unit 1009 outputs data using a function of a terminal (S1201). The data form outputted in step S1201 may be any of still images, animated images, music, text and the like. Here, the output processing in step S1201 is described in detail below, by citing a subroutine.

Next, script implementing unit 1003 determines whether the mode is a modification mode or a reproduction mode. In the case where a new template is prepared on the basis of an existing template, sometimes, switching to a reproduction mode can be made unnecessary simply by implementing a modification mode. Contrarily, in the case where an e-mail or a message that has been sent from another terminal is utilized as a new template, the mode is usually a reproduction mode, and it is preferable for the mode to be changed to a modification mode.

In the case where the mode is a modification mode in step S1202 (YES in S1202), an input is additionally acquired from the user, and user changed data determining unit 1004 determines the type of input (S1203).

As a result of the determination in step S1203, in the case where the input from the user is an input that indicates a reproduction of the previous scene ("previous scene" in S1203), script implementing unit 1003 carries out a process for displaying the scene before this script (S1204).

Alternatively, as a result of the determination in step S1203, in the case where the input from the user is an input that indicates a process of changing the script ("changing process" in S1203), data changing unit 1007 carries out a concrete changing task (S1205). Here, the changing task in step S1205 is described in detail below, by citing a subroutine.

Furthermore, script and data change confirming unit 1008 determines whether or not the script is again confirmed after obtaining an input from the user after the change in step S1205 (S1205). As a result of the determination, in step S1206, in the case where the script after the change is reconfirmed ("second output" in S1206), the process returns to step S1201, and script and data outputting unit 1009 outputs the data after the same scene has been changed in step S1201. This is effective when the scene cannot be confirmed merely by changing the still image, such as in a case where a still image and music are simultaneously outputted.

Then, this reproducing and editing processing is completed in the case where the mode is not a modification mode in step S1202 (NO in S1202), and the reproduction of this script has been completed (YES in S1207).

Figure 44:
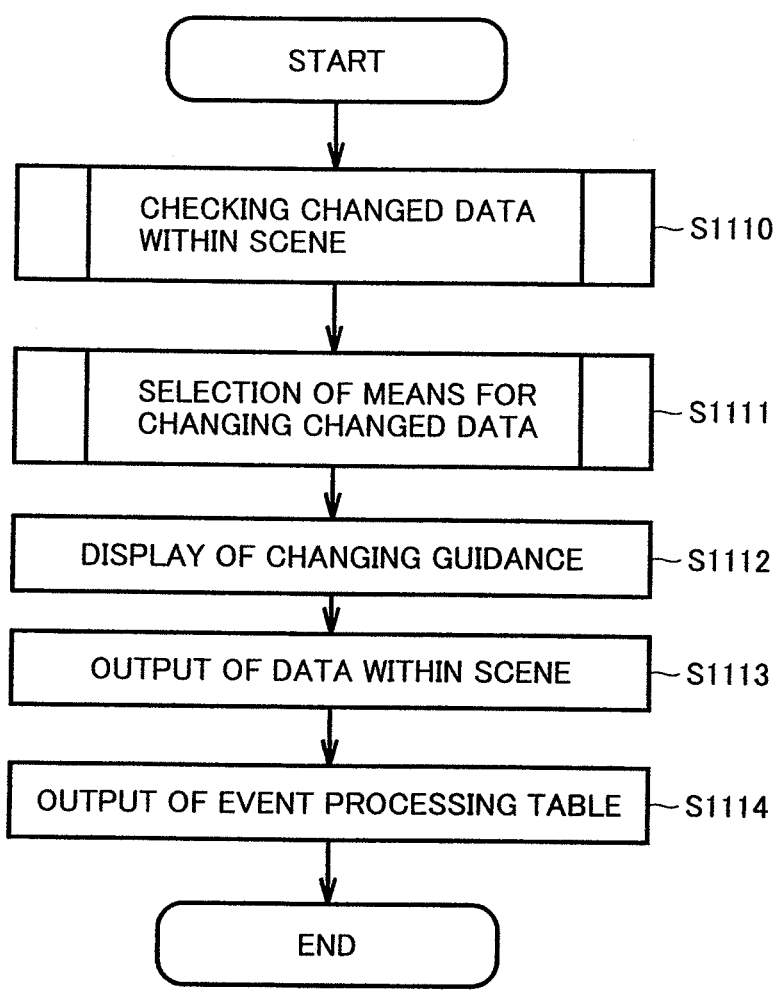
FIG. 44 is a flowchart showing a data outputting process in step S1201.

Next, the data outputting process in step S1201 is described in detail using the flowchart of FIG. 44.

With reference to FIG. 44, first, user changed data determining unit 1004 determines the existence of changed data within this scene (S1110). The determination process in step S1110 is described in detail below, by citing a subroutine.

Figure 49:
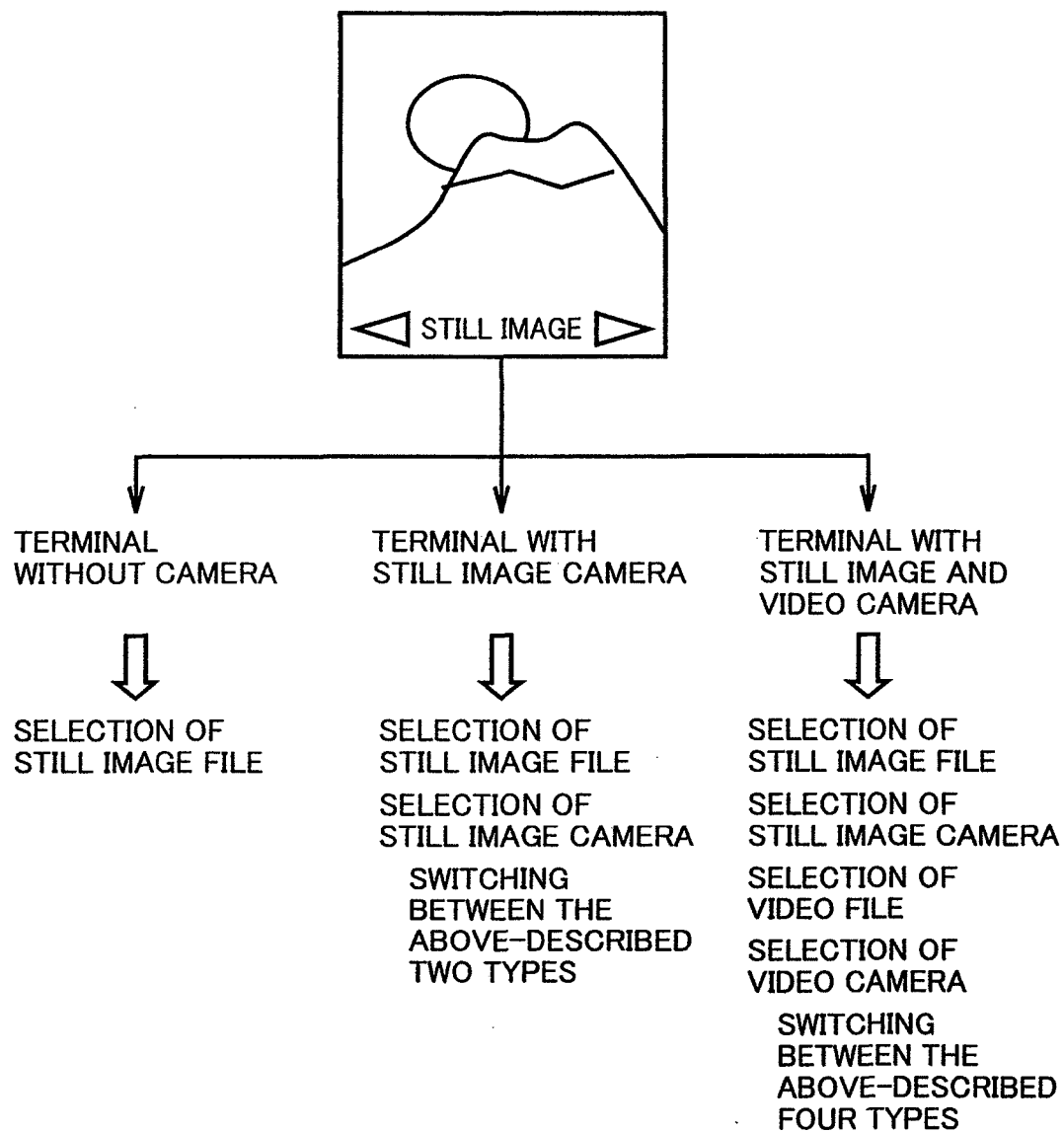
FIG. 49 is a diagram schematically showing that a different function is selected even when the script is the same in accordance with a terminal.

Next, terminal function selecting unit 1005 selects a means for changing the changed data that has been determined in step S110 (S1111). The same script may have a separate function that can be used for reproduction, for example, depending on the terminal, as shown in FIG. 49. It is possible to take a difference in software of the terminal in addition to a difference in the hardware of the terminal into consideration for the selection of a function. In this case, it is preferable to select a function that is available for each terminal, such as selection of a still image file or selection of a video camera, in step 1111. Here, the process of selecting a means for changing the changed data in step S1111 is described in detail below, by citing a subroutine.

Next, data changing unit 1007 displays guidance for change on display 144 as an operation guide (S112). The modification guidance displayed in step S1112 is a guide function for selecting a file to be switched in the case where, for example, a still image is switched, and typically indicates a display of a still image file selection button. Data changing unit 1007 dynamically generates such guidance in step S112, and thereby, the user can be easily notified as to how the data can be changed.

Next, script implementing unit 1003 implements outputting of a scene, together with the change guidance displayed in step S1112 (S1113).

Then, script and data temporarily storing unit 1002 stores a pair of the means (application) for modification selected in step S1111 and the input event that corresponds to the modification guidance that is generated in step S1112 in a scene event table for each piece of modification data (S1114). In step S1114, concretely speaking, script and data temporarily storing unit 1002 stores, as shown in the concrete example of the scene event table of FIG. 64, that changed data "still image 2" can be changed by means of an "image taking" application that is started up by an "F1" key event, and by means of a "file acquiring" application that is started up by an "F2" key event, and changed data "text 2" can be changed by means of a "file acquiring" application that is started up by a "select" key event.

Figure 65:
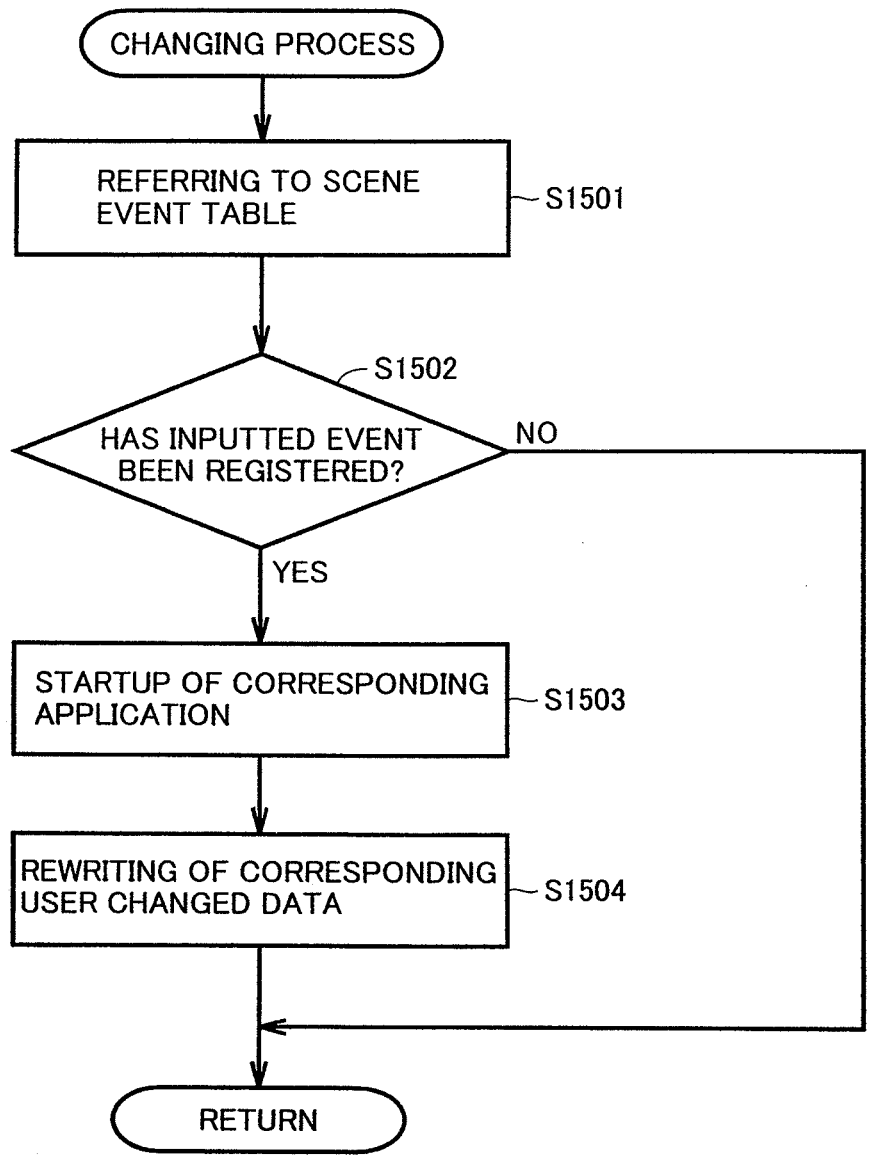
FIG. 65 is a flowchart showing a changing process in step S1205.

Next, the process of changing in step S1205 is described using the flowchart of FIG. 65.

With reference to FIG. 65, first, data changing unit 1007 refers to a scene event table (S1501). In the case where the user inputted event that has been inputted in step S1203 is not registered in the scene event table (NO in S1502), this process is completed.

In the case where the user inputted event that has been inputted in step S1203 is registered in the scene event table (YES in S1502), script implementing unit 1003 determines and starts up the corresponding application selected from the scene event table (S1503). Then, data changing unit 1007 determines the corresponding user changed data selected from the scene event table and acquires media data from the application that has been started up, and then, this user changed data is rewritten to the media data that has been acquired from the application that has been started up (S1504). Concretely speaking, when key "F1" is pressed, an "image taking" application is started up in step S1503. In addition, when the user takes a still image using the "image taking" application and finishes this application, user changed data "still image 2" is rewritten with the newly taken data in step S1504.

Here, in the case where two or more places into which media data that has been inputted into a template can be inserted exist when the user carries out an inputting operation of media data, such as images, sound, video and text, in the above-described example, it is possible to insert this media data in two or more places. Alternatively, the media data that has been inputted by the user may be divided so that a portion thereof is inserted in two or more places.

In addition, in the case where media data having a time axis, such as sound, music, video and animation, is inserted into a template, this media data may be prohibited from being inserted, reproduction speed of each piece of media data may be increased so as to adjust the reproducing time to a prescribed time, reproduction may be completed on the way after a prescribed time has passed, or only a portion that is contained within a prescribed time may be reproduced, in the case where the reproduction time of the respective pieces of media data is longer than the time that has been prescribed in advance in the template. Alternatively, time prescription of the template may be changed so that each piece of media data is completely reproduced.

In addition, when media data such as text, still images, animated images, sound, music and animation is inserted, file selection and startup of an application, such as a camera, are carried out, in accordance with the inserted media data in the above-described example. However, a user may select media data freely and convert this media data to media data that is contained in a template. Extraction of only sound from a video that has been taken so as to be buried in a template, sampling of the leading frame of a video as a still image so as to be buried in a template or the like, for example, may be carried out.

Here, at the time of the above-described text inputting, it is preferable to read in sentence formats stored in the apparatus, text which is temporarily stored in a clipboard, an address book or schedule that is stored within an apparatus and that can be acquired as text data, and data of a transmitted or received e-mail.

Next, the determination process in step S1110 is described using the flowchart of FIG. 59.

With reference to FIG. 59, user changed data determining unit 1004 refers to the scene that is reproduced at this time and the media managing table (S1301 and S1302), and determines the media data of this scene. In the case where "scene 2" of the script shown in FIG. 47 is reproduced in cellular phone 1 at this time, user changed data determining unit 1004 refers to the media managing table shown in FIG. 58 and determines "still image 2" and "text 2" to be changed data.

Next, the process of selecting a means for changing of the changed data in step S111 is described with reference to FIG. 60. FIG. 60 is a table for recording the correspondence between data acquiring programs stored in cellular phone 1 and media types supported by cellular phone 1, and is a table that is stored in memory unit 130 of cellular phone 1. Concretely speaking, the table shown in FIG. 60 shows that an "image taking" application is registered in this cellular phone 1 so that "still images" and "videos" can be acquired, a "sound data recording" application is registered so that "sound" can be acquired, and a "file acquiring" application is registered so that "still images," "videos" and "text" can be acquired.

In step S1111, terminal function selecting unit 1005 refers to the above-described table and selects an available means for changing on the basis of the media type of the changed data that has been determined in step S1110. In the case where the media type of the changed data is "still images," for example, the applications of "image taking" and "file acquiring" are selected.

Figure 53:
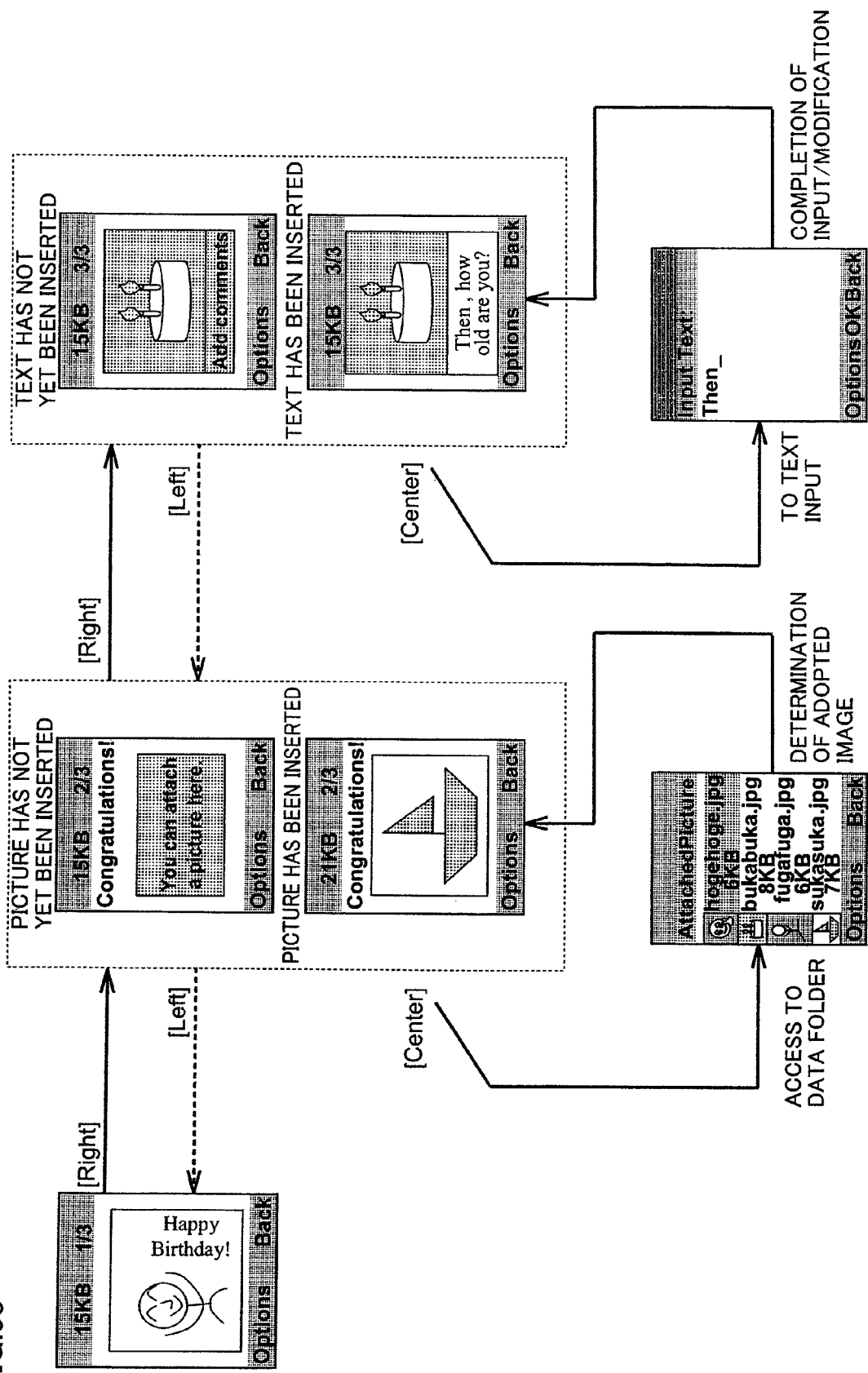
FIG. 53 is a diagram showing a concrete example of screen transition of rewriting by means of a file acquiring application.

FIG. 53 shows concrete examples of displays where screens transition at the time when a script is implemented in cellular phone 1. With reference to FIG. 53, in scene 2, the process in step S1113 is implemented so that still images and texts are displayed, and at the same time, the process in step S1112 is implemented so that changing guidance is displayed. That is to say, text (guidance) "you can attach a picture here" are displayed in scene 2 of FIG. 53, and when the corresponding button is pressed, the data of still images in a data folder is displayed in a list in the form of thumbnails. In this screen displaying a list, it is more preferable for file names and data size information to be shown together.

In addition, in the case where two or more types of media, such as still images and music, are outputted in the same scene, the present cellular phone 1 may have a configuration where any of the following methods is used: a method for selecting either still image data input or music data input by means of a user operation, such as the pressing of a shortcut key, from the display where two or more modification guidance are shown, for example, "you can attach a picture here" and "you can attach music here;" a method for showing a first guidance of "you can attach a picture here" followed by a guidance "you can attach music here" by chronologically switching the guidance; or a method for shifting to a still image data input or a music data input as a result of a selection by a user from a menu that is displayed so as to be selectable, in such a manner that the guidance "you can attach data here" showing that a type of media data can be inserted is displayed and transitions to the next screen when the corresponding button is pressed, where "attach a picture" and "attach music" are displayed in the next screen.

In addition, in the case where media data that can be modified and media data that cannot be modified can be distinguished, it is preferable for the present cellular phone 1 to show the user the data that can be modified in this scene, by distinguishing it from the others. Such determination can be made by describing whether or not media data can be changed in the script.

More preferably, the present cellular phone 1 is provided with a function of skipping to the next scene or returning to the previous scene. Efficient preparation and confirmation of an e-mail become possible during conventional reproduction, in a manner where a user can press a button to skip the remaining seven seconds after one second has passed by using a "next scene" function in the case where scene 1 is displayed for 8 seconds.

More preferably, the present cellular phone 1 has a function of stopping the reproduction at a point in time when a user shows an intention to edit. It is preferable for a user to press a button, for example, when still images are switched in scene 2 of FIG. 53, and thereby, it is preferable for the timer of reproduction to be stopped when a still image is selected from a still image selecting screen. Here, the start of the scene at the time of reproduction when the scene is stopped for carrying out an editing operation, reproduction from the beginning of the entirety and resumption from the beginning of this scene can be considered in the case where the reproduction is resumed after changing of data has been completed. The beginning of this scene indicates the beginning of scene 2, that is to say, the $8^{th}$ second, in the case where the data is switched by pressing an editing button at the 13$^{th}$ second, where scene 2 is planned to be reproduced from the 8$^{th}$ second to the 15 second.

Here, a case is considered in the above-described editing process of a template, where a user wants to change the editing of a template to editing of a template that is different from the template that is selected at this time by the user and is being edited at a point in time where media data, such as text, still images, video, sound, music and animation is inserted in one or more places of the template. In such a case, the media data that has been inserted so far may be discarded or inserted into a template after the change to whatever template the editing is changed. In addition, in such a case, it may be impossible to insert the media data that has been inserted before the change into a template after the change, and at this time, the change to such a template may not be permitted, or the media data that is impossible to be inserted may be discarded so that only the media data that can be inserted is inserted. In addition, in the case where the media data that has been inserted into the template before the change can be inserted in two or more places of the template after the change, the media data may be inserted into one place, or two or more places. In addition, from the start, the change to another template may be completely prohibited.

Modification

Next, a process where a script that includes reproduction order information of media data and implementation order information of the actions is reproduced so that the actions are implemented and the script that includes the reproduction order information of media data is prepared is described.

The description of the script that is shown in FIG. 50 defines the actions and drawing regions in the same manner as the description of the script shown in FIG. 6. The description of the script shown in FIG. 61 defines the reproduction of the media data and implementation order information of the actions in lines 17 to 33. In addition, lines 18 to 32 show sequential implementations of scene 1 to scene 3, which are respectively defined in lines 19 to 21, lines 22 to 26 and lines 27 to 31.

In addition, lines 22 to 26 define the implementation of the second scene. In further detail, line 23 describes that the image shown by "SecondImage.jpg" is displayed in the "Image" region. Line 24 describes that the text shown by "SecondText.txt" is displayed in the "Text" region. Line 25 describes that the action that is referred by "act_image" is implemented in the case where a "select" key event of "UI" is detected.

Figure 48:
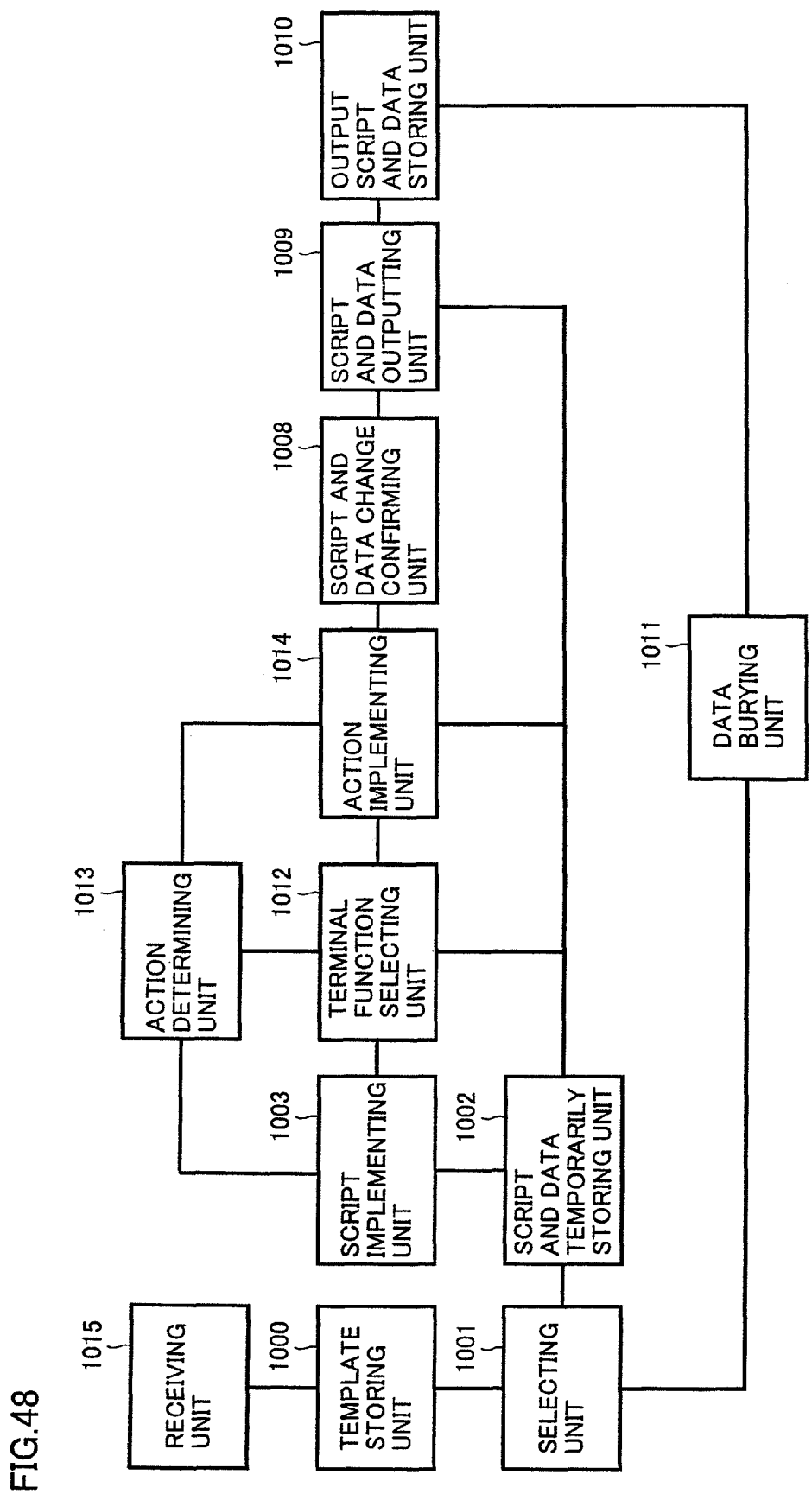
FIG. 48 is a block diagram showing the functional configuration of a reproducing and editing engine program 131 according to a modification of the second embodiment.

Furthermore, FIG. 48 is a block diagram showing a functional configuration of reproducing and editing engine program 131 of cellular phone 1 according to a modification of the second embodiment. In FIG. 48, the components to which the same numbers as in FIG. 42 are attached are the same components as those shown in FIG. 42. That is to say, with reference to FIG. 48, the functions of reproducing and editing engine program 131 of cellular phone 1 according to the modification of the second embodiment are formed so as to include a template storing unit 1000, a selecting unit 1001, a script and data temporarily storing unit 1002, a script implementing unit 1003, a terminal function selecting unit 1012, an action determining unit 1013, an action implementing unit 1014, a data change confirming unit 1008, a script and data outputting unit 1009, an output script and data storing unit 1010 and a data burying unit 1111. Here, components which are different from those of FIG. 42 are described.

Terminal function selecting unit 1012 selects a terminal function in accordance with the description of the script. A terminal function is described in a script in a form such as, for example, "dest" in the "action" sentence of lines 12 to 15 of FIG. 50. Then, terminal function selecting unit 1012 outputs this result of selection to action implementing unit 1014.

Action determining unit 1013 determines the actions in accordance with the description of the script. The determination of the actions in action determining unit 1013 is, for example, implemented by interpreting the description with "type" in lines 12 to 15 of the script shown in FIG. 50. Then, action determining unit 1013 outputs this determination result to action implementing unit 1014.

Action implementing unit 1014 processes the data that has been obtained by using the function selected by terminal function selecting unit 1012 on the basis of the actions determined by action determining unit 1013. It becomes possible to carry out a variety of processes, such as synthesis of images, connection of music and special effects, in addition to simple insertions and replacements, in action implementing unit 1014, by implementing the actions which are clearly described.

Here, the process in the reproducing and editing engine program in cellular phone 1 according to the modification of the second embodiment is the same as that shown in FIG. 43. In addition, the reproducing and editing processing of the navigation frame which is a script in cellular phone 1 according to the modification of the second embodiment is also approximately the same as that shown in FIG. 46.

Here, in the present modification, first, an action managing table as shown in FIG. 63 is prepared in the processing shown in FIG. 46, in addition to a media managing table as shown in FIG. 58. FIG. 63 is a diagram showing a concrete example of an action managing table in the case where the script shown in FIG. 61 is reproduced and edited. Concretely speaking, with reference to FIG. 63, there is no action that can be implemented in "scene 1" (FIG. 63(A)), a "still image burying action" can be implemented in "scene 2" (FIG. 63(B)), and a "text burying action" can be implemented in "scene 3" (FIG. 63(C)). Cellular phone 1 in the modification refers to such an action managing table so that scene units are sequentially reproduced and edited.

Next, the data outputting process in step 1201 according to the modification is described in detail using the flowchart of FIG. 62.

With reference to FIG. 62, first, action determining unit 1013 refers to the action managing table so as to determine the actions that can be implemented in this scene (S1401). Next, action determining unit 1013 displays guidance for action implementation on display 144 (S1402). The guidance for action implementation is a guide function of the operation for starting the implementation of the actions. The guidance displaying process of action implementation in step S1402 is the same as the display process of changing guidance in step S1112 according to the first embodiment. Then, Script implementing unit 1003 implements the output of the scene together with the guidance displayed in step S1402 (S1403).

Figure 45:
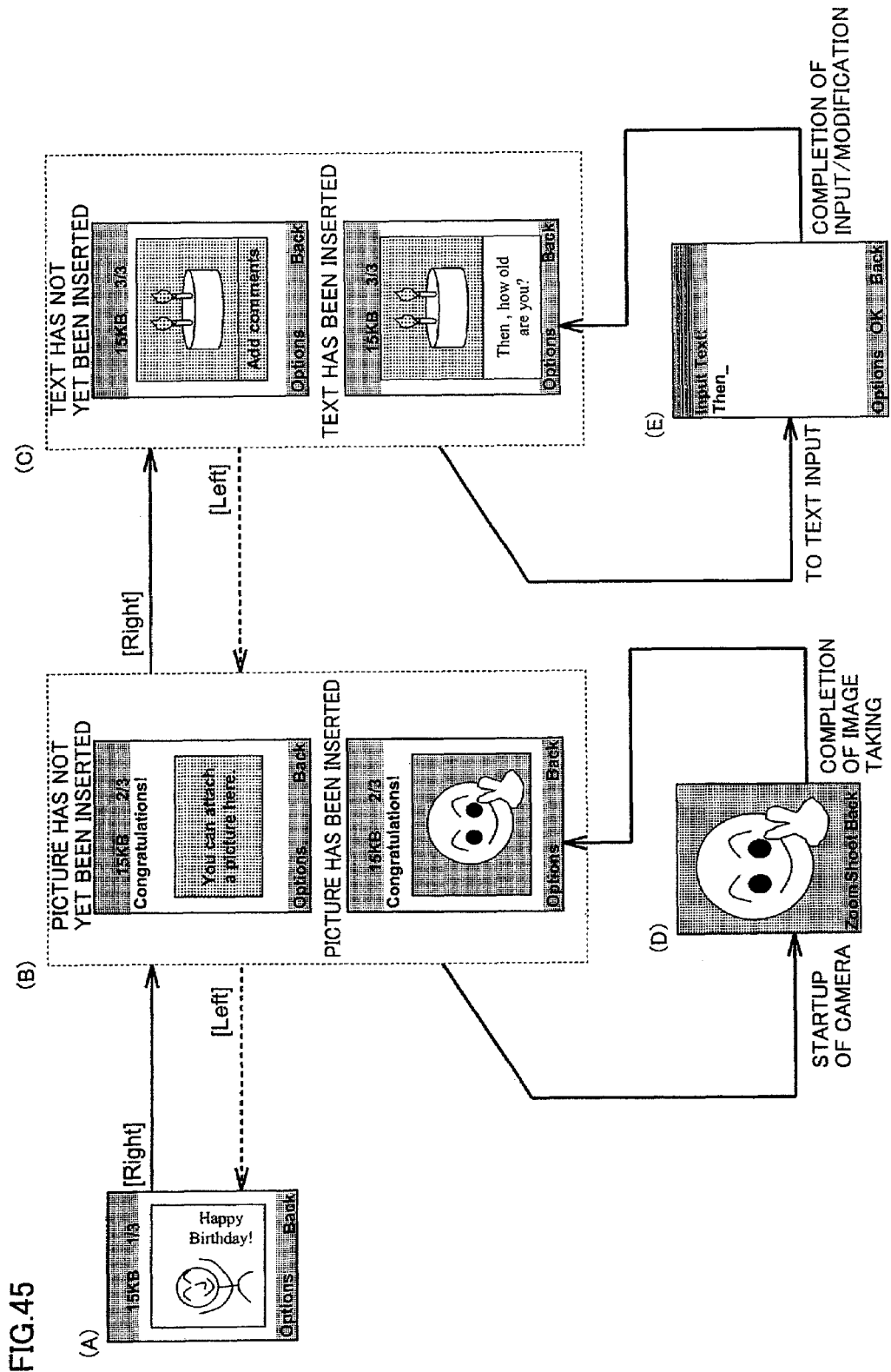
FIG. 45 is a diagram showing a concrete example of a screen transition of rewriting by means of a camera startup application.

FIG. 45 shows a concrete example of a display of a screen transition at the time when a script is implemented in cellular phone 1 according to the modification. With reference to FIG. 45, the process in step S1113 is implemented so that a still image is displayed, and at the same time, the process in step S1112 is implemented, so that the changing guidance is displayed in scene 2 shown in FIG. 45(B). That is to say, in scene 2 shown in FIG. 45(B), text (guidance) "you can attach a picture here" are displayed, and a camera application is started up, as shown in FIG. 45(D) when the corresponding button is pressed.

Here, the descriptions specific to the respective terminals having different available functions, as shown in FIG. 49, may all be described in the script, and only the descriptions of the functions that can be used by the terminal at the time of the reproduction of the template may be made effective. 3D liquid crystal display function, display function with two or more screens and the like, for example, can be specially cited as the above-described functions.

In addition, reference information to media data having different contents for each attribute of the user who is an object may all be described in the script, and only the media data that is suitable for the attributes of the user who is an object may be made effective at the time of the utilization of the template in the configuration. The languages utilized by a user, regions where a user lives and the like, for example, can be specially cited as the above-described attributes.

Figure 52:
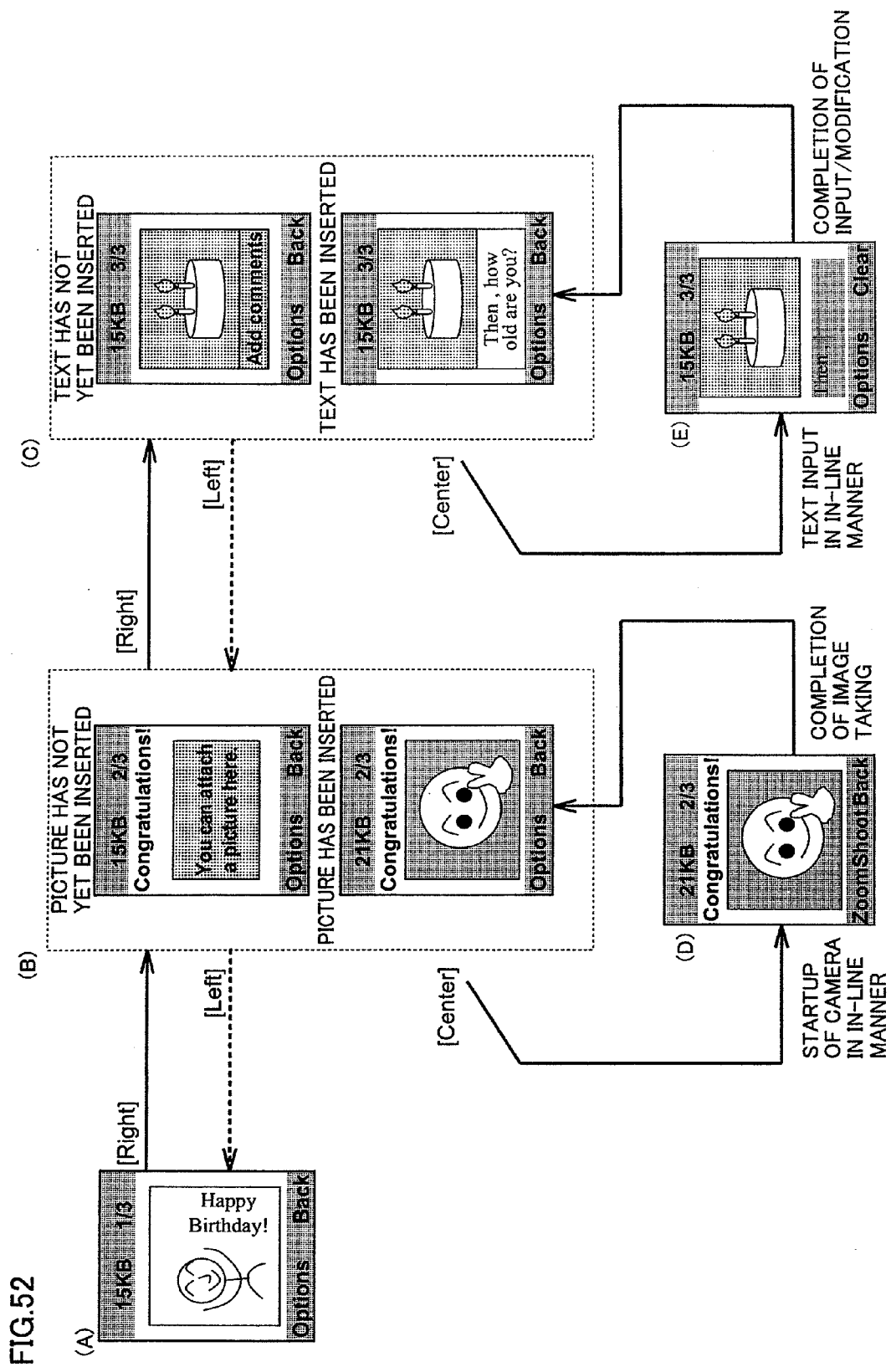
FIG. 52 is a diagram showing a concrete example of screen transition of rewriting by means of an inline camera application and an inline text inputting application.

Here, though in the above embodiments, a method for displaying a UI part that is indicates the startup of a camera on a screen and for starting up a camera by means of a predetermined key operation is described, as shown in FIG. 52, the camera may be started up in an in-line manner in this time slot, a UI part that indicates that an image is taken may be displayed for a predetermined period of time (FIG. 52(D)), an image may be taken by the camera when a predetermined key operation is carried out within this time slot, and this image or video may be reproduced on the spot. Here, at this time, in the case where a predetermined time has passed during which the UI part of "take image" is displayed without taking an image, the next reproduction process may be started in this time slot. Alternatively, the reproduction may be paused at the time of the termination of this time slot, and the system may stand by until the "take image" operation is carried out. Alternatively, the reproduction in this time slot may be repeated by returning to the beginning of this time slot. This repeating process may be carried out infinitely, as long as the "take image" operation is not carried out or the interruption process is not carried out, or the process may be repeated only for a predetermined number of times, after which the process may proceed to the next process, even in the case where the "take image" operation is not finished.

Here, a case is considered where the total size of the message data exceeds the upper limit of the size that can be transmitted in the process for preparing a message in the above-described embodiment. As a measure against this, an alarm of an excessive size may be issued so as to halt the transmission at the point in time when the user carries out an operation of transmitting the message. Alternatively, the sum of the size may be searched each time that the user inserts media data, so that an alarm is issued at the point where the size exceeds the limit, and then, this insertion operation may be invalidated. Alternatively, in the case where the size of the media data which is to be inserted is found in advance, it may be determined whether or not the sum of the total message size at this time and the size of such media data exceeds the upper limit of the size that can be transmitted, and the selection for the media data in the case where the sum exceeds the limit may not be permitted.

Here, the above-described FIGS. 50 and 61 show a concrete example of the script which is used only on the preparing side. Lines 12 to 15 of this script are solely utilized on the device side that prepares and transmits a message. Other portions are required at the time when a script is reproduced on the device side that receives the message. When such a script is outputted in script and data outputting unit 1009, unnecessary descriptions in the receiving device, the commands that cannot be transmitted in the communication procedure and the like which are included in the script should be finally eliminated or deleted before being outputted. In such a case, it is preferable to delete these in script and data outputting unit 1009 which is provided with rules to the above-described effect concerning deletion.

Here, it is more preferable for script and data outputting unit 1009 to add the address from which the template that is utilized at this time has been downloaded before sending a message, so that it becomes convenient in the case where the person who receives the message downloads the template itself from a server on the reception side for the purpose of preparing another message by utilizing the same template.

Furthermore, it is preferable to convert a script into a format such as, for example, HTML, in script in data processing unit 1009, so that the converted script can be transmitted with the original script. By doing this, it becomes possible to reproduce the script on the reception side in the case where the original script cannot be processed on the receiving side but it is possible the process the converted script.

Furthermore, the script before the deletion process is carried out, and media data may be stored in the output script and data storing unit 1010 so that it becomes convenient in the case where the template is edited so as to become the original, and the transmitted message is edited again so as to be transmitted. In addition, for the same purpose, as shown in FIG. 55, a table that shows the correspondence between the transmitted message an the utilized template may be maintained, and, for example, the above-described table may be searched so as to automatically select template "considerable amount of free time," and the media data that is included in message "1221" may be buried in template "considerable amount of free time" by data burying unit 1011, and after that, editing may be carried out in the case where message "1221" is desired to be edited again.

In order to make editing easier, as shown in FIGS. 51A to 51D, it is preferable to prepare thumbnail for each scene. This can be easily implemented by preparing the entirety of the timetable or the sequence table, as shown in FIG. 10, by interpreting the entirety of the script that is included in the template. By preparing such a thumbnail for each scene, the reproduction of this scene can be started at the point of reproduction implementation triggered by the selection of an arbitrary thumbnail by means of a user operation from a list of thumbnails that is displayed on the basis of the script, and then, in the case where the script is rewritten, it becomes easily possible to rewrite only desired data without reproducing this script from the beginning.

Such a script is implemented in cellular phone 1, and thereby, the contents of multimedia can be easily prepared. That is to say, a predetermined operation can be carried out following the guidance information which chronologically varies and is displayed when this script is carried out, and thereby, multimedia contents can be easily prepared according to an instinctive method. In addition, a predetermined operation can be carried out on a template into which media data has already been inserted by following guidance which chronologically varies and is displayed when this script is carried out, and thereby, media data can be easily replaced and multimedia contents that are desired by the user can be easily prepared.

Furthermore, such a template is transmitted to another cellular phone 1 so as to request a reply, and thereby, it is possible to make an operation desired by the sender side be carried out on the receiver side. A text message to the effect that, for example, the insertion of a new video to template "considerable amount of free time" as shown in FIG. 21 is requested is added to an e-mail which is transmitted to another cellular phone 1, and thereby, implementation of an editing task where new video data is inserted into this template can be instructed to the user of this cellular phone 1.

Third Embodiment

Next, a case where the multimedia data processing device is a television receiver (hereinafter abbreviated to TV) is described as the third embodiment. That is to say, a layout and time information of a television screen are described in a template according to the third embodiment, and a television program is handled as one piece of media data.

With reference to FIG. 74, a data communication system is formed so as to include a TV 6 that is a multimedia processing device, a template providing server 2 which provides a template that is described in a script language, an EPG server 3 which provides program information and program related information of a TV, a WWW server 4 which provides internet contents, and a broadcasting station 5 which provides a program to TV 6 via broadcasting waves.

The configuration of TV 6 as a multimedia data processing device is the same as that shown in FIG. 4 according to the first embodiment. Furthermore, TV 6 includes main region 7401 and sub-regions 7402 and 7203 in its display unit.

FIG. 75 shows a concrete example of a script that includes a drawing information describing portion that refers to media data, and FIG. 76 shows a concrete example of a script that includes a program table information describing portion that describes program information in accordance with a time slot, and FIG. 77 shows a concrete example of a script that includes a description which relates the two scripts shown in FIGS. 75 and 76 to each other. Here, the script shown in FIG. 76 corresponds to the script that includes the user navigation information describing portion according to the first embodiment, and is a script which does not navigate the operation of the user who views and listens to TV 6, but works to automatically determine the program to be displayed and reproduced in accordance with a time slot according to the present embodiment. Program table information is obtained by analyzing this script.

Next, the flow of data processing in TV 6 is shown. The flow of reading in and implementing processing of a script and event processing is roughly the same as that of the processing shown in FIG. 9, and therefore, the flow is described with reference to FIG. 9.

With reference to FIG. 9, first, TV 6 acquires the respective scripts shown in FIGS. 75, 76 and 77 (S12) and reads in these scripts (S13). Furthermore, the syntaxes of the respective scripts that have been read in are analyzed (S14) and a timetable is prepared (S15). After that, these scripts are implemented (S16) in accordance with the prepared timetable.

Concretely speaking, lines 14 and 15 of FIG. 75 designate an image file on the WWW server, and therefore, the corresponding file is acquired from WWW server 4 in accordance with such a description in step S12, and is displayed in sub-regions 7402 and 7403, which are positions designated as regions "right" and "left," at the time of the implementation in step S16.

In addition, line 13 of FIG. 75 describes that video contents "tvcontents" are reproduced and displayed in main region 7401 (main), and such video contents "tvcontents" are movie data or a TV channel that are determined in accordance with the description of the script shown in FIG. 76. The description in line 5 of FIG. 76 describes that the script shown in FIG. 76 designates a portion of media data of which the ID in the script shown in FIG. 75 is "tvcontents."

Figure 78:
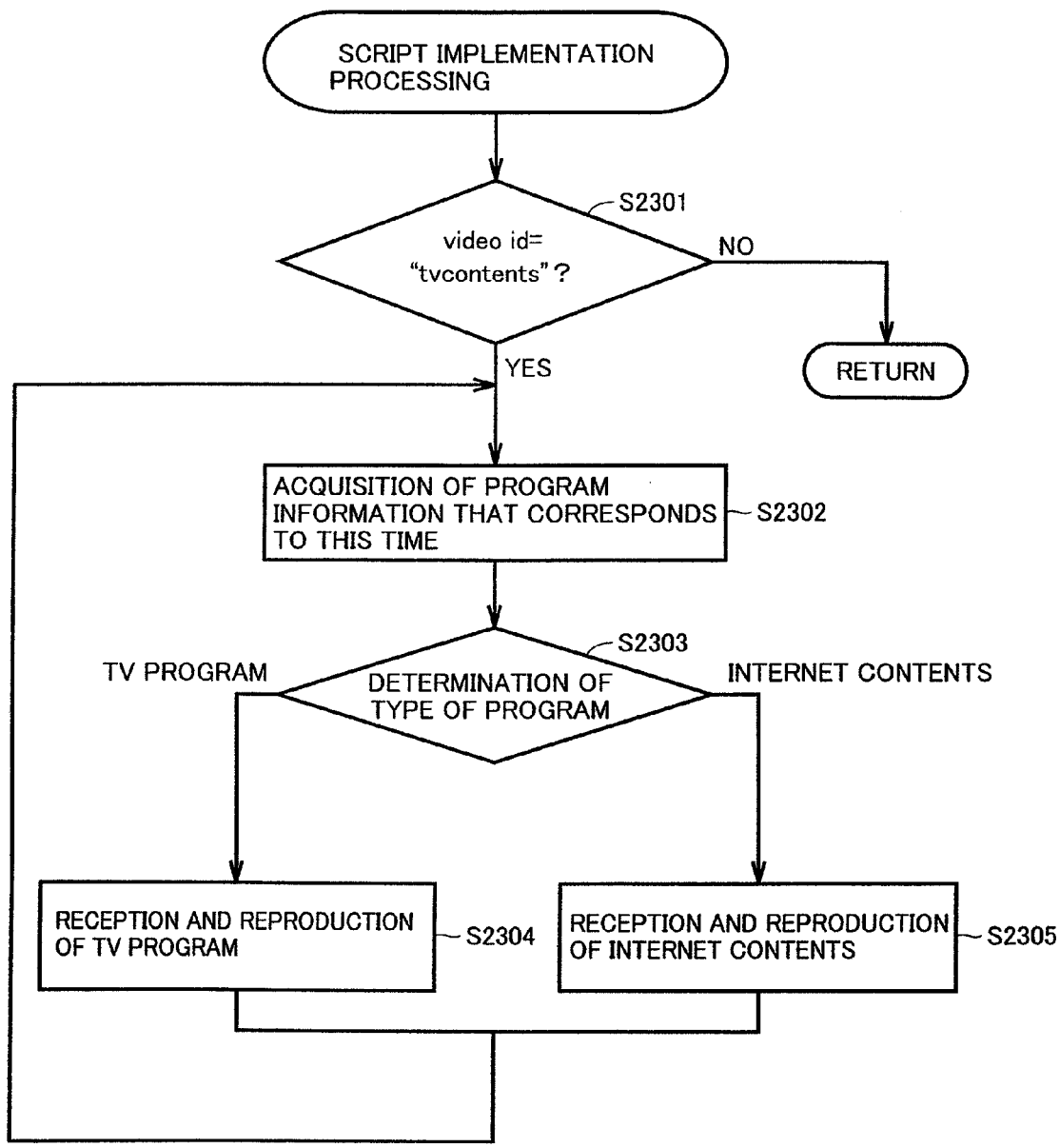
FIG. 78 is a flowchart showing the flow of a process for determining the contents to be received and reproduced.

Next, the flow of the determination process for determining these video contents "tvcontents" in TV 6 is described using the flowchart of FIG. 78.

With reference to FIG. 78, first, when it has been analyzed in TV 6 that there is a designation 'video id="tvcontents"' in the drawing information describing portion of the script (YES in S2301), the program table information that is the result of the analysis of the script shown in FIG. 76 is referred to so as to acquire program information that corresponds to the present time (S2302).

Lines 6 to 13 of FIG. 76 describes that the program of channel number 4 of a TV corresponds to video contents "tvcontents" between 0 o'clock and 2 o'clock, and lines 14 to 21 describe that the internet contents which are designated by the URL described in line 20 correspond to video contents "tvcontents" between 2 o'clock and 4 o'clock. Therefore, video contents "tvcontents" are determined to be the television program of channel number 4 according to the above description when this time is a time between 0 o'clock and 2 o'clock, and therefore, the type of this program information (TV program) is determined in step S2303, and TV 6 receives the corresponding broadcasting waves from broadcasting station 5 and carries out a display in a predetermined position in accordance with the above-described results of the determination (S2304).

Meanwhile, video contents "tvcontents" are determined to be the internet contents which are designated by the URL described in line 20 of FIG. 76 according to the above description when this time is a time between 2 o'clock and 4 o'clock, and therefore, the type of this program information (internet contents) is determined in step S2303, and TV 6 acquires the corresponding contents data from WWW server 4 and carries out a display in a predetermined position in accordance with the above-described results of the determination (S2305).

Here, though the portion of program description at and after 4 o'clock is omitted in the script shown in FIG. 76, there is a similar description for this time, and a similar process is carried out when this time is a time other than the above-described time.

As a result of the above-described processing, in TV 6, the media data that has been acquired from WWW server 4 is reproduced and displayed in sub-regions 7402 and 7403, and a TV program or internet contents which are designated in accordance with a time slot on the basis of the program table information that is obtained by analyzing the script shown in FIG. 76 are acquired from broadcasting station 5 or WWW server 4 so as to be reproduced and displayed in main region 7401.

In addition, though in the present embodiment, still image data that has been acquired from a WWW server is displayed in sub-regions 7402 and 7403, the description in lines 14 and 15 of FIG. 75 may be converted to a similar description as that of line 13 so as to be combined with the description of the script shown in FIG. 76, or description concerning switching of media data or events which occur as time passes as described in the first and second embodiments may be added, and thereby, broadcasting waves, program related information and the like may be acquired from EPG server 3, WWW server 4 and broadcasting station 5 in accordance with a time slot so as to be displayed, or the UI components that receive the operation by the user may be displayed so as to implement the corresponding actions in the case where an operation is carried out on these UI components by the user.

Furthermore, switching of channels and adjustment of sound volume, brightness and the like of a TV, transition of a link to WEB contents for displaying information that interlocks with the program that is reproduced in main region 7401 when a user presses a button that is displayed as "detailed information" or the like, recording operation in the case where TV 6 is provided with a recording function or is connected to a recording apparatus, transmission of a screen shot which is recorded from the screen to another user by means of an e-mail or the like, signal issue to a predetermined dial number in the case where TV 6 is interlocked with a telephone function and the like can be cited as the above-described actions.

The data communication system that is formed so as to include TV 6 which is a multimedia data processing device according to the present embodiment has the above-described configuration, and therefore, has an advantage, primarily for those who prepare content, where multimedia contents data can easily be prepared by combining TV programs and internet contents.

Here, though a case where a template that is provided by server 2 is processed in cellular phone 1 or TV 6 of which the configuration is shown in FIG. 2 as a concrete example is described in the first to third embodiments and in the modification of the second embodiment, the processing device for processing a template is not limited to a device like cellular phone 1, where all the functions are integrally formed. That is to say, the respective functions implemented in cellular phone or TV 6 may be achieved in devices which are independent from each other, such as an acquiring device for acquiring a template, like a receiver, a media data inputting device for acquiring an image, like a camera, and a media data outputting device, like a television receiver. In such a case also, data and control signals are mutually sent and received by means of communication or wireless communication via a dedicated line, reproducing and editing processing of the above-described script is implemented in the data processing device, the acquired script is processed in the acquiring device, and editing of multimedia contents can be carried out by using media data or the like that has been inputted by the media inputting device. Then, a template that has been acquired by the media data outputting device or multimedia data where such a template is edited can be reproduced.

Furthermore, a script implementing method for implementing such a script can be provided as a program. Such a program can be recorded in a computer readable recording medium, such as a flexible disk, a CD-ROM (Compact Disc-Read Only Memory), a ROM (Read Only Memory), a RAM (Random Access Memory) or a memory card, which is used with a computer, so as to be provided as a program product. Alternatively, a program can be provided by being recorded in a recording medium, such as a hard disk, which is built into a computer. In addition, a program can be provided by downloading via a network.

A program product that is provided in such a manner is installed in a program storing unit, such as a hard disk, and then, is implemented. Here, a program product includes a program itself and a recording medium in which a program is recorded.

The embodiments which are disclosed herein are illustrative in all respects, and should not be considered to be limitative. The scope of the present invention is defined not by the above description, but by the claims, and is intended to include meanings which are equivalent to the claims and all the modifications within the scope.

INDUSTRIAL APPLICABILITY

As described above, multimedia contents can be easily prepared according to this invention, and therefore, this invention can be advantageously applied to the preparation of multimedia contents.

The invention claimed is:

1. A multimedia data processing device including a control unit and a memory, said control unit reads a reproducing and editing engine program from the memory and performs processes in accordance with the reproducing and editing engine program, the reproducing and editing engine program comprising:
 a script implementing unit for reproducing data in accordance with a script included in a template, wherein said script includes a plurality of chronological scenes with respect to at least one chronological time segment;
 a user changeable data determining unit for determining whether or not data of a scene of said plurality of scenes with respect to the time segment is changeable by a user;
 a data changing unit for changing said changeable scene with respect to the time segment; and
 a script and data outputting unit for outputting at least either said script or said data changed.

2. The multimedia data processing device according to claim 1, the reproducing and editing engine program further comprising:
 a function selecting unit for selecting a function of said multimedia data processing device in accordance with a time segment included in said script;
 an action determining unit for determining which process is to be carried out on the data that is referred from said script by using said function selected in accordance with said time segment in said script; and
 an action implementing unit for implementing said process determined by the action determining unit.

3. The multimedia data processing device according to claim 2, wherein time restriction for determining an action that is carried out on said data that is referred from said script is described in said template, and said action implementing unit carries out said process determined in accordance with said time restriction.

4. The multimedia data processing device according to claim 2, wherein said action determining unit acquires data that includes any pieces of data from among still image data, animated image data, sound data and position information data that is acquired by means of a GPS (global positioning system) or the like by using said function selected, and determines which process is to be carried out on said data that is referred from said script by using said data acquired.

5. The multimedia data processing device according to claim 2, wherein said action determining unit acquires data via a network by using said function selected, and determines whish process is to be carried out on said data that is referred from said script by using said data acquired.

6. The multimedia data processing device according to claim 2, wherein said determined process that is carried out in said action implementing unit is a process for accessing a predetermined WEB page.

7. The multimedia data processing device according to claim 2, wherein said process determined that is carried out in said action implementing unit is a process for calling a predetermined telephone number.

8. The multimedia data processing device according to claim 2, wherein
 said action implementing unit is characterized by acquiring data by using said function selected and by carrying out a conversion process on said data acquired in accordance with environmental information that includes any of specifications and conditions of said function selected, said template, and data that has been acquired by using said function selected, and
 said conversion process in accordance with said environmental information includes deletion of an amount of data in accordance with the restriction of memory capacity and conversion of the screen size, reduction in the number of colors or coordination of data formats in accordance with the display device or the results of analysis of said multimedia data.

9. The multimedia data processing device according to claim 2, wherein
said action implementing unit is characterized by acquiring data by using said function selected and by carrying out a conversion process on said data acquired in accordance with environmental information that includes any of specifications and conditions of said function selected, said template, and data that has been acquired by using said function selected, and
said conversion process in accordance with said environmental information is a process for converting said data acquired to predetermined alternative data.

10. The multimedia data processing device according to claim 2, wherein said action implementing unit acquires data by using said function selected and determines whether or not the usage of said data acquired is required in accordance with environmental information that includes any of specifications and conditions of said function selected, said template, and data that has been acquired by using said function selected.

11. The multimedia data processing device according to claim 2, wherein said action implementing unit carries any of carrying out said process after noticing that said process is to be carried out via a user interface, accepting confirmation that said process is to be carried out, and accepting selection whether or not said process is to be carried out immediately before said process determined is carried out.

12. The multimedia data processing device according to claim 1, wherein transition information of the state of reproduction of the media data is described in said template, and said script implementing unit manages the transition of said state of reproduction of said media data.

13. The multimedia data processing device according to claim 12, wherein said script implementing unit carries out said transition of the state of reproduction of media data in accordance with said transition information of the state of reproduction of media data that is described in said template when said action determining unit acquires an event by using said function selected.

14. The multimedia data processing device according to claim 13, wherein said event is a time event that includes at least one of arrival at a predetermined time or running out of a timer.

15. The multimedia data processing device according to claim 1, wherein transition information of the state of reproduction of media data is described in said template together with time restriction, and said script implementing unit chronologically manages said transition of the state of reproduction of the media data.

16. The multimedia data processing device according to claim 1, wherein
transition information of the state of reproduction of media data is described in said template, and
said multimedia data processing device further comprises:
a thumbnail generating unit for generating a thumbnail of media data that is included in said template; and
a preview unit for displaying said thumbnail generated on the basis of said transition information.

17. The multimedia data processing device according to claim 1, further comprising:
a template acquiring unit for acquiring said template that includes said script;
a selecting unit for selecting a desired template from said template acquired; and
a data change confirming unit for confirming said changing in said data.

18. The multimedia data processing device according to claim 17, wherein said template acquiring unit acquires a template that has been stored in a memory device within said multimedia data processing device.

19. The multimedia data processing device according to claim 17, wherein said template acquiring unit acquires a template from another device via a network.

20. The multimedia data processing device according to claim 17, wherein said template acquiring unit acquires a template from a message that has been received via a network.

21. The multimedia data processing device according to claim 1, further comprising a control unit for controlling said changing in said data in accordance with said script.

22. The multimedia data processing device according to claim 1, further comprising:
a sequence managing unit for managing a sequence that is described in said script; and
a changeable data proposing unit for showing changeable data in response to said sequence.

23. The multimedia data processing device according to claim 1, further comprising:
a sequence managing unit for managing the sequence that is described in said script; and
an operation guidance proposing unit for proposing an operation guidance for carrying out data change in response to said sequence.

24. The multimedia data processing device according to claim 23, wherein said script implementing unit further comprises a reproduction time controlling unit for controlling reproduction time of said data changed in accordance with a predetermined rule in the case where an operation of said data change is carried out.

25. A multimedia data processing device, including a control unit and a memory, said control unit reads a reproducing and editing engine program from the memory and performs processes in accordance with the reproducing and editing engine program, comprising:
a template acquiring unit for acquiring a template that has been formed so as to include a script, wherein the script includes a plurality of chronological scenes with respect to at least one chronological time segment;
a program acquiring unit for acquiring a program from a broadcasting station;
a contents acquiring unit for acquiring internet contents which are provided via the internet; and
a script implementing unit for reproducing at least one of data of a chronological scene of said script with respect to the time segment, said program that has been acquired by said program acquiring unit, and said internet contents that have been acquired by said contents acquiring unit in accordance with said script in a position on a screen and according to timing of the chronological scene within said script.

26. The multimedia data processing device according to claim 25, wherein
said template includes program list information,
said multimedia data processing device further comprises a reproduction data selecting unit for selecting one or more program or internet contents on the basis of said program list information, and
said script implementing unit reproduces said program or said internet contents selected.

27. A non-transitory computer-readable storage medium storing a multimedia data processing program, which when executed by a computer, causes the computer to carry out the process of a template that has been formed so as to include a script, the script allows the computer to carry out:

the script implementing step of reproducing data in accordance with a script included in a template, wherein said script includes a plurality of chronological scenes with respect to at least one chronological time segment;

the user changeable data determining step of determining whether or not data of a scene with respect to the time segment can be changed by a user;

the data changing step of changing said changeable scene with respect to the time segment by using a function of a multimedia data processing device; and the script and data outputting step of outputting at least one of said script and said data changed.

28. The computer-readable storage medium according to claim 27, further comprising:

the terminal function selecting step of selecting a function of a multimedia data processing device in accordance with said time segment of said script;

the action determining step of determining which process is to be carried out for said data that is referred from said script by using said function selected; and the action implementing step of implementing said process determined by the action determining step.

29. The computer-readable storage medium according to claim 28, wherein time restriction for determining an action that is carried out on said data that is referred from said script is described in said template, and said action implementing unit carries out said determined process in accordance with said time restriction.

30. The computer-readable storage medium according to claim 27, wherein transition information of the state of reproduction of media data is described in said template, and said transition of the state of reproduction of media data is managed in said script implementing step.

31. The computer-readable storage medium according to claim 27, wherein transition information of the state of reproduction of media data is described in said template together with time restriction, and said transition of the state of reproduction of media data is chronologically managed in said script implementing step.

32. The computer-readable storage medium according to claim 27, wherein transition information of the state of reproduction of media data is described in said template, and the multimedia data processing program further allows the computer to carry out:

the thumbnail generating step of generating a thumbnail of media data that is included in said template; and the preview step of displaying said thumbnail generated on the basis of said transition information.

33. The computer-readable storage medium according to claim 27, which further allows the computer to carry out:

the template acquiring step of acquiring said template that includes said script;

the selecting step of selecting a desired template from said acquired template; and the data change confirming step of confirming said changing in said data.

34. The computer-readable storage medium according to claim 27, which further allows the computer to carry out the restricting step of restricting said changing in said data in accordance with said script.

35. The computer-readable storage medium according to claim 27, which further allows the computer to carry out:

the sequence managing step of managing a sequence that is described in said script; and the changeable data proposing step of proposing changeable data in response to said sequence.

36. The computer-readable storage medium according to claim 27, which further allows the computer to carry out:

the sequence managing step of managing a sequence that is described in said script; and the operation guidance proposing step of proposing an operation guidance for carrying out data change in response to said sequence.

37. The computer-readable storage medium according to claim 36, which further allows the computer to carry out the reproduction time controlling step of controlling the reproduction time of said data changed in accordance with a predetermined rule in said script implementing step in the case where an operation of said data change is carried out.

38. The computer-readable storage medium according to claim 27, which further allows the computer to carry out:

the media time selecting step of determining and selecting a portion of said data that is referred from said script where implementation or termination can be carried out in said script implementing step; and said portion is paused when implementing said portion selected of said data in said script implementing step.

39. The computer-readable storage medium according to claim 38, wherein said portion that is selected in said media time selecting step is a portion where changeable media data switches.

40. The computer-readable storage medium according to claim 39, wherein the starting and completing times of each said segment are changing points, further comprising:

portion is paused, a time of resumption of reproduction is determined as a sequence changing point that is the starting time of the time segment next in chronological order from the time that the portion is paused; and the reproduction of said data is skipped to said determined next sequence changing point.

41. The computer-readable storage medium according to claim 39, wherein the starting and completing times of each said segment are changing points, further comprising:

a sequence changing point that is the completion time of the previous time segment in chronological order from the time that the portion is paused; and the reproduction of said data is skipped to said determined previous sequence changing point.

42. The computer-readable storage medium according to claim 27, wherein the start portion or the end portion of the changed section of said data is added to a predetermined portion of said data in the case where an operation of said data change is carried out.

* * * * *